(12) United States Patent
Hashimoto

(10) Patent No.: US 8,712,635 B2
(45) Date of Patent: Apr. 29, 2014

(54) IN-VEHICLE ELECTRONIC CONTROL APPARATUS HAVING MONITORING CONTROL CIRCUIT

(75) Inventor: Koji Hashimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1072 days.

(21) Appl. No.: 12/339,352

(22) Filed: Dec. 19, 2008

(65) Prior Publication Data

US 2009/0312898 A1 Dec. 17, 2009

(30) Foreign Application Priority Data

Jun. 13, 2008 (JP) ................................. 2008-155562

(51) Int. Cl.
G06F 7/00 (2006.01)
(52) U.S. Cl.
USPC .......................................................... 701/36
(58) Field of Classification Search
USPC .......................................................... 701/36
See application file for complete search history.

(56) References Cited

U.S. PATENT DOCUMENTS

| | | | |
|---|---|---|---|
| 6,883,123 B2 * | 4/2005 | Hashimoto et al. ............. | 714/55 |
| 7,426,099 B2 * | 9/2008 | Soudier et al. ................... | 361/23 |
| 7,437,218 B2 * | 10/2008 | Funcke et al. .................... | 701/1 |
| 7,612,464 B2 * | 11/2009 | Yano ............................. | 307/10.1 |
| 7,912,600 B2 * | 3/2011 | Iwagami et al. ............. | 701/32.8 |

FOREIGN PATENT DOCUMENTS

| | | | |
|---|---|---|---|
| JP | 2003-131734 A | 5/2003 |
| JP | 2005-031865 A | 2/2005 |

* cited by examiner

Primary Examiner — Khoi Tran
Assistant Examiner — Nicholas Kiswanto
(74) Attorney, Agent, or Firm — Sughrue Mion, PLLC

(57) ABSTRACT

A main control circuit unit 20A and a monitoring control circuit unit 30A are connected in series; the main control circuit unit 20A and an external control apparatus 40 are connected in series. When the monitoring control circuit unit 30A generates concurrent question information, the main control circuit unit 20A generates main-machine answer information A1$n$, and the external control apparatus 40 generates supplementary-apparatus answer information. The main control circuit unit 20A combines these answer information items and transmits the combined answer information items to the monitoring control circuit unit 30A; the monitoring control circuit unit 30A compares the combined answer information items with synthesis correct-solution information items stored in a correct-solution information storage memory 35A so as to perform a total abnormality determination. The main control circuit unit 20A performs an abnormality determination on the external control apparatus 40, based on correct-solution information for the external control apparatus 40; the main control circuit unit 20A generates synthesis answer information by use of the correct-solution information.

15 Claims, 32 Drawing Sheets

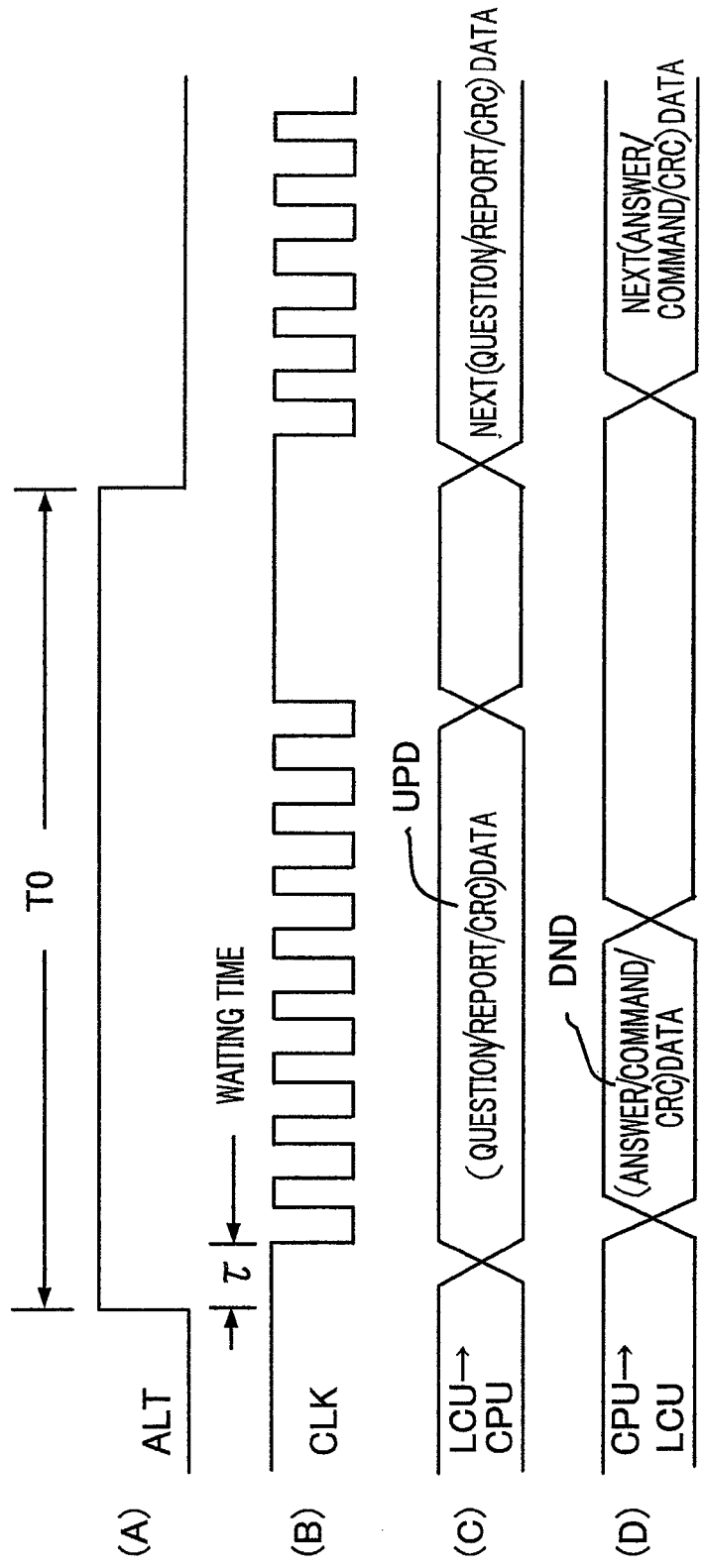

FIG.3A (A)

| PMEM 25A |
|---|
| COMMUNICATION CONTROL |
| INPUT/OUTPUT CONTROL |
| MAIN-MACHINE ANSWER GENERATION UNIT |
| ERRONEOUS ANSWER GENERATION UNIT |
| TRANSMISSION ANSWER EDITION UNIT ·CORRECTED ANSWER GENERATION UNIT |
| EXTERNAL-APPARATUS MONITORING UNIT |
| EXTERNAL APPARATUS ABNORMALITY PROCESSING UNIT |
| TALLIED INFORMATION MONITORING UNIT |
| CODE ERROR DETECTION UNIT |
| STORED-INFORMATION ABNORMALITY DETECTION UNIT |
| RESET PROCESSING UNIT |
| SUPPLEMENTARY-APPARATUS CORRECT-SOLUTION INFORMATION |
|  |
| INPUT TABLE |

(B)

| LCU 30a |
|---|
| Q&A COMMUNICATION UNIT |
| INPUT/OUTPUT COMMUNICATION CONTROL |
| QUESTION INFORMATION UPDATING UNIT |
| QUESTION INFORMATION GENERATION UNIT |
| → CONCURRENT QUESTION INFORMATION |
|  |
| ABNORMALITY DETERMINATION UNIT ·TOTAL ABNORMALITY DETERMINATION UNIT |
| RESPONSE DELAY DETERMINATION UNIT |
| CODE ERROR DETECTION UNIT |
|  |
| RESET PROCESSING UNIT |
|  |
|  |

(C)

| CONCURRENT QUESTION |
|---|
| Q0 |
| Q1 |
| ⋮ |
| QE |
| QF |

FIG.3B (D)

| ANSWER INFORMATION n = 0·1···F | | |
|---|---|---|
| | An | SYNTHESIS ANSWER |
| CPU | A1n | MAIN-MACHINE ANSWER |
| TCU | A2n | SUPPLEMENTARY-APPARATUS ANSWER |
| EPS | A3n | SUPPLEMENTARY-APPARATUS ANSWER |
| SCU | A4n | SUPPLEMENTARY-APPARATUS ANSWER |
| ABS | A5n | SUPPLEMENTARY-APPARATUS ANSWER |

An = A1n + A2n + · · + A5n (E)

| CORRECT-SOLUTION INFORMATION n = 0·1···F | | |
|---|---|---|
| | Rn | SYNTHESIS CORRECT SOLUTION |
| CPU | R1n | MAIN-MACHINE CORRECT SOLUTION |
| TCU | R2n | SUPPLEMENTARY-APPARATUS CORRECT SOLUTION |
| EPS | R3n | SUPPLEMENTARY-APPARATUS CORRECT SOLUTION |
| SCU | R4n | SUPPLEMENTARY-APPARATUS CORRECT SOLUTION |
| ABS | R5n | SUPPLEMENTARY-APPARATUS CORRECT SOLUTION |

Rn = R1n + R2n + · · + R5n (F)

| DMEM 35A |
|---|
| SYNTHESIS CORRECT-SOLUTION INFORMATION |
| |
| |

(G)

| RMEM 24 |
|---|
| QUESTION DATA |
| INPUT DATA |
| SETTING COMPLETION DATA |
| MONITORING/TALLYING DATA |
| FIRST FLAG |
| CODE CHECK DATA |
| |
| |

(H)

| RMEM 34 |
|---|
| ANSWER DATA |
| OUTPUT DATA |
| SETTING DATA |
| |
| SECOND FLAG |
| CODE CHECK DATA |
| |
| |

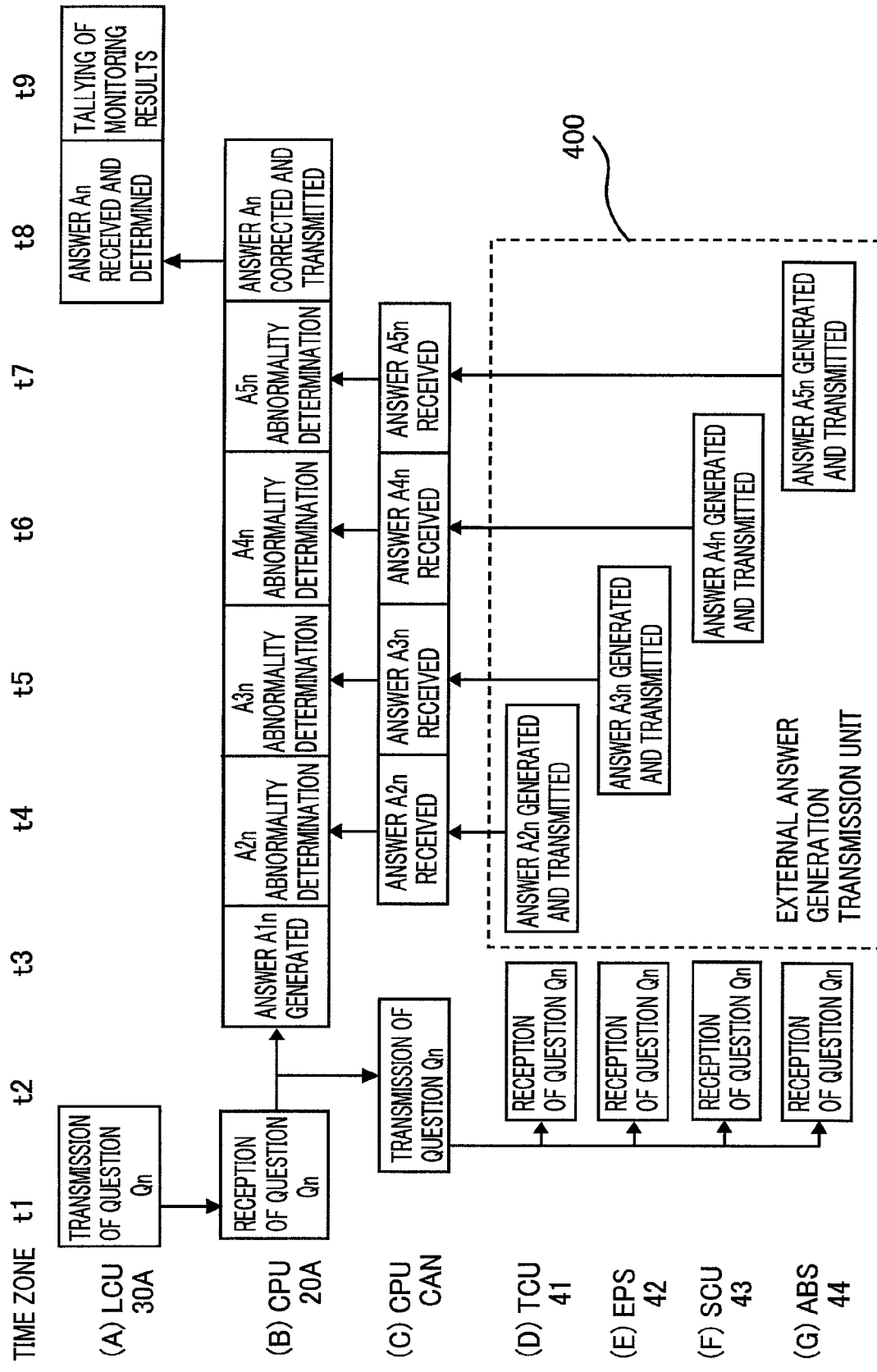

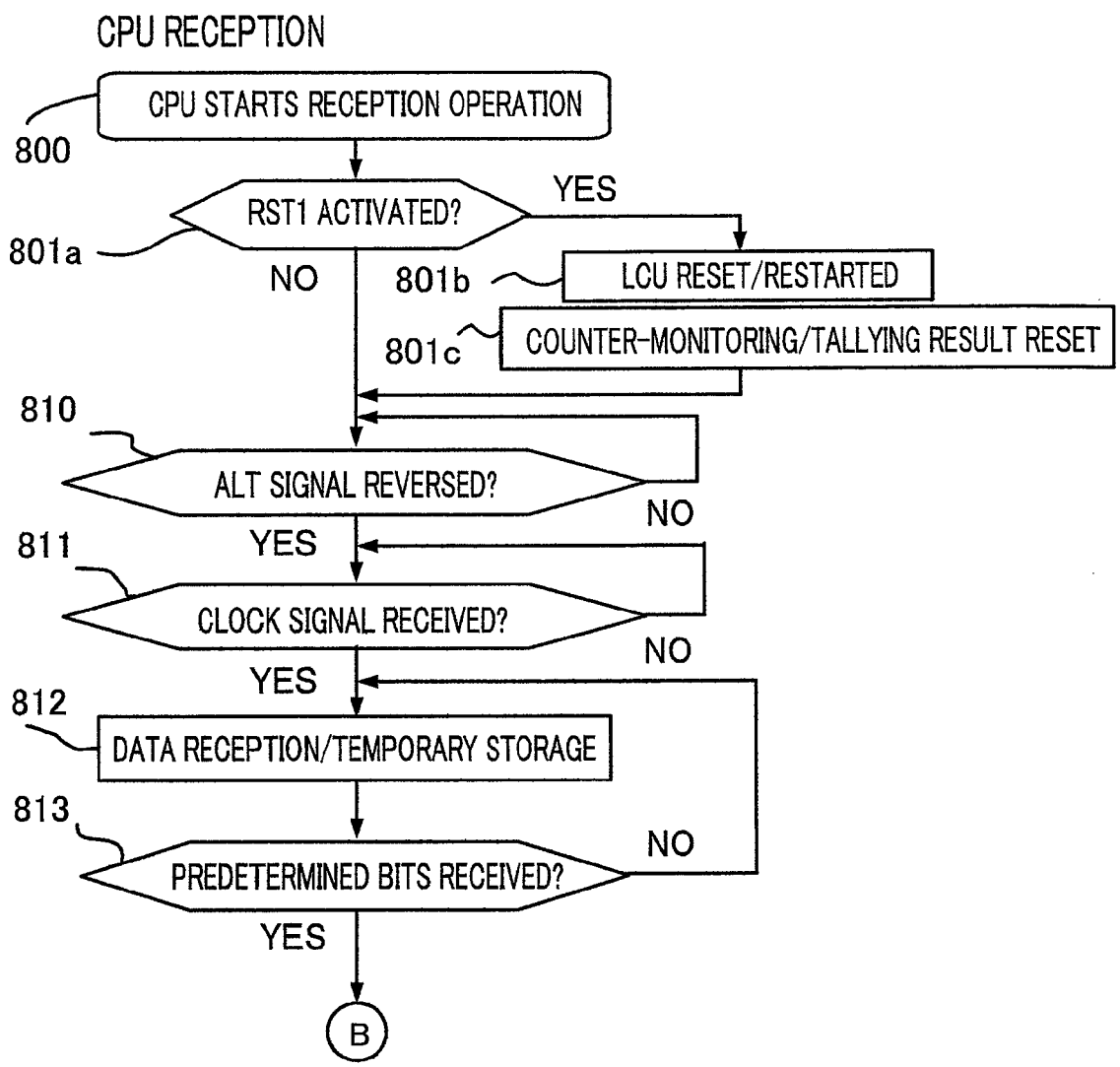

FIG.10A (A)

| PMEM 25B |
|---|
| COMMUNICATION CONTROL |
| INPUT/OUTPUT CONTROL |
| MAIN-MACHINE ANSWER GENERATION UNIT |
| ERRONEOUS ANSWER GENERATION UNIT |
| TRANSMISSION ANSWER EDITION UNIT ·CIRCULATION ANSWER GENERATION UNIT |
| |
| EXTERNAL APPARATUS ABNORMALITY PROCESSING |
| TALLIED INFORMATION MONITORING UNIT |
| CODE ERROR DETECTION UNIT |
| STORED-INFORMATION ABNORMALITY DETECTION UNIT |
| RESET PROCESSING UNIT |
| |
| |
| INPUT TABLE |

(B)

| PMEM 35B |
|---|
| Q&A COMMUNICATION UNIT |
| INPUT/OUTPUT COMMUNICATION CONTROL |
| QUESTION INFORMATION UPDATING UNIT |
| QUESTION INFORMATION GENERATION UNIT → CONCURRENT QUESTION INFORMATION → DISCRETE QUESTION INFORMATION |
| EXTERNAL APPARATUS ABNORMALITY NOTIFICATION |
| ABNORMALITY DETERMINATION UNIT ·SYNTHESIS ABNORMALITY DETERMINATION UNIT ·DISCRETE ABNORMALITY DETERMINATION UNIT |
| RESPONSE DELAY DETERMINATION UNIT |
| CODE ERROR DETECTION UNIT |
| RESET PROCESSING UNIT |
| MAIN-MACHINE CORRECT-SOLUTION INFORMATION |
| SUPPLEMENTARY-APPARATUS CORRECT-SOLUTION INFORMATION |
| SYNTHESIS CORRECT-SOLUTION INFORMATION |

(C)

| QUESTION INFORMATION n = 0·1···F | | |
|---|---|---|
| | Qn | CONCURRENT QUESTION |
| CPU | Q1n | DISCRETE QUESTION |
| TCU | Q2n | DISCRETE QUESTION |
| EPS | Q3n | DISCRETE QUESTION |
| SCU | Q4n | DISCRETE QUESTION |
| ABS | Q5n | DISCRETE QUESTION |

FIG.10B (D)

| ANSWER INFORMATION n = 0·1···F | | |
|---|---|---|
| | An | SYNTHESIS ANSWER |
| CPU | A1n | MAIN-MACHINE ANSWER |
| TCU | A2n | SUPPLEMENTARY-APPARATUS ANSWER |
| EPS | A3n | SUPPLEMENTARY-APPARATUS ANSWER |
| SCU | A4n | SUPPLEMENTARY-APPARATUS ANSWER |
| ABS | A5n | SUPPLEMENTARY-APPARATUS ANSWER |

$An = A1n + A2n + \cdots + A5n$ (E)

| CORRECT-SOLUTION INFORMATION $n = 0\cdot1\cdots F$ | | |
|---|---|---|
| | Rn | SYNTHESIS CORRECT SOLUTION |
| CPU | R1n | MAIN-MACHINE CORRECT SOLUTION |
| TCU | R2n | SUPPLEMENTARY-APPARATUS CORRECT SOLUTION |
| EPS | R3n | SUPPLEMENTARY-APPARATUS CORRECT SOLUTION |
| SCU | R4n | SUPPLEMENTARY-APPARATUS CORRECT SOLUTION |
| ABS | R5n | SUPPLEMENTARY-APPARATUS CORRECT SOLUTION |

$Rn = R1n + R2n + \cdots + R5n$ (G)

| RMEM 24 |
|---|
| QUESTION DATA |
| INPUT DATA |
| SETTING COMPLETION DATA |
| MONITORING/TALLYING DATA |
| FIRST FLAG |
| CODE CHECK DATA |
| EXTERNAL-APPARATUS STATUS DATA |
| |

(H)

| RMEM 34 |
|---|
| ANSWER DATA |
| OUTPUT DATA |
| SETTING DATA |
| |
| SECOND FLAG |
| CODE CHECK DATA |
| |

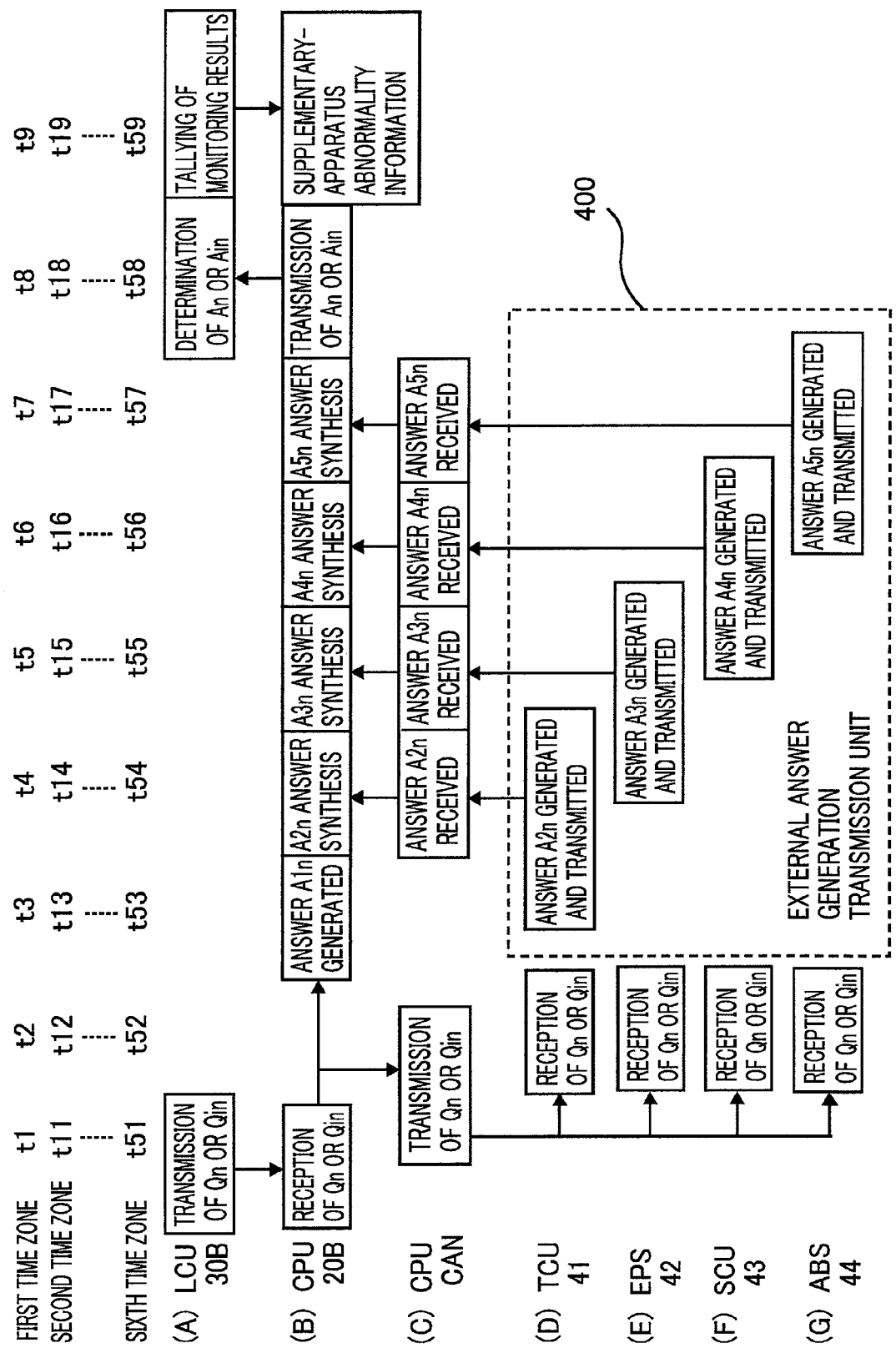

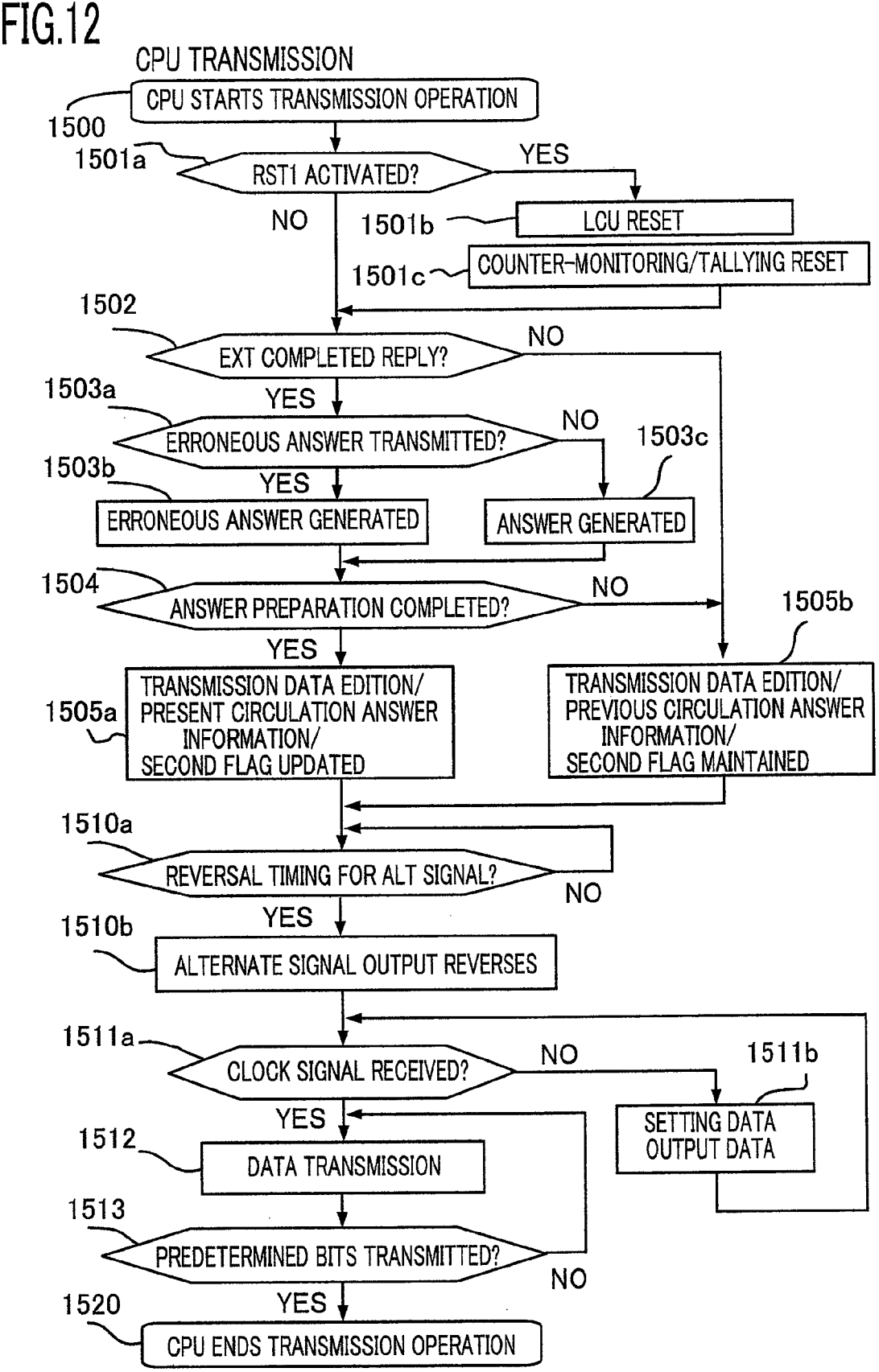

FIG.17A (A)

| PMEM 25C |
|---|
| COMMUNICATION CONTROL |
| INPUT/OUTPUT CONTROL |
| MAIN-MACHINE ANSWER GENERATION UNIT |
| ERRONEOUS ANSWER GENERATION UNIT |
| TRANSMISSION ANSWER EDITION UNIT<br>·SELECTION ANSWER GENERATION UNIT |
| EXTERNAL-APPARATUS MONITORING UNIT |
|  |
| EXTERNAL APPARATUS ABNORMALITY PROCESSING |
| TALLIED INFORMATION MONITORING UNIT |
| CODE ERROR DETECTION UNIT |
| STORED-INFORMATION ABNORMALITY DETECTION UNIT |
| RESET PROCESSING UNIT |
| SUPPLEMENTARY-APPARATUS CORRECT-SOLUTION INFORMATION |
|  |
| INPUT TABLE |

(B)

| PMEM 35C |
|---|
| Q&A COMMUNICATION UNIT |
| INPUT/OUTPUT COMMUNICATION CONTROL |
| QUESTION INFORMATION UPDATING UNIT |
| QUESTION INFORMATION GENERATION UNIT<br>→ CONCURRENT QUESTION INFORMATION |
| EXTERNAL APPARATUS ABNORMALITY NOTIFICATION |
| ABNORMALITY DETERMINATION UNIT<br>·ABNORMALITY ANALYSIS DETERMINATION UNIT |
| RESPONSE DELAY DETERMINATION UNIT |
| CODE ERROR DETECTION UNIT |
| RESET PROCESSING UNIT |
| MAIN-MACHINE CORRECT-SOLUTION INFORMATION |
| SYNTHESIS CORRECT-SOLUTION INFORMATION |

(C)

| CONCURRENT QUESTION |
|---|
| Q0 |
| Q1 |
| ⋮ |
| QF |

FIG.17B (D)

| | An | SYNTHESIS ANSWER |
|---|---|---|
| \multicolumn{3}{l|}{ANSWER INFORMATION  n = 0·1···F} |
| CPU | A1n | MAIN-MACHINE ANSWER |
| TCU | A2n | SUPPLEMENTARY-APPARATUS ANSWER |
| EPS | A3n | SUPPLEMENTARY-APPARATUS ANSWER |
| SCU | A4n | SUPPLEMENTARY-APPARATUS ANSWER |
| ABS | A5n | SUPPLEMENTARY-APPARATUS ANSWER |

$An = A1n + A2n + \cdots + A5n$ (E)

| | Rn | SYNTHESIS CORRECT SOLUTION |
|---|---|---|
| \multicolumn{3}{l|}{CORRECT-SOLUTION INFORMATION  n = 0·1···F} |
| CPU | R1n | MAIN-MACHINE CORRECT SOLUTION |
| TCU | R2n | SUPPLEMENTARY-APPARATUS CORRECT SOLUTION |
| EPS | R3n | SUPPLEMENTARY-APPARATUS CORRECT SOLUTION |
| SCU | R4n | SUPPLEMENTARY-APPARATUS CORRECT SOLUTION |
| ABS | R5n | SUPPLEMENTARY-APPARATUS CORRECT SOLUTION |

$Rn = R1n + R2n + \cdots + R5n$ (G)

| RMEM 24 |
|---|
| QUESTION DATA |
| INPUT DATA |
| SETTING COMPLETION DATA |
| MONITORING/TALLYING DATA |
| FIRST FLAG |
| CODE CHECK DATA |
| EXTERNAL-APPARATUS STATUS DATA |
| |

(H)

| RMEM 34 |
|---|
| ANSWER DATA |
| OUTPUT DATA |
| SETTING DATA |
| |
| SECOND FLAG |
| CODE CHECK DATA |
| |
| |

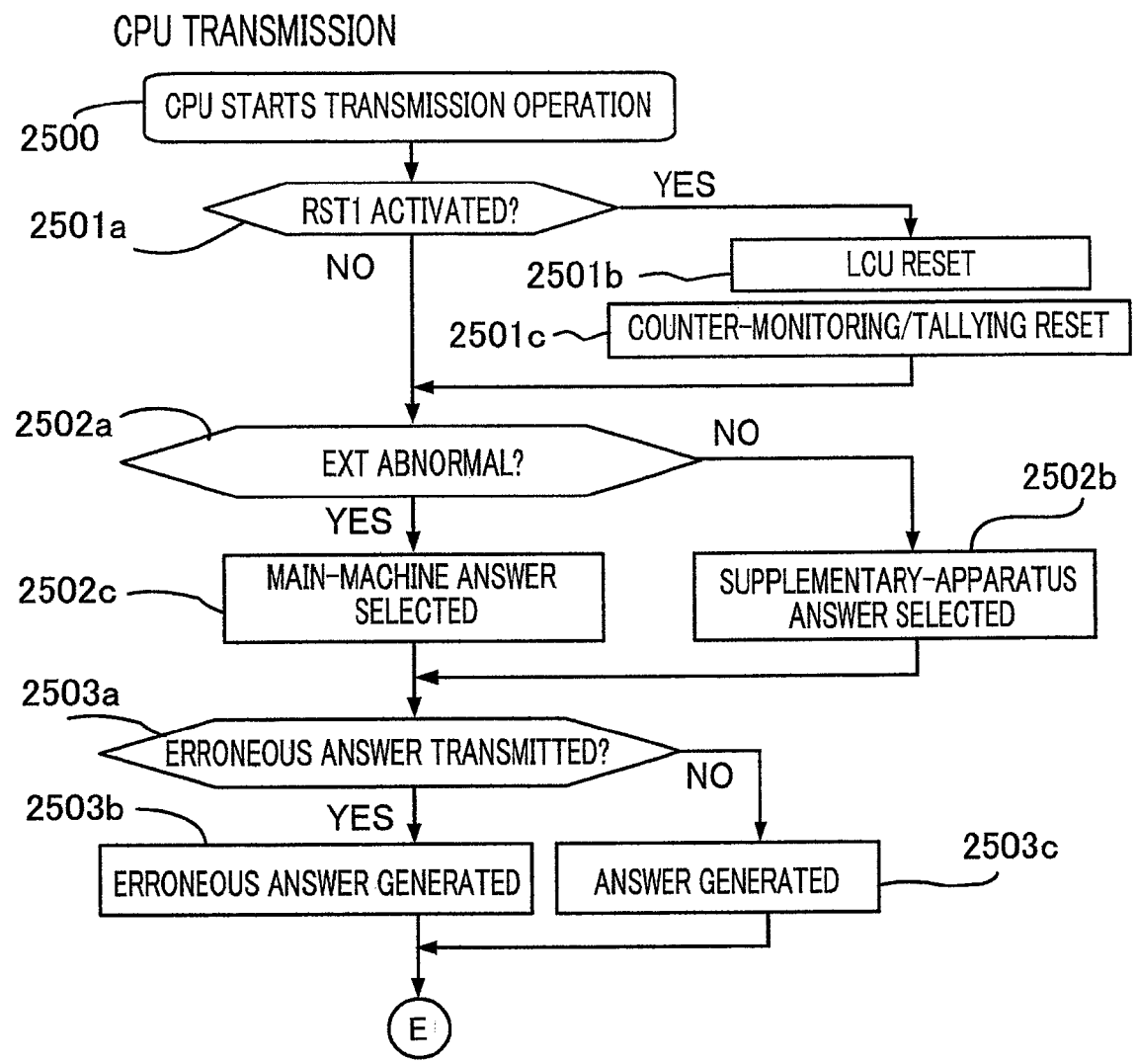

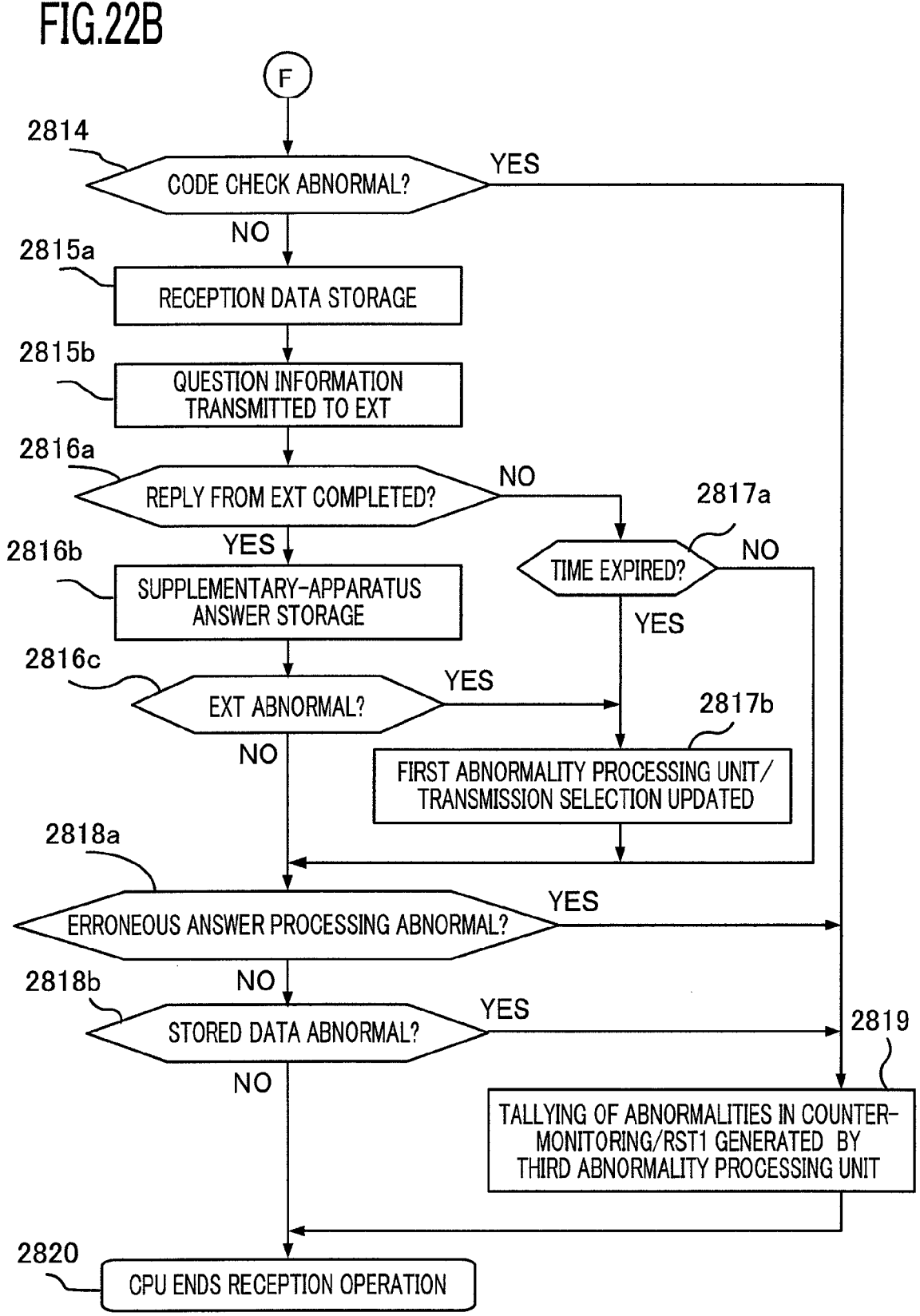

IN-VEHICLE ELECTRONIC CONTROL APPARATUS HAVING MONITORING CONTROL CIRCUIT

BACKGROUND OF THE INVENTION

1. Field of the Invention

The present invention relates to an in-vehicle electronic control apparatus incorporating a microprocessor and particularly to improvement of an in-vehicle electronic control apparatus, such as an engine control apparatus, which has a monitoring control circuit serially connected to the microprocessor in order to enhance the safety of the control.

2. Description of the Related Art

It is publicly known that, in an in-vehicle electronic control apparatus equipped with a microprocessor, a so-called Q&A-method abnormality determination unit is utilized in which, in order to always monitor whether or not the microprocessor functions normally, a monitoring control circuit is provided, the monitoring control circuit transmits question information to the microprocessor that serves as a main control circuit unit, the microprocessor sends answer information for the question information to the monitoring control circuit, and then the monitoring control circuit compares the sent answer information with correct-solution information that has preliminarily been provided and ascertains whether or not a normal answer has been obtained.

For example, according to Japanese Patent Laid-Open Pub. No. 2003-131734 (refer to FIG. 1, ABSTRACT, and Paragraphs [0035] through [0038]), there has been disclosed an abnormality monitoring method in which a control function is implemented in a control unit; there is provided a monitoring module that monitors the control function, and the monitoring module conveys question information to the control unit; the control unit calculates response information and conveys the response information to the monitoring module; and the monitoring module recognizes an error in the control function, based on the response information.

In a conventional apparatus disclosed in Japanese Patent Laid-Open No. 2003-131734; the control units to be monitored are in-vehicle control apparatuses such as an engine control apparatus, a transmission control apparatus, a steering control apparatus, and a brake control apparatus.

Additionally, according to Japanese Patent Laid-Open Pub. No. 2005-031865 (refer to FIG. 1, and ABSTRACT), there has been disclosed a technology in which an electronic control apparatus incorporating a microprocessor periodically and alternatively implements part of a control program so as to perform an operation inspection while the engine is running. The operation inspection is implemented in such a way that a monitoring control circuit unit sequentially transmits, through an inquiry packet, a great number of question items to a microprocessor that controls a group of electric loads in response to the contents of a nonvolatile program memory and the operation statuses of a group of input sensors, and compares the content of the reply from the microprocessor with correct-solution information so as to perform an abnormality determination; and the microprocessor diagnoses the cycle of reception of the inquiry packets so as to counter-monitor the monitoring operation of the monitoring control circuit unit.

The outline of the question/answer-method abnormality determination unit in conventional technology disclosed in Japanese Patent Laid-Open No. 2005-31865 is as illustrated in FIG. 23. That is to say, in FIG. 23, an electronic control apparatus 1 is configured with a main control circuit unit 2 incorporating a microprocessor 2a and a monitoring control circuit unit 3 serially connected to the main control circuit unit 2.

The main control circuit unit 2 is configured in such a way as to respond to the operation statuses of a great number of input signals including input signals A, B, and C and to output a great number of output signals including an output signal Y so as to drive and control the electric loads; the main control circuit unit 2 is configured in such a way that the control specification thereof is decided by the contents of a program memory 2b that collaborates with the microprocessor 2a.

For example, a monitoring subject program 2c is configured in such a way as to calculate the output signal Y[=K×(A−B)+C], based on the input signals A, B, and C and a control constant K that is preliminarily stored in the program memory 2b. Simulated-calculation data 2f is stored in the program memory 2b; a table n that typifies data tables [1, 2, - - -, n] in the simulated-calculation data 2f is configured with the control constant K and simulation constants An, Bn, and Cn corresponding to the input signals A, B, and C, respectively; however, the electronic control apparatus 1 is configured in such a way that the table to be utilized for the simulated calculation is randomly designated in an updating manner, in accordance with question information from the monitoring control circuit unit 3.

The electronic control apparatus 1 is configured in such a way that, for the monitoring subject program 2c, an input information switching unit 2d periodically designates the data table n instead of the input signal A, B, and C, and the calculation result Yn[=K×(An−Bn)+Cn] is periodically transmitted, as answer information, to the monitoring control circuit unit 3 by way of an output destination switching unit 2e. In the monitoring control circuit unit 3, the correct-solution information corresponding to the question information (the data table number for simulated calculation) is preliminarily stored in a correct-solution information storage memory; an abnormality determination unit 3a compares the answer information obtained from the main control circuit unit 2 with the correct-solution information so as to determine whether or not an abnormality is caused.

In addition, as the control program for performing the simulated calculation utilizing the data table, the monitoring subject program 2c may directly be utilized, or a copy program 2g, which is the monitoring subject program 2c written in a different address region of the program memory 2b, may be utilized.

In the monitoring method, for the driving sequence control of a vehicle, according to Japanese Patent Laid-Open Pub. No. 2003-131734; various subject control units have been disclosed; however, neither efficient information transferring method nor efficient abnormality monitoring method for collectively monitoring the subject control units by a single control apparatus has been described. Accordingly, there has been a drawback that the monitoring control circuit unit cannot perform collective management of abnormality monitoring for an in-vehicle electronic control apparatus that collaborates with external control apparatuses, discrimination between an abnormality in the main control circuit unit and an abnormality in the external control apparatus, and abnormality processing in accordance with the contents of a detected abnormality.

Additionally, the monitoring control circuit unit in the electronic control apparatus disclosed in Japanese Patent Laid-Open No. 2005-31865 does not perform monitoring of diverse external connection apparatuses; neither efficient information transferring method nor efficient abnormality monitoring method for collectively monitoring the diverse external connection apparatuses is described. Accordingly, there has been a drawback that the monitoring control circuit unit cannot perform collective management of abnormality monitoring for an in-vehicle electronic control apparatus that collaborates with external control apparatuses, discrimination between an abnormality in the main control circuit unit and an abnormality in the external control apparatuses, and abnormality processing in accordance with the contents of a detected abnormality.

In each of the conventional technologies, there is left a problem that differentiation, upon detection of an abnormality, of a processing method cannot be achieved through management of discrimination between abnormality monitoring for the main control unit and abnormality monitoring for collaborating supplementary apparatuses.

SUMMARY OF THE INVENTION

The first objective of the present invention is to provide an in-vehicle electronic control apparatus that is configured with a main control circuit unit and a monitoring control circuit unit and in which the monitoring control circuit unit can collectively manage abnormality monitoring for the in-vehicle electronic control apparatus that collaborates with external control apparatuses.

The second objective of the present invention is to provide an in-vehicle electronic control apparatus that can discriminate between an abnormality in the main control circuit unit and an abnormality in the external control apparatuses and can perform abnormality processing in accordance with the contents of a detected abnormality.

The third objective of the present invention is to provide an in-vehicle electronic control apparatus that is provided with a simplified question information generation unit and a transmission answer edition unit for performing the abnormality monitoring and the abnormality processing.

An in-vehicle electronic control apparatus, having a monitoring control circuit, according to the present invention is provided with a main control circuit unit including a nonvolatile program memory; a RAM memory for calculation processing; a first input interface circuit to which a first input sensor group is connected; a first output interface circuit to which a first electric load group is connected; and a microprocessor that controls the first electric load group, in response to contents of a control program stored in the nonvolatile program memory and an operation status of the first input sensor group, and a monitoring control circuit unit including a question information generation unit that is connected to the microprocessor, via a serial communication circuit, and periodically and selectively transmits a plurality of question information items; a correct-solution information storage memory that stores the correct-solution information items for the question information items; and an abnormality determination unit that compares the answer information, based on the question information, from the main control circuit unit with the correct-solution information stored in the correct-solution information storage memory so as to determine whether or not an abnormality exists.

The main control circuit unit collaborates with an external control apparatus that is connected with the main control circuit unit via a second serial communication circuit and that receives control signals from and transmits control signals to the main control circuit unit; the external control apparatus is provided with collaborating supplementary apparatuses including microprocessors that collaborate with supplementary-apparatus program memories; the supplementary-apparatus program memory includes a control program corresponding to an external answer generation transmission unit that generates answer information in response to question information transmitted from the main control circuit unit, and transmits the answer information, as supplementary-apparatus answer information, to the main control circuit unit.

Concurrent question information that is applied to the main control circuit unit and all the external control apparatuses and discrete question information items that are discretely applied to the main control circuit unit and the external control apparatuses are added to the question information generation unit; the concurrent question information or the discrete question information is transmitted from the monitoring control circuit unit to the main control circuit unit, and is transmitted from the monitoring control circuit unit to the external control apparatuses via the main control circuit unit.

The nonvolatile program memory includes a control program corresponding to a main-machine answer generation unit that generates main-machine answer information in accordance with the concurrent question information or the discrete question information and a control program corresponding to a transmission answer edition unit that transmits synthesis answer information obtained by combining and tallying the main-machine answer information and the supplementary-apparatus answer information.

In the correct-solution information storage memory, there is stored main-machine correct-solution information with regard to main-machine answer information generated by the main control circuit unit and synthesis correct-solution information obtained by combining and tallying the main-machine correct-solution information and the supplementary-apparatus correct-solution information items for the supplementary-apparatus answer information items; the supplementary-apparatus correct-solution information items are stored in the correct-solution information storage memory or in the nonvolatile program memory.

The abnormality determination unit performs abnormality monitoring of the main control circuit unit, based at least on the concurrent question information generated by the monitoring control circuit unit or the discrete question information; the main control circuit unit and the monitoring control circuit unit collaborate with each other so as to monitor and discriminate an abnormality in the external control apparatus.

An in-vehicle electronic control apparatus, having a monitoring control circuit, according to the present invention, is configured in such a way that there is provided a monitoring control circuit unit connected to a main control circuit unit that collaborates with an external control apparatus; the monitoring control circuit unit generates concurrent question information and monitors the operation status of the main control circuit unit, based on synthesis answer information obtained from the main control circuit unit; and the monitoring control circuit unit and the main control circuit unit collaborate with each other and monitor the operation status of the external control apparatus so as to share abnormality processing upon the occurrence of an abnormality in the external control apparatus or the main control circuit unit, and communication between the monitoring control circuit unit and the external control apparatus is performed by utilizing a communication line that is provided between the monitoring control circuit unit and the external control apparatus; therefore, an effect is demonstrated in which monitoring of the external control apparatus can be performed with a simple system configuration, and a collective abnormality monitoring can be performed without adding a Q&A-method abnormality monitoring function for each of the external control apparatuses, whereby the safety is enhanced.

Moreover, an effect is demonstrated in which the communication control load can be reduced by utilizing concurrent question information and synthesis answer information, thereby reducing mutual communication information, and the monitoring control circuit unit and the main control circuit unit distinguish an abnormality in the main control circuit unit from an abnormality in the external control apparatus so that a different abnormality processing can be selected and applied to the main control circuit unit.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2 is a timing chart of serial communication in an in-vehicle electronic control apparatus, having a monitoring control apparatus, according to Embodiment 1 of the present invention;

FIGS. 3A and 3B are each part of a set of tables representing the contents of various kinds of memories and logic blocks in an in-vehicle electronic control apparatus, having a monitoring control circuit, according to Embodiment 1 of the present invention;

FIG. 4 is a transition diagram for question information and answer information in an in-vehicle electronic control apparatus, having a monitoring control apparatus, according to Embodiment 1 of the present invention;

FIGS. 8A and 8B are each part of a flowchart representing the reception operation of a main control circuit unit in an in-vehicle electronic control apparatus, having a monitoring control circuit, according to Embodiment 1 of the present invention;

FIGS. 10A and 10B are each part of a set of tables representing the contents of various kinds of memories in an in-vehicle electronic control apparatus, having a monitoring control circuit, according to Embodiment 2 of the present invention;

FIG. 11 is a transition diagram for question information and answer information in an in-vehicle electronic control apparatus, having a monitoring control apparatus, according to Embodiment 2 of the present invention;

FIG. 12 is a flowchart representing the transmission operation of a main control circuit unit in an in-vehicle electronic control apparatus, having a monitoring control circuit, according to Embodiment 2 of the present invention;

FIGS. 17A and 17B are each part of a set of tables representing the contents of various kinds of memories in an in-vehicle electronic control apparatus, having a monitoring control circuit, according to Embodiment 3 of the present invention;

FIGS. 19A and 19B are each part of a flowchart representing the transmission operation of a main control circuit unit in an in-vehicle electronic control apparatus, having a monitoring control circuit, according to Embodiment 3 of the present invention;

FIGS. 22A and 22B are each part of a flowchart representing the reception operation of a main control circuit unit in an in-vehicle electronic control apparatus, having a monitoring control circuit, according to Embodiment 3 of the present invention.

DETAILED DESCRIPTION OF THE PREFERRED EMBODIMENTS

Embodiment 1

(1) Detailed Explanation for Configuration of Embodiment 1

Figure 1:
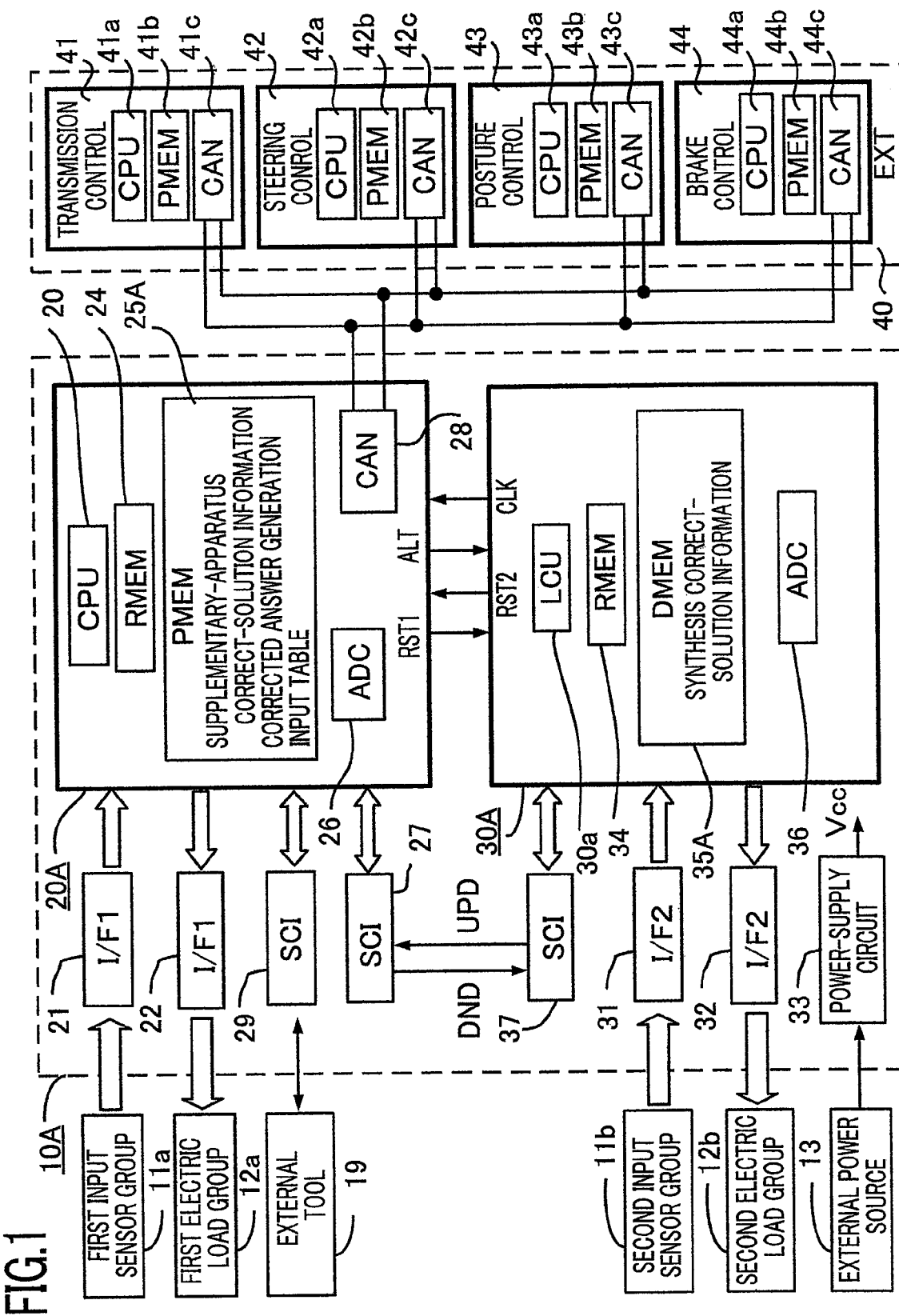
FIG. 1 is an overall block diagram of an in-vehicle electronic control apparatus, having a monitoring control apparatus, according to Embodiment 1 of the present invention.

The configuration of an in-vehicle electronic control apparatus having a monitoring control circuit according to Embodiment 1 of the present invention will be explained below. FIG. 1 is an overall block diagram of an in-vehicle electronic control apparatus having a monitoring control circuit according to Embodiment 1 of the present invention. In FIG. 1, an in-vehicle electronic control apparatus 10A is provided with a main control circuit unit 20A that is formed mainly of a microprocessor 20 and a monitoring control circuit unit 30A that is formed mainly of a logic circuit unit 30a; the in-vehicle electronic control apparatus 10A is configured in such a way as to receive electric power from an external power source 13, which is an in-vehicle battery, so as to operate.

In the first place, devices connected to the outside of the electronic control apparatus 10A will be explained. A first input sensor group 11a is configured, for example, with high-speed on/off sensors, such as an engine rotation sensor and a crank angle sensor, which perform on/off operation in synchronization with the rotation of an engine, and analogue sensors for driving and controlling an engine, such as an accelerator position sensor for detecting an accelerator-pedal depressing degree, a throttle position sensor for detecting an air-intake-throttle valve opening degree, an airflow sensor for measuring an air intake amount for the engine, and an exhaust-gas sensor for detecting the oxygen concentration in an exhaust gas.

A first electric load group 12a that is driven by the electronic control apparatus 10A is configured, for example, with electric loads, such as a fuel-injection electromagnetic valve, an ignition coil (in the case of a gasoline engine), and a motor for controlling the valve opening degree of an air-intake valve, which operate in conjunction with the rotation of the engine or directly relate to driving of the engine.

A second input sensor group 11b is configured, for example, with operation switches such as a selection switch for the transmission shift lever, an accelerator pedal switch, and a brake pedal switch, or analogue sensors such as an engine-coolant temperature sensor, a hydraulic pressure sensor, and an air pressure sensor. A second electric load group 12b is configured with electric loads, which are auxiliary devices that do not directly relate to driving of an engine, such as a power supply relay for supplying loads with electric power, an electromagnetic clutch for driving an air conditioner, and an alarm/display device.

An external tool 19 is connected via an unillustrated detachable/attachable connector to the electronic control apparatus 10A when the product is shipped or when maintenance and inspection is performed, and communicates with the microprocessor 20 by the intermediary of a serial interface circuit 29, so that a control program and a control constant are transferred to and written in a nonvolatile program memory 25A described later.

Next, the inside configuration of the electronic control apparatus 10A will be explained. The main control circuit unit 20A is configured mainly with a 32-bit microprocessor 20 that collaborates with the program memory 25A, which is a nonvolatile flash memory, and a RAM memory 24 for calculation processing; the main control circuit unit 20A is further provided with a multichannel AD converter 26 for the analogue sensors in the first input sensor group 11a, a communication terminal 28 that is included in a second serial communication circuit, and an unillustrated serial-communication direct memory access controller (referred to as a DMA, hereinafter).

In addition, as the communication terminal 28, for example, a CAN (Controller-Area-Network) module capable of performing N-to-N bidirectional communication is utilized. A second input interface circuit 21 is connected between the first input sensor group 11a and an input port of the microprocessor 20 and formed of a lowpass filter for converting the level of a signal voltage and suppressing signal noise. A first output interface circuit 22 is connected between the first electric load group 12a and an output port of the microprocessor 20 and formed of a power transistor for driving various kinds of electric loads.

In addition, a control program and control constants, described later with reference to FIGS. 5 and 8, as well as a communication control program and an input/output control program are stored in the program memory 25A.

The monitoring control circuit unit 30A is configured mainly of the logic circuit unit 30a formed, for example, of a gate array; the logic circuit unit 30a is configured in such a way as to collaborate with a RAM memory 34 for calculation processing, a data memory 35A formed of a nonvolatile EEPROM memory or the like, and a multichannel AD converter 36 for the analogue sensors in the second input sensor group 11b. A second input interface circuit 31 is connected between the second input sensor group 11b and an input port of the logic circuit unit 30a and formed of a lowpass filter for converting the level of a signal voltage and suppressing signal noise.

A second output interface circuit 32 is connected between the second electric load group 12b and an output port of the logic circuit unit 30a and formed of a power transistor for driving various kinds of electric loads. In addition, the logic circuit unit 30a is to perform, through hardware, the monitoring and controlling in accordance with flowcharts, described later with reference to FIGS. 6 and 7, in addition to communication control of input/output signals, question information, and answer information. A power-supply circuit 33 is configured in such a way as to receive electric power from the external power source 13, to generate stabilized voltages such as DC 5[V], DC 3.3 [V], and the like, and to supply electric power to the main control circuit unit 20A, the monitoring control circuit unit 30A, and input and output interface circuits 21, 22, 31, and 32.

The electronic control apparatus 10B is configured in such a way that a first serial communication circuit, which are formed of a pair of serial-parallel converters 27 and 37, forms a full-duplex block communication circuit, and downlink communication information DND transmitted from the main control circuit unit 20A to the monitoring control circuit unit 30A and uplink communication information UPD transmitted from the monitoring control circuit unit 30A to the main control circuit unit 20A can concurrently be transmitted and received. A communication permission signal ALT generated by the main control circuit unit 20A and a communication synchronization signal CLK generated by the monitoring control circuit unit 30A will be described later with reference to FIG. 2.

A direct memory access controller provided in the main control circuit unit 20A is connected between the parallel input/output bus for the serial-parallel converter 27 included in the first serial communication circuit and the data bus for the microprocessor 20, and transmits data to and receives data from the RAM memory 24 for calculation processing, without the intermediary of the microprocessor 20.

The uplink communication information UPD, which is communication information to be stored in the RAM memory 24, includes, as represented in FIG. 3B(G), Q&A question information, input signal information obtained from the second input sensor group 11b, setting completion information described later, monitoring/tallying information, first flag information, and code check information.

The downlink communication information DND, which is communication information to be stored in the RAM memory 34, includes, as represented in FIG. 3B(H), Q&A answer information, setting information items, such as control constants, which are required by the monitoring control circuit unit 30A, output signal information for the second electric load group 12b, second flag information described later, and code check information.

In addition, the setting completion information in the uplink communication storage information UPD denotes the setting information and the output signal information that are stored in the RAM memory 34; the electronic control apparatus 10B is configured in such a way that the main control circuit unit 20A can ascertain whether or not the setting information and the output signal information have been transmitted correctly. The correct-solution information corresponding to question information is preliminarily stored in the data memory 35A when the product is shipped; the logic circuit unit 30a randomly transmits question information items and compares answer information items transmitted by the microprocessor 20 with corresponding correct-solution information items so as to monitor the operation status of the microprocessor 20; the microprocessor 20 intentionally sends an erroneous answer and counter-monitors whether or not the monitoring control circuit unit 30A performs appropriate monitoring and controlling.

As a result, when detecting an abnormality in the main control circuit unit 20A, the monitoring control circuit unit 30A initializes and restarts the main control circuit unit 20A by unit of a reset output RST2, and when detecting an abnormality in the monitoring control circuit unit 30A, the main control circuit unit 20A initializes and restarts the monitoring control circuit unit 30A by unit of a reset output RST1.

Additionally, the data memory 35A in which correct-solution information items are stored may be formed by a ROM memory, instead of an EEPROM, which is defined by a wiring pattern in the integrated circuit element that forms the monitoring control circuit unit 30A. In this case, a value, with which answer information that coincides with correct-solution information stored in a fixed manner can be obtained, is preliminarily calculated in a reverse manner, and then the reversely calculated value may be stored in the program memory 25A, as an actual numerical value in an input data table designated by question information.

An external control apparatuses 40 includes a transmission control unit (TCU) 41 that, as a collaborating supplementary apparatus, switches the transmission stages of a transmission in response to a vehicle speed and an accelerator position sensor; an electric power steering (EPS) system 42 that responds to the operation of a steering wheel; a stability control unit (SCU) 43 for controlling the posture of a vehicle; and an antilock brake system (ABS) 44 that responds to a foot brake pedal. The collaborating supplementary apparatuses 41 to 44 have respective supplementary-apparatus microprocessors 41a to 44a, respective supplementary-apparatus program memories 41b to 44b, and respective CAN modules 41c to 44c that serve as communication terminals for a second serial communication circuit. The collaborating supplementary apparatuses 41 to 44 are configured in such a way as to transmit to the main control circuit unit 20A an engine-torque increase/decrease demand correction value $\Delta\tau(=\Delta\tau 41$ to $\Delta\tau 44)$, in response to respective unillustrated signals that are conveyed to the collaborating supplementary apparatuses 41 to 44.

When receiving question information from the main control circuit unit 20A, the collaborating supplementary apparatuses 41 to 44 generate supplementary-apparatus answer information, based on respective external answer generation transmission unit, which are control programs stored in the supplementary-apparatus program memories 41b to 44b, and input data tables, and transmit the supplementary-apparatus answer information to the main control circuit unit 20A.

In addition, a test program for responding to question information in the external control apparatus 40 is a control program for calculating the engine-torque increase/decrease demand correction value $\Delta\tau(=\Delta\tau 41$ to $\Delta\tau 44)$ in response to an input signal to the external control apparatus 40.

Next, FIG. 2, which is a timing chart of serial communication in the in-vehicle electronic control apparatus illustrated in FIG. 1, will be explained. FIGS. 2(A), 2(B), 2(C), and 2(D) represent a communication permission signal ALT, a communication synchronization signal CLK, an uplink communication information UPD, and a downlink communication information DND, respectively. In FIG. 2(A), the communication permission signal ALT is a signal that is periodically transmitted, through an independent control signal line, from the main control circuit unit 20A to the monitoring control circuit unit 30A and with which the main control circuit unit 20A permits the start of full-duplex block communication; the communication permission signal ALT in Embodiment 1 is an alternate signal whose logic level changes at each communication permission timing.

Accordingly, each time the logic level of the alternate signal ALT changes, the transmission start of a new communication block is permitted; when a constant logic level is maintained, after communication of a predetermined bits is completed, the present communication ends, and when the logic level reverses before the completion of communication of the predetermined bits, interruption processing of communication data is performed. In FIG. 2(B), the communication synchronization signal CLK is transmitted, through an independent control signal line, from the monitoring control circuit unit 30A to the main control circuit unit 20A and has a train of pulses whose number corresponds to at least the number of the communication-information bits.

The communication synchronization signal CLK is a pulse train signal that starts to be generated after the elapse of a predetermined waiting time τ from the timing when the monitoring control circuit unit 30A has received the communication permission signal ALT; after the occurrence of the communication synchronization signal CLK, a serial communication signal starts to travel in a stepping manner. The generation of pulses in the communication synchronization signal CLK is stopped after a train of pulses of a predetermined number corresponding to the number of transmission/reception bits has been generated, or the generation of pulses is continued even after a train of pulses of the predetermined number has been generated, and the generation of pulses is temporarily stopped when the next communication permission signal ALT is generated; then, the generation of pulses is resumed after the elapse of the waiting time τ; in the case where the next communication permission signal ALT is generated before the predetermined number of pulses have been generated, the generation of the rest pulses is terminated, and after the elapse of the waiting time τ, the generation of pulses is resumed.

In FIG. 2(C), the uplink communication information UPD includes input signal information for the monitoring control circuit unit 30A or report information which is the storage information for a setting constant or a control output obtained from the main control circuit unit 20A, the present question information, and code check information; the data length thereof is, for example, 500 bits. In FIG. 2(D), the downlink communication information DND includes command information, which is a setting constant or a control output that is transmitted from the main control circuit unit 20A to the monitoring control circuit unit 30A and required by the monitoring control circuit unit 30A, the answer information for question information obtained from the immediately previous uplink communication information UPD, and the code check information; the data length thereof is, for example, 100 bits. Accordingly, in order to perform transmission and reception of all the data, it is required that the number of generated pulses in the communication synchronization signal CLK is at least 500.

In addition, while the communication permission period T0 of the communication permission signal ALT is, for example, 5 [msec], the time required to transmit or receive 500-bit data is, for example, 0.5 [msec]. The waiting time τ is 100 [μsec]; during the waiting time τ, an AD conversion command for the multichannel AD converter 36 is generated and AD conversions for all channels are completed.

In contrast, in a cycle period of, for example, 40 [msec], the main control circuit unit, 20A performs reception or transmission of question or answer information from or to the external control apparatus 40, or the answer information corresponding to question information is generated inside the main control circuit unit 20A. Accordingly, the monitoring control circuit unit 30A is provided with a question information updating unit 704 describe later; the question information updating unit 30A recurrently transmits question information included in the uplink communication information UPD in such a way that the question information is the same in a plurality times of communication instances and after transmitting of the question information for a predetermined duration, updates the question information.

Next, FIGS. 3A and 3B, which are each part of a set of content lists representing the relationship between various kinds of memories and logic blocks in the in-vehicle electronic control apparatus 10A illustrated in FIG. 1, will be explained. FIG. 3A(A) is a table in which control programs and control constants stored in the nonvolatile program memory 25A are listed; the details thereof will be described later with reference to flowcharts represented in FIGS. 5 and 8. FIG. 3A(B) is a table in which logic blocks, each formed of hardware, in the logic circuit unit 30a are represented; the detailed functions thereof will be described later with reference to equivalent flowcharts, represented in FIGS. 6 and 7, for explaining the operations.

FIG. 3A(C) represents concurrent question information Qn (n=0, 1, 2, - - - , F) that is applied to Embodiment 1 and for which 16 or less input table numbers (n=0 to F) are designated, and the input tables are stored in the nonvolatile program memory 25A or in the supplementary-apparatus program memories 41b to 44b. FIG. 3B(D) represents synthesis answer information An, main-machine answer information A1n, and supplementary-apparatus answer information items A2n to A5n; the synthesis answer information is a numerical value of, for example, 16 bits or less, and other discrete answer information items A1n to A5n are a numerical value of 13 bits or less.

FIG. 3B(E) represents synthesis correct-solution information Rn, main-machine correct-solution information R1n, and supplementary-apparatus correct-solution information items R2n to R5n; the synthesis correct-solution information is a numerical value of, for example, 16 bits or less, and other discrete correct-solution information items R1n to R5n are a numerical value of 13 bits or less. FIG. 3B(F) is a table in which the contents of the data memory 35A provided in the monitoring control circuit unit 30A are represented. FIG. 3B(G) is a list of uplink communication information items to be stored in the RAM memory 24. FIG. 3B(H) is a list of downlink communication information items to be stored in the RAM memory 34.

In addition, the most important characteristic of Embodiment 1 is that, while the nonvolatile program memory 25A is provided with the supplementary-apparatus correct-solution information items R2n to R5n and an external-apparatus monitoring unit, the monitoring control circuit unit 30A has only the synthesis correct-solution information, whereby the control load on the monitoring control circuit unit 30A is lightest. Accordingly, the main control circuit unit 20A transmits to the monitoring control circuit 30A corrected answer information generated by a corrected answer generation unit.

FIG. 4 is a transition chart for question information and answer information in the in-vehicle electronic control apparatus 10A illustrated in FIG. 1. Next, FIG. 4 will be explained. FIGS. 4(A), 4(B), 4(C), 44(D), 4(E), 4(F), and 4(G) represent respective transitions of question information items and answer information items with regard to the monitoring control circuit unit 30A, the main control circuit unit 20A, the microprocessor 20 and the communication terminal 28 of the second serial communication circuit, the transmission control unit (TCU) 41 which is a collaborating supplementary apparatus, the electric power steering (EPS) system 42 which is a collaborating supplementary apparatus, the stability control unit (SCU) 43 which is a collaborating supplementary apparatus, and the antilock brake system (ABS) 44 which is a collaborating supplementary apparatus. In addition, in the following explanation, the transmission control unit (TCU) 41, the electric power steering (EPS) system 42, the stability control unit (SCU) 43, and the antilock brake system (ABS) 44 are referred to simply as the collaborating supplementary apparatuses 41, 42, 43, and 44.

In a time zone t1 represented in FIG. 4, the monitoring control circuit unit 30A in FIG. 4(A) generates concurrent question information Qn(n=0 to F), and the main control circuit unit 20A in FIG. 4(B) receives the concurrent question information Qn via the first serial communication circuit. In a time zone t2 represented in FIG. 4, the main control circuit unit 20A in FIG. 4(B) transmits the concurrent question information Qn to the collaborating supplementary apparatuses 41, 42, 43, and 44 in FIGS. 4(D), 4(E), 4(F), and 4(G), via microprocessor 20 and the second serial communication terminal 28 in FIG. 4(C).

In a time zone t3 represented in FIG. 4, the main control circuit unit 20A in FIG. 4(B) generates main-machine answer information A1n. Next, in a time zone t4, the collaborating supplementary apparatus 41 in FIG. 4(D) generates supplementary-apparatus answer information A2n and transmits the supplementary-apparatus answer information A2n to the main control circuit unit 20A in FIG. 4(B) via the second serial communication circuit in FIG. 4(C). The main control circuit unit 20A compares the transmitted supplementary-apparatus answer information A2n with the supplementary-apparatus correct-solution information R2n that has been stored in the nonvolatile program memory 25A, and determines whether or not there exists an abnormality in the supplementary-apparatus answer information A2n. Next, in a time zone t5, the collaborating supplementary apparatus 42 in FIG. 4(E) generates supplementary-apparatus answer information A3n and transmits the supplementary-apparatus answer information A3n to the main control circuit unit 20A in FIG. 4(B) via the second serial communication circuit in FIG. 4(C). The main control circuit unit 20A compares the transmitted supplementary-apparatus answer information A3n with the supplementary-apparatus correct-solution information R3n that has been stored in the nonvolatile program memory 25A, and determines whether or not there exists an abnormality in the supplementary-apparatus answer information A3n.

Next, in a time zone t6 represented in FIG. 4, the collaborating supplementary apparatus 43 in FIG. 4(F) generates supplementary-apparatus answer information A4n and transmits the supplementary-apparatus answer information A4n to the main control circuit unit 20A in FIG. 4(B) via the second serial communication circuit in FIG. 4(C). The main control circuit unit 20A compares the transmitted supplementary-apparatus answer information A4n with the supplementary-apparatus correct-solution information R4$n$ that has been stored in the nonvolatile program memory 25A, and determines whether or not there exists an abnormality in the supplementary-apparatus answer information A4$n$. In a time zone t7, the collaborating supplementary apparatus 44 in FIG. 4(G) generates supplementary-apparatus answer information A5$n$ and transmits the supplementary-apparatus answer information A5$n$ to the main control circuit unit 20A in FIG. 4(B) via the second serial communication circuit in FIG. 4(C). The main control circuit unit 20A compares the transmitted supplementary-apparatus answer information A5$n$ with the supplementary-apparatus correct-solution information R5$n$ that has been stored in the nonvolatile program memory 25A, and determines whether or not there exists an abnormality in the supplementary-apparatus answer information A5$n$.

Next, in a time zone t8, the main control circuit unit 20A in FIG. 4(B) generates a corrected answer An described later and transmits the corrected answer An to the monitoring control circuit unit 30A in FIG. 4(A) via the first serial communication circuit. The monitoring control circuit unit 30A compares the transmitted corrected answer An with the synthesis correct-solution information that has been stored in the data memory 35A, and determines whether or not there exists an abnormality in the corrected answer An; in the case where there exists an abnormality in the corrected answer An, the monitoring control circuit unit 30A generates a reset output described later in a time zone t9, in response to the result of tallying the abnormalities that have occurred.

In the time zone t8, for example, when there exists no abnormality in the transmission control unit (TCU) 41 in FIG. 4(D), the electric power steering (EPS) system 42 in FIG. 4(E), the stability control unit (SCU) 43 in FIG. 4(F), and the antilock brake system (ABS) 44 in FIG. 4(G) that are collaborating supplementary apparatuses, the corrected answer An generated by the main control circuit unit 20A in FIG. 4(B) is A1$n$+A2$n$+A3$n$+A4$n$+A5$n$; however, if supplementary-apparatus answer information A2$n$ generated by the transmission control unit (TCU) 41 in FIG. 4(D) differs from the supplementary-apparatus correct-solution information R2$n$, it is determined that an abnormality exists in the transmission control unit (TCU) 41, and instead of A2$n$, R2$n$ is utilized, whereby An(=A1$n$+R2$n$+A3$n$+A4$n$+A5$n$) is transmitted to the monitoring control circuit unit 30A in FIG. 4(A).

Similarly, when abnormalities exist in some of the electric power steering (EPS) system 42 in FIG. 4(E), the stability control unit (SCU) 43 in FIG. 4(F), and the antilock brake system (ABS) 44 in FIG. 4(G) that are other collaborating supplementary apparatuses, the corresponding supplementary-apparatus correct-solution information items among R2$n$ to R5$n$ are utilized instead of the supplementary-apparatus answer information items, among A2$n$ to A5$n$, in which abnormalities exist. Accordingly, as long as the main-machine answer information A1$n$ from the main control circuit unit 20A is normal and the main control circuit unit 20A normally performs detection of an abnormality in the external control apparatus 40, the synthesis correct-solution information An transmitted to the monitoring control circuit unit 30A coincides with the synthesis correct-solution information Rn stored in the data memory 35A, even if an abnormality occurs in any one of the supplementary apparatuses in the external control apparatus 40; therefore, the monitoring control circuit unit 30A does not determine that an abnormality exists.

However, if the main-machine answer information A1$n$ from the main control circuit unit 20A is abnormal, the synthesis correct-solution information An transmitted to the monitoring control circuit unit 30A does not coincide with the synthesis correct-solution information Rn stored in the data memory 35A; thus, the monitoring control circuit unit 30A determines that the main control circuit unit 20A is abnormal.

Accordingly, in the case of Embodiment 1, the main control circuit unit 20A monitors an abnormality in the external control apparatus 40, and even if an abnormality occurs, the monitoring control circuit unit 30A does not recognize it. However, in the case where an abnormality occurs in the external control apparatus 40 and the main control circuit unit 20A neither correctly recognizes it nor performs answer correction processing, the monitoring control circuit unit 30A detects the abnormality and deals with it as an abnormality in the main control circuit unit 20A.

In addition, an external answer generation transmission unit 400 that generates the supplementary-apparatus answer information items A2$n$ to A5$n$ and transmits them to the main control circuit unit 20A is performed in accordance with control programs stored in the supplementary-apparatus program memories 41$b$ to 44$b$ in the collaborating supplementary apparatuses 41 to 44. The total time period from the time zone t1 to the time zone t9 is, for example, 40 [msec]; when this series of operations is completed, the concurrent question information is updated to Qn+1; and the same abnormality monitoring is repeated based on new question information.

(2) Detailed Explanation For Work and Operation of Embodiment 1

Figure 5A:
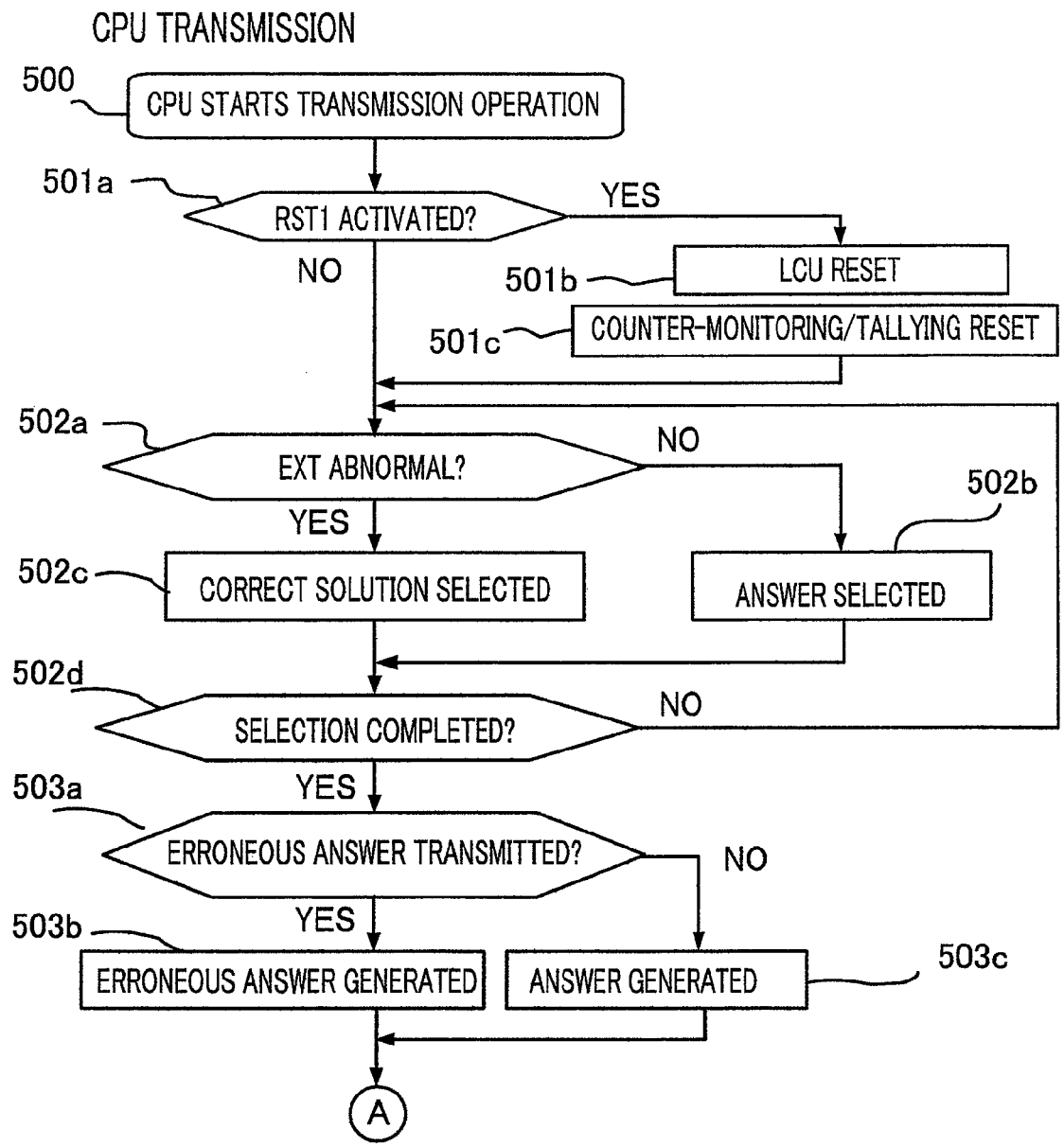
FIGS. 5A and 5B are each part of a flowchart representing the transmission operation of a main control circuit unit in an in-vehicle electronic control apparatus, having a monitoring control circuit, according to Embodiment 1 of the present invention.
Figure 5B:
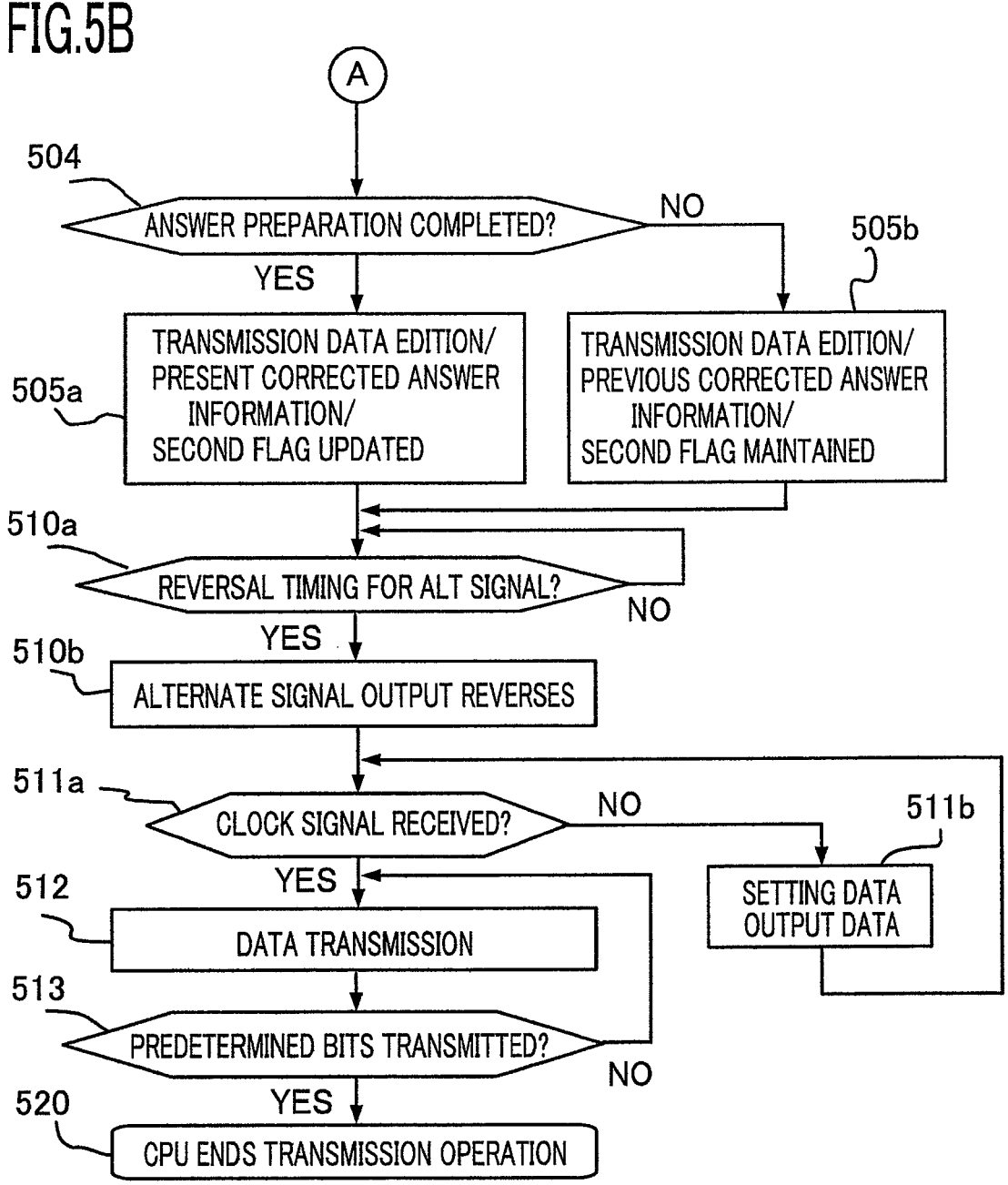
Figure 6:
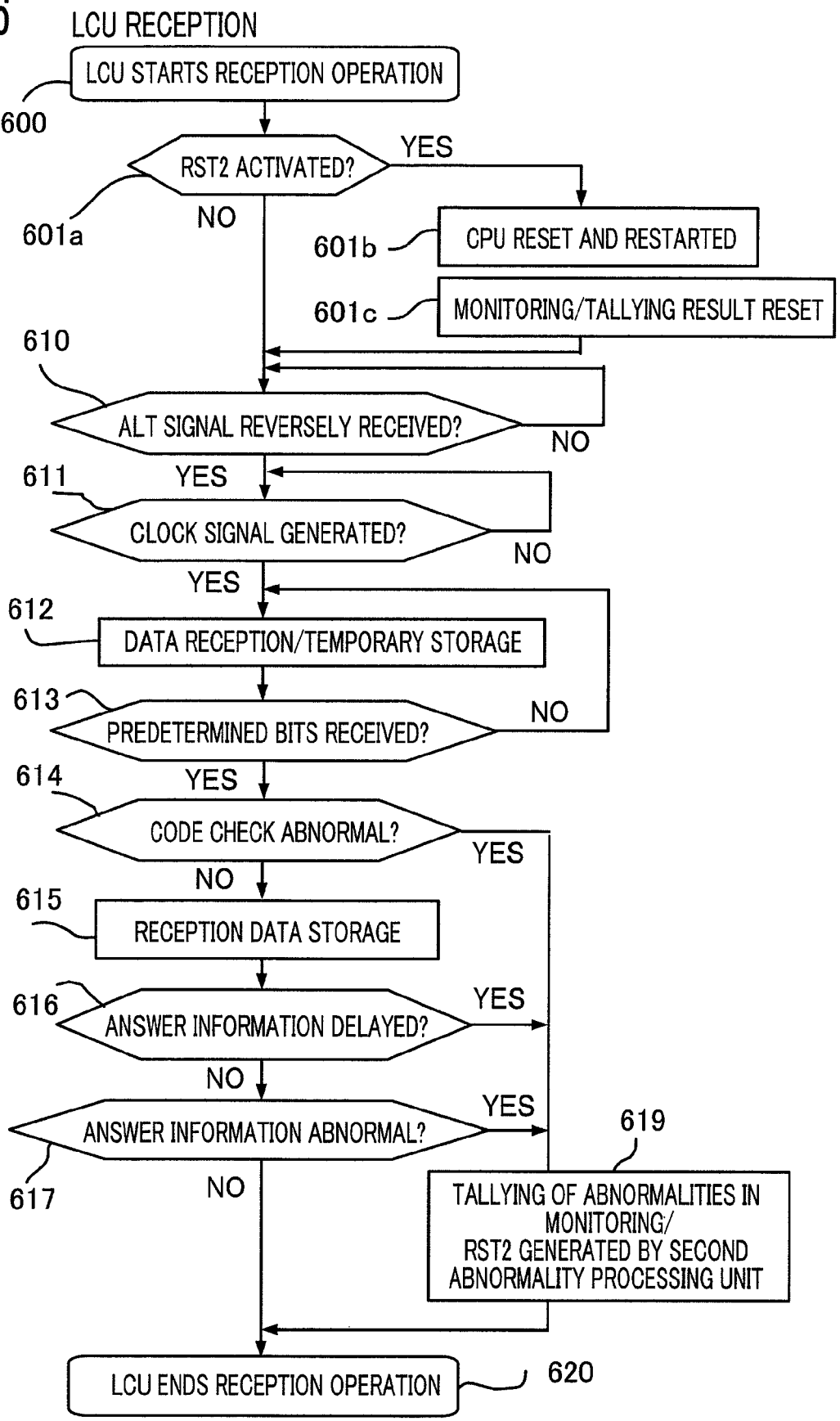
FIG. 6 is a flowchart representing the reception operation of a monitoring control circuit unit in an in-vehicle electronic control apparatus, having a monitoring control circuit, according to Embodiment 1 of the present invention.
Figure 7:
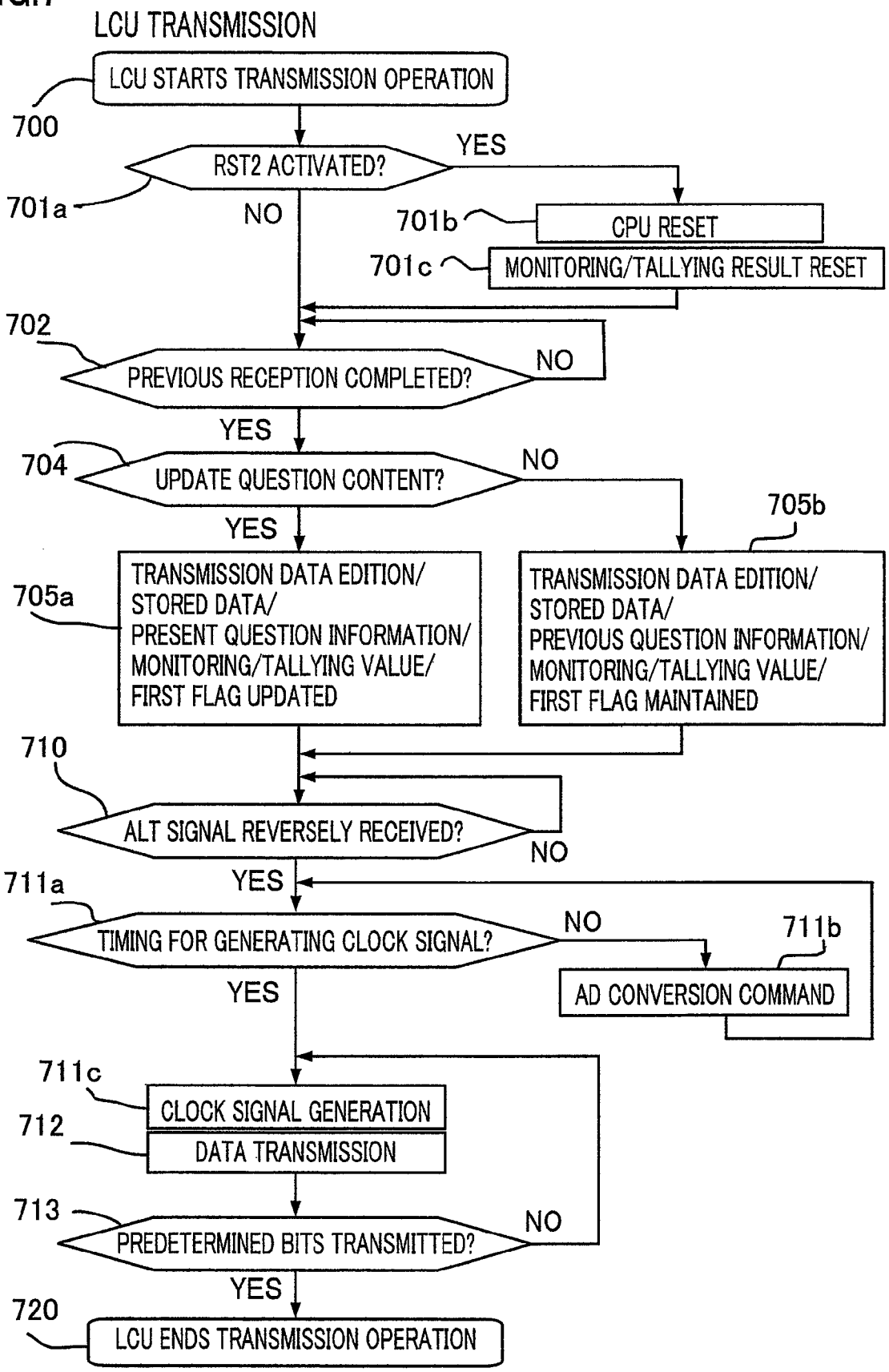
FIG. 7 is a flowchart representing the transmission operation of a monitoring control circuit unit in an in-vehicle electronic control apparatus, having a monitoring control circuit, according to Embodiment 1 of the present invention.
Figure 8B:
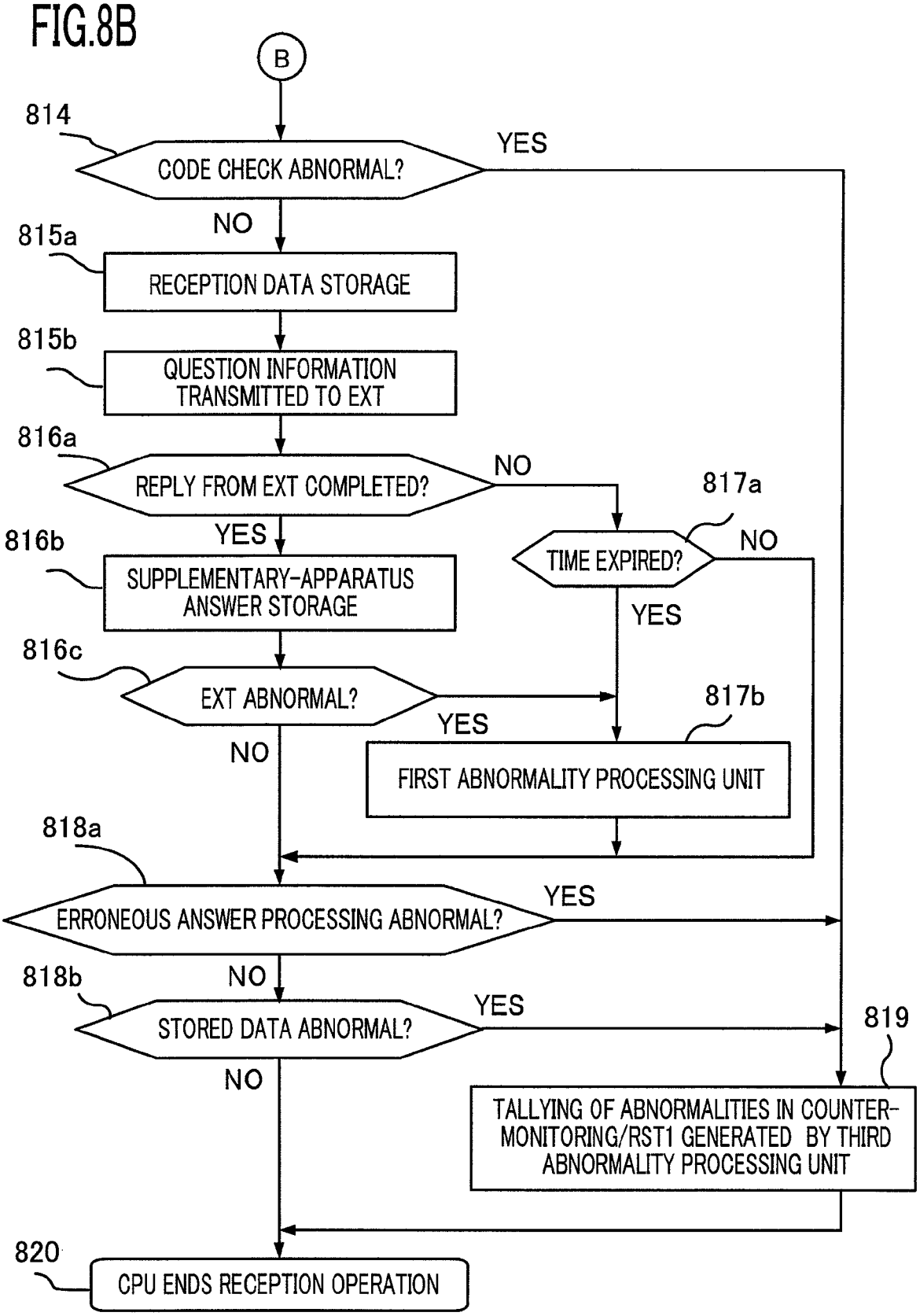

The work and operation of the in-vehicle electronic control apparatus, configured as illustrated in FIG. 1 and having a monitoring control circuit according to Embodiment 1 of the present invention, will be explained below. FIGS. 5A and 5B are each part of a flowchart representing the transmission operation of the main control circuit unit 20A; FIG. 6 is a flowchart representing the reception operation of the monitoring control circuit unit 30A; FIG. 7 is a flowchart representing the transmission operation of the monitoring control circuit unit 30A; FIGS. 8A and 8B are each part of a flowchart representing the reception operation of the main control circuit unit 20A.

First, in FIG. 1, when the external power source 13 is connected through an unillustrated power switch to the electronic control apparatus 10A, the microprocessor 20 drives and controls the first electric load group 12$a$ and the second electric load group 12$b$, based on the operation statuses of the first input sensor group 11$a$ and the second input sensor group 11$b$ and the contents of a control program in the program memory 25A.

In particular, the first input sensor group 11$a$ and the first electric load group 12$a$ perform open/close and on/off operations, in synchronization with the rotation of the engine; for example, in the case where a 4-cylinder and 4-cycle gasoline engine rotates at a rotation speed of 6000 [rpm], the ignition control and the fuel injection control are performed in a cycle period of 5 [msec]; however, in the case where the rotation speed of the engine is 600 [rpm], the foregoing controls may be performed in a cycle period of 50 [msec].

In contrast, because not performing operations in synchronization with the rotation of the engine, the second input sensor group 11$b$ and the second electric load group 12$b$ do not perform frequent operations; however, because, when the operation status changes, signal communication is required to be rapidly performed, it is desirable that communication with a constant cycle period is relatively frequently performed regardless of the rotation speed of the engine.

Next, the transmission operation of the main control circuit unit 20A illustrated in FIG. 1 will be explained with reference to FIGS. 5A and 5B. In FIG. 5A, the step 500 is a step in which the microprocessor 20 starts its transmission operation for the monitoring control circuit unit 30A. In the step 501a, it is determined whether or not the reset output RST1 has been generated in the step 819 (refer to FIG. 8B) described later; in the case where the reset output RST1 has been generated, a determination "YES" is made and the step 501a is followed by the step 501b, and in the case where the reset output RST1 has not been generated, a determination "NO" is made and the step 501a is followed by the step 502a.

In the step 501b, the monitoring control circuit unit 30A is initialized to be restarted; in the step 501c, by resetting the result of tallying, performed in the step 819 described later, of abnormalities in counter-monitoring, the reset output RST1 is halted, and the step 501c is followed by the step 502a. In the step 502a, the operation status of a determination flag, in which there is stored whether or not an abnormality in any one of the collaborating supplementary apparatuses 41 to 44 has been detected in the step 816c (refer to FIG. 8B) described later, is monitored; in accordance with whether or not an abnormality is caused in any one of the collaborating supplementary apparatuses 41 to 44, the step 502a is followed by the step 502b or 502c.

In the case where the collaborating supplementary apparatuses are normal, the supplementary-apparatus answer information items A2n to A5n stored in the step 816b (refer to FIG. 8B) described later are selected in the step 502b; in the case where the collaborating supplementary apparatuses are abnormal, the supplementary-apparatus correct-solution information items R2n to R5n are selected in the step 502c, and then the step 502c is followed by the step 502d.

In the step 502d, it is determined whether or not the answer selection in the steps 502a to 502c has been applied to all the collaborating supplementary apparatuses 41 to 44; in the case where the answer selection has not been applied to all the collaborating supplementary apparatuses 41 to 44, a "NO" determination is made and the step 502a is resumed; in the case where the answer selection has been applied to all the collaborating supplementary apparatuses 41 to 44, a "YES" determination is made and the step 502d is followed by the step 503a. In the step 503a, it is determined whether or not the present timing is a timing for transmitting an intentionally erroneous answer; in the case where the erroneous-answer transmission is carried out, a determination "YES" is made and the step 503a is followed by the step 503b, and in the case where the erroneous-answer transmission is not carried out, a determination "NO" is made and the step 503a is followed by the step 503c.

In addition, in the step 503a, a single determination "YES" is made for a plurality of updating question information items; however, in the case where the result of tallying, performed in the step 619 (refer to FIG. 6) described later, of abnormalities in counter-monitoring suggests that the reset pulse RST2 is about to be generated, a determination "NO" is made so that an erroneous-answer transmission does not cause the reset pulse RST2 to occur.

In the step 503b corresponding to an erroneous-answer transmission unit, as the present answer information, an intentionally erroneous answer is selectively decided; in the step 503c corresponding to a main-machine answer generation unit, the main-machine answer information for an already received question information is continued to be generated. In the step 504, which is carried out after the step 503b or the step 503c, it is determined whether or not the answer generation in the step 503c has been completed or whether or not the erroneous-answer selection in the step 503b has been decided; in the case where the answer generation or the erroneous-answer selection has been completed, a "YES" determination is made and the step 504 is followed by the step 505a; in the case where neither the answer generation nor the erroneous-answer selection has been completed, a "NO" determination is made and the step 504 is followed by the step 505b.

The step 505a corresponding to a corrected answer generation unit is a step in which not only the present answer information is decided, but also the content of second flag information F is updated. In addition, in the step 505a, as the synthesis answer information An to be transmitted to the monitoring control circuit unit 30A, a combined tallied value is generated from the main-machine answer information A1n and the supplementary-apparatus answer information items A2n to A5n; however, in some cases, the supplementary-apparatus correct-solution information items R2n to R5n that are selected in the step 502c are utilized instead of the supplementary-apparatus answer information items A2n to A5n. In the step 505b, as the present answer information, the previous answer information is directly utilized, and it is decided that the second flag information F is not updated.

Next, the step 510a, which is carried out after the step 505a or the step 505b, is a waiting step in which it is determined whether or not the present timing is a timing for reversing the logic of an alternate signal ALT, which is a communication permission signal; in the case where the present timing is a timing for reversing the logic of the communication permission signal ALT, a "YES" determination is made and the step 510a is followed by the step 510b; in the case where the present timing is not a timing for reversing the logic of the communication permission signal ALT, a "NO" determination is made and the step 510a is resumed. In addition, in the step 510a, the reversal operation is performed, for example, in a cycle period of 5 [msec]; however, because the microprocessor 20 performs interrupting control operation for controlling the inputs and the outputs, the cycle period 5 [msec] of the reversal operation is varied.

In the step 510b, the logic level of the alternate signal ALT is reversed; after that the step 510b is followed by the step 511a. In the step 511a, which is a determination step, it is determined whether or not the communication synchronization signal CLK generated by the monitoring control circuit unit 30A has been received; in the case where the communication synchronization signal CLK has not been received, a "NO" determination is made and the step 511a is followed by the step 511b; in the case where the communication synchronization signal CLK has been received, a "YES" determination is made and the step 511a is followed by the step 512. In the step 511b, setting data and output signal data to be transmitted to the monitoring control circuit unit 30A are edited; after that, the step 511a is resumed within the waiting time τ represented in FIG. 2.

In the step 512, while collaborating with the DMA which is a serial-communication direct memory access controller, the microprocessor 20 sequentially transfers, for example, in steps of 8 bits, transmission data in the downlink communication information DND from the RAM memory 24 to the serial-parallel converter 27. In the step 513, an unillustrated clock counter counts the number of occurrences of the communication synchronization signal CLK so that it is determined whether or not a predetermined number of bits have been transmitted; in the case where the predetermined number of bits have not been transmitted, a determination "NO" is made and the step 512 is resumed, and in the case where the predetermined number of bits have been transmitted, a determination "YES" is made and the step 513 is followed by the operation end step 520.

In addition, in the step 512, code check information is added as final information, so that, by applying a code check unit exemplified by the CRC check or the sum check to all transmitted data items, the occurrence of the intrusion of bit information (the logic "0" is erroneously replaced by the logic "1") or the loss of bit information (the logic "1" is erroneously replaced by the logic "0") is detected at the receiving side.

In the operation end step 520, other control operations are performed; after that, the step 520 is circularly followed by the operation start step 500 within a predetermined time.

Next, the reception operation of the monitoring control circuit unit 30A illustrated in FIG. 1 will be explained. In FIG. 6, the step 600 is an operation start step in the case where the reception logic operation of the logic circuit unit 30a in the monitoring control circuit unit 30A is represented with a flowchart. In the step 601a, it is determined whether or not the reset output RST2 has been generated in the step 619 described later; in the case where the reset output RST2 has been generated, a determination "YES" is made and the step 601a is followed by the step 601b, and in the case where the reset output RST2 has not been generated, a determination "NO" is made and the step 601a is followed by the step 610.

In the step 601b, the microprocessor 20 is initialized to be restarted; in the step 601c, by resetting the result of tallying, performed in the step 619 described later, of abnormalities in monitoring, the reset output RST2 is halted, and the step 601c is followed by the step 610. In the step 610, which is a waiting step, it is determined whether or not the alternate signal ALT, which is a communication permission signal transmitted from the main control circuit unit 20A, has logically reversed; in the case where the alternate signal ALT has logically reversed, a "YES" determination is made and the step 610 is followed by the step 611; in the case where the alternate signal ALT has not logically reversed, a "NO" determination is made and the step 610 is resumed.

In the step 611, which is a waiting step, it is determined whether or not the generation of the communication synchronization signal CLK has been started in the step 711c (refer to FIG. 7) described later; in the case where the generation of the communication synchronization signal CLK has been started, a "YES" determination is made and the step 611 is followed by the step 612; in the case where the generation of the communication synchronization signal CLK has not been started, a "NO" determination is made and the step 611 is resumed. In the step 612, reception data in the downlink communication information DND is sequentially transferred, for example, in steps of 8 bits, from the serial-parallel converter 37 to the RAM memory 34 and temporarily stored therein. In the step 613, an unillustrated clock counter counts the number of occurrences of the communication synchronization signal CLK so that it is determined whether or not a predetermined number of bits have been received; in the case where the predetermined number of bits have not been received, a "NO" determination is made and the step 612 is resumed; in the case where the predetermined number of bits have been received, a "YES" determination is made and the step 613 is followed by the step 614.

In the step 614 corresponding to a code error detection unit, by use of the code check data added in the step 512, it is checked by the CRC check or the sum check whether or not an abnormality such as the intrusion of bit information or the loss of bit information has been caused in the received downlink communication information DND; in the case where an abnormality has been caused, a "YES" determination is made and the step 614 is followed by the step 619; in the case where no abnormality has been detected, a determination "NO" is made and the step 614 is followed by the step 615.

In the step 615, the reception data, which has temporarily been stored in the step 612, is stored as effective data; after the effective data is transferred as setting information and output signal information, the step 615 is followed by the step 616. In the step 616 corresponding to a response delay determination unit, it is determined whether or not the answer information corresponding to question information has been received and stored in the step 615, within a predetermined time after the question information has been updated in the step 705a (refer to FIG. 7) described later; in the case where the answer information has not been received within the predetermined time, a "YES" determination is made and the step 616 is followed by the step 619; in the case where the answer information has been received within the predetermined time, a "NO" determination is made and the step 616 is followed by the step 617.

In the step 617 corresponding to a total abnormality determination unit, it is determined whether or not the answer information stored in the step 615 coincides with the synthesis correct-solution information preliminarily stored in the data memory 35A; in the case where the answer information stored in the step 615 does not coincide with the synthesis correct-solution information, a "YES" determination is made and the step 617 is followed by the step 619; in the case where the answer information stored in the step 615 coincides with the synthesis correct-solution information, a "NO" determination is made and the step 617 is followed by the step 620.

In the step 619 corresponding to a reset processing unit that is formed of an unillustrated error counter, each time an abnormality determination "YES" is made in the step 614, 616, or 617, the present counter value of the error counter increases, for example, by five, and each time a normality determination "NO" is made in the step 614, 616, or 617, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in monitoring; when the result of the tallying in monitoring exceeds, for example, 11; the reset output RST2 is generated, and the microprocessor 20 is initialized to be restarted in the step 601b or the step 701b described later; this corresponds to a restart processing which is a second abnormality processing unit. In the operation end step 620 that follows the step 619, other controls are performed, and then the operation start step 600 is resumed.

Next, the transmission operation of the monitoring control circuit unit 30A illustrated in FIG. 1 will be explained. In FIG. 7, the step 700 is an operation start step in the case where the transmission logic operation of the logic circuit unit 30a in the monitoring control circuit unit 30A is represented with a flowchart. In the step 701a, it is determined whether or not the reset output RST2 has been generated in the step 619 described above; in the case where the reset output RST2 has been generated, a determination "YES" is made and the step 701a is followed by the step 701b, and in the case where the reset output RST2 has not been generated, a determination "NO" is made and the step 701a is followed by the step 702. In the step 701b, the microprocessor 20 is initialized to be restarted; in the step 701c, by resetting the result of tallying, performed in the step 619 described above, of abnormalities in monitoring, the reset output RST2 is halted, and then the step 701c is followed by the step 702.

In the step 702, it is determined whether or not the immediately previous reception has been completed in the step 612 described above; in the case where the immediately previous reception has not been completed, a "NO" determination is made and the step 702 is resumed; in the case where the immediately previous reception has been completed, a "YES" determination is made and the step 702 is followed by the step 704. In the step 704 corresponding to a question information updating unit, it is determined whether or not the present timing is a timing for updating the contents of a question information; in the case where the present timing is a timing for updating the contents of a question information, a "YES" determination is made and the step 704 is followed by the step 705*a*; in the case where the present timing is not a timing for updating the contents of a question information, a "NO" determination is made and the step 704 is followed by the step 705*b*. In the step 704, a determination "YES" is made in a question updating cycle period Tq, for example, of 40 [msec].

The step 705*a* corresponding to a question information generation unit is a step in which, as the present transmission information, the respective contents of storage information items such as setting information and output signal information that have been determined and stored in the step 615 described above, the present updated question information, a tallied number of abnormalities in monitoring, tallied in the step 619 described above, and first flag information that is changed to a value different from the previous value are edited to be in predetermined transmission order. The step 705*b* is a step in which, as the present transmission information, the respective contents of storage information items such as setting information and output signal information that have been determined and stored in the step 615 described above, the immediately previous question information, a tallied number of abnormalities in monitoring, tallied in the step 619 described above, and the first flag information that is the same as the immediately previous value are edited to be in predetermined transmission order.

In the step 710 that is carried out after the step 705*a* or the step 705*b*, it is determined whether or not the alternate signal ALT has logically reversed; in the case where the alternate signal ALT has not logically reversed, a "NO" determination is made and the step 710 is resumed; in the case where the alternate signal ALT has logically reversed, a "YES" determination is made and the step 710 is followed by the step 711*a*. In the step 711*a*, it is determined whether or not the present timing is a timing for generating the communication synchronization signal CLK; in the case where the predetermined waiting time τ has not elapsed after the reversal, in the step 710, of the logic of the alternate signal ALT, a determination "NO" is made and the step 711*a* is followed by the step 711*b*, and in the case where the predetermined waiting time τ has elapsed, a determination "YES" is made and the step 711*a* is followed by the step 711*c*.

In the step 711*b*, the AD conversion command is issued to the multichannel AD converter 36, and the obtained latest AD conversion information is started to be edited as input data to be transmitted to the main control circuit unit 20A; after that, the step 711*a* is resumed within the waiting time τ represented in FIG. 2.

In addition, the waiting time τ ends at the timing of the reception of an AD conversion completion signal from the multichannel AD converter 36, at the timing when the time required for all-channel AD conversion has elapsed, or after such a delay time as the AD conversion has been completed before the transmission of the AD converted input signals is started; after that the step 711*a* is followed by the step 711*c*, where the monitoring control circuit unit 30A starts to generate the communication synchronization signal CLK.

In the step 711*c*, the generation of the communication synchronization signal CLK is started; in the step 712, transmission data in the uplink communication information UPD is sequentially transferred from the RAM memory 34 to the serial-parallel converter 37. In the step 713, an unillustrated clock counter counts the number of occurrences of the communication synchronization signal CLK so that it is determined whether or not a predetermined number of bits have been transmitted; in the case where the predetermined number of bits have not been transmitted, a "NO" determination is made and the step 711 is resumed; in the case where the predetermined number of bits have been transmitted, a determination "YES" is made and the step 713 is followed by the operation end step 720.

In addition, in the step 712, code check information is added as final information, so that, by applying a code check unit exemplified by the CRC check or the sum check to all transmitted data items, the occurrence of the intrusion of bit information (the logic "0" is erroneously replaced by the logic "1") or the loss of bit information (the logic "1" is erroneously replaced by the logic "0") is detected at the receiving side.

In the operation end step 720, other control operations are performed; after that, the step 720 is circularly followed by the operation start step 700 within a predetermined time.

Next, the reception operation of the main control circuit unit 20A illustrated in FIG. 1 will be explained. In FIG. 8A, the step 800 is a step in which the microprocessor 20 starts its operation of receiving information from the monitoring control circuit unit 30A. In the step 801*a*, it is determined whether or not the reset output RST1 has been generated in the step 819 described later; in the case where the reset output RST1 has been generated, a determination "YES" is made and the step 801*a* is followed by the step 801*b*, and in the case where the reset output RST1 has not been generated, a determination "NO" is made and the step 801*a* is followed by the step 810.

In the step 801*b*, the monitoring control circuit unit 30A is initialized to be restarted; in the step 801*c*, by resetting the result of tallying, performed in the step 819 described later, of abnormalities in counter-monitoring, the reset output RST1 is halted, and the step 801*c* is followed by the step 810. In the step 810, which is a waiting step, it is determined whether or not the alternate signal ALT has logically reversed in the step 510*b* described above; in the case where the alternate signal ALT has logically reversed, a "YES" determination is made and the step 810 is followed by the step 811; in the case where the alternate signal ALT has not logically reversed, a "NO" determination is made and the step 810 is resumed.

In the step 811, which is a waiting step, it is determined whether or not the generation of the communication synchronization signal CLK has been started in the step 711*c* described above; in the case where the generation of the communication synchronization signal CLK has been started, a "YES" determination is made and the step 811 is followed by the step 812; in the case where the generation of the communication synchronization signal CLK has not been started, a "NO" determination is made and the step 811 is resumed. In the step 812, while collaborating with the DMA, the microprocessor 20 sequentially transfers reception data in the downlink communication information DND, for example, in steps of 8 bits, from the serial-parallel converter 27 to the RAM memory 24 and temporarily stores the reception data therein.

In the step 813, an unillustrated clock counter counts the number of occurrences of the communication synchronization signal CLK so that it is determined whether or not a predetermined number of bits have been received; in the case where the predetermined number of bits have not been received, a "NO" determination is made and the step 812 is resumed; in the case where the predetermined number of bits have been received, a "YES" determination is made and the step 813 is followed by the step 814.

In the step 814 corresponding to a code error detection unit, by use of the code check data added in the step 712, it is checked by the CRC check or the sum check whether or not an abnormality such as the intrusion of bit information or the loss of bit information has been caused in the received uplink communication information UPD; in the case where an abnormality has been caused, a "YES" determination is made and the step 814 is followed by the step 819; in the case where no abnormality has been detected, a determination "NO" is made and the step 814 is followed by the step 815a.

In the step 815a, the reception data, which has temporarily been stored in the step 812, is stored as effective data and made to be new input signal information; after that, the step 815a is followed by the step 818b. In addition, in the step 815a, the question information that has been decided in the step 705a or the step 705b and the first flag information are received and stored; in the step 815b, the updating question information Qn that has been received in the step 815a is transmitted to the collaborating supplementary apparatuses 41 to 44. The foregoing operation is performed in the time zone t2 represented in FIG. 4.

In the step 816a, it is determined whether or not the supplementary-apparatus answer information items A2n to A5n from the collaborating supplementary apparatuses 41 to 44 have been received; in the case where the supplementary-apparatus answer information items A2n to A5n have not been received, a "NO" determination is made and the step 816a is followed by the step 817a; in the case where the supplementary-apparatus answer information items A2n to A5n have been received, a "YES" determination is made and the step 816a is followed by the step 816b. In the step 816b, the received supplementary-apparatus answer information items A2n to A5n are stored in the RAM memory 24; after that, the step 816b is followed by the step 816c.

In the step 816c corresponding to an external-apparatus monitoring unit, the microprocessor 20 compares the received supplementary-apparatus answer information items A2n to A5n with the supplementary-apparatus correct-solution information items R2n to R5n that have been stored in the nonvolatile program memory 25A, and determines whether or not there exists an abnormality in the collaborating supplementary apparatuses 41 to 44; in the case where there exists no abnormality in the supplementary-apparatuses 41 to 44, a determination "NO" is made and the step 816c is followed by the step 818a; in the case where there exists an abnormality in the supplementary-apparatuses 41 to 44, a "YES" determination is made and the step 816c is followed by the step 817b.

In the step 817a, it is determined whether or not the response time between the timing when the concurrent question information Qn is transmitted to the collaborating supplementary apparatuses 41 to 44 in the step 815b and the timing when the supplementary-apparatus answer information items A2n to A5n are received has exceeded a predetermined threshold time; in the case where the response time has exceeded the predetermined threshold time, a "YES" determination is made and the step 817a is followed by the step 817b; in the case where the response time has not exceeded the predetermined threshold time, a "NO" determination is made and the step 817a is followed by the step 818a. In addition, in the case where it is determined in the step 817a that the response time has not exceeded the predetermined threshold time, while repeating a control flow from the step 800 to the step 820, the microprocessor 20 waits for the supplementary-apparatus answer information items A2n to A5n to be received.

The step 817b, an external apparatus abnormality processing unit, corresponds to a first abnormality processing unit that is performed based on discrete abnormality determination information, obtained in the step 816b, with regard to the external control apparatus 40; the microprocessor 20 does not respond at least to an increase demand out of engine output torque increase/decrease demand correction value Δτ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20A.

The step 818a corresponding to a tallied information monitoring unit is a unit in which, the change in the result, of tallying in monitoring, which has been received in the step 815a is monitored in response to the erroneous-answer information that has been transmitted, in the step 512, based on the step 503b so that it is counter-monitored whether or not the monitoring control circuit unit 30A normally operates; in the case where it is determined that there exists an abnormality in the monitoring control circuit unit 30A, a determination "YES" is made and the step 818a is followed by the step 819; in the case where it is determined that there exists no abnormality in the monitoring control circuit unit 30A, a determination "NO" is made and the step 818a is followed by the step 818b.

The step 818b corresponding to a stored-information abnormality detection unit is a step in which the storage state of the setting information and the output information that have been received and stored, as part of the downlink communication information DND, by the monitoring control circuit unit 30A in the step 615 and the acknowledgement information that has been received, as part of the uplink communication information UPD, by the main control circuit unit 20A in the step 815a are compared so that it is determined whether or not an abnormality exists; in the case where it is determined that there exists an abnormality, a determination "YES" is made and the step 818b is followed by the step 819; in the case where it is determined that there exists no abnormality, a determination "NO" is made and the step 818b is followed by the operation end step 820. In addition, in order to determine whether or not an abnormality exists in the storage information, it is required to store the immediately previous setting information and output transmission information in the main control circuit unit 20A; therefore, only some important data undergoes a coincidence determination.

In the step 819 corresponding to a reset processing unit that is formed of an unillustrated error counter, each time an abnormality determination "YES" is made in the step 814, 818, or 818, the present counter value of the error counter increases, for example, by five, and each time a normality determination "NO" is made in the step 814, 818, or 818, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in counter-monitoring; when the result of the tallying in counter-monitoring exceeds, for example, "11", the reset output RST1 is generated, and the monitoring control circuit unit 30A is initialized to be restarted in the step 501*b* or the step 801*b*. This corresponds to a restart processing which is a third abnormality processing unit.

In the operation end step 820 that follows the step 819, other controls are performed, and then the operation start step 800 is resumed.

(3) Gist and Features of Embodiment 1

As is clear from the foregoing explanation, the in-vehicle electronic control apparatus 10A according to Embodiment 1 of the present invention is provided with the main control circuit unit 20A that includes a nonvolatile program memory 25A; the RAM memory 24 for calculation processing; the first input interface circuit 21 to which the first input sensor group 11*a* is connected; the first output interface circuit 22 to which the first electric load group 12*a* is connected; and a microprocessor 20 that controls the first electric load group 12*a*, in response to contents of a control program stored in the non-volatile program memory 25A and an operation status of the first input sensor group 11*a*, and provided with the monitoring control circuit unit 30A that includes the question information generation unit 705*a* that is connected through the first serial communication circuits 27 and 37 to the microprocessor 20 and sequentially and selectively transmits a plurality of question information items; the correct-solution information storage memory 35A that stores the correct-solution information items for the question information items; and the abnormality determination unit 617 that compares the answer information, based on the question information, from the main control circuit unit 20A with the correct-solution information stored in the correct-solution information storage memory 35A so as to determine whether or not an abnormality exists.

The main control circuit unit 20A further collaborates with the external control apparatus 40 that is connected with the main control circuit unit 20A via the second serial communication circuit 28 and that receives control signals from and transmits control signals to the main control circuit unit 20A; the external control apparatus 40 is provided with the collaborating supplementary apparatuses 41, 42, 43, and 44 including the supplementary-apparatus microprocessors 41*a*, 42*a*, 43*a*, and 44*a*, respectively, that collaborate with the supplementary-apparatus program memories 41*b*, 42*b*, 43*b*, and 44*b*, respectively; the supplementary-apparatus program memories 41*b*, 42*b*, 43*b*, and 44*b* each have a control program corresponding to the external answer generation transmission unit 400 that generates the answer information items in response to the question information items Q*n*, Q2*n*, Q3*n*, Q4*n*, and Q5*n* transmitted from the main control circuit unit 20A and transmits the answer information items, as the supplementary-apparatus answer information items A2*n*, A3*n*, A4*n*, and A5*n*, to the main control circuit unit 20A.

The question information generation unit 705*a* generates concurrent question information Q*n* applied to the main control circuit unit 20A and all the external control apparatuses 40; the concurrent question information Q*n* is transmitted from the monitoring control circuit unit 30A to the main control circuit unit 20A; the concurrent question information Q*n* is transmitted to the external control apparatuses 40 via the main control circuit unit 20A. The nonvolatile program memory 25A further includes a control program corresponding to a main-machine answer generation unit 503*c* that generates the main-machine answer information A1*n* in accordance with the concurrent question information Q*n* or the discrete question information Q1*n* and a control program corresponding to a transmission answer edition unit 505*a* that transmits, in response to the concurrent question information Q*n*, the synthesis answer information A*n* obtained by combining and tallying the main-machine answer information A1*n* and the supplementary-apparatus answer information items A2*n*, A3*n*, A4*n*, and A5*n*.

In the correct-solution information storage memory 35A, there is stored the synthesis correct-solution information R*n* obtained by combining and tallying the main-machine correct-solution information R1*n* with regard to the main-machine answer information A1*n* generated by the main control circuit unit 20A and the supplementary-apparatus correct-solution information items R2*n*, R3*n*, R4*n*, and R5*n* for the supplementary-apparatus answer information items A2*n*, A3*n*, A4*n*, and A5*n*; the supplementary-apparatus correct-solution information items R2*n*, R3*n*, R4*n*, and R5*n* are stored in the nonvolatile program memory 25A.

The abnormality determination unit 617 performs abnormality monitoring of the main control circuit unit 20A, based on at least the concurrent question information Q*n* generated by the monitoring control circuit unit 30A; the main control circuit unit 20A and the monitoring control circuit unit 30A collaborate with each other so as to monitor and discriminate an abnormality in the external control apparatus 40; when an abnormality occurs in the external control apparatus 40, the main control circuit unit 20A performs self-protection through a first abnormality processing unit 817*b*; when an abnormality occurs in the main control circuit unit 20A, the monitoring control circuit unit 30A applies restart processing to the main control circuit unit 20A through a second abnormality processing unit 619.

In the nonvolatile program memory 25A, there is stored control programs corresponding to an external-apparatus monitoring unit 816*c* and a corrected answer generation unit 505*a*, the supplementary-apparatus correct-solution information items R2*n*, R3*n*, R4*n*, and R5*n* with regard to the supplementary-apparatus answer information items A2*n*, A3*n*, A4*n*, and A5*n*; the monitoring control circuit unit 30A is further provided with a total abnormality determination unit 617; the synthesis correct-solution information R*n* is stored in the correct-solution information storage memory 35A.

The external-apparatus monitoring unit 816*c* compares the supplementary-apparatus correct-solution information items R2*n*, R3*n*, R4*n*, and R5*n* with the supplementary-apparatus answer information items A2*n*, A3*n*, A4*n*, and A5*n* so as to determine whether or not an abnormality exists in the external control apparatus 40; in response to the concurrent question information Q*n* generated by the monitoring control circuit unit 30A, the corrected answer generation unit 505*a* firstly generates the synthesis answer information A*n* by combining the main-machine answer information A1*n* generated by the main control circuit unit 20A and the supplementary-apparatus answer information items A2*n*, A3*n*, A4*n*, and A5*n* generated by the external control apparatus 40 and transmits the synthesis answer information A*n* to the monitoring control circuit unit 30A; the corrected answer generation unit 505*a* serves as a transmission answer edition unit that combines the supplementary-apparatus correct-solution information items R2*n*, R3*n*, R4*n*, and R5*n* with regard to the supplementary-apparatus answer information items, in place of the supplementary-apparatus answer information items, when the supplementary-apparatus answer information items A2*n*, A3*n*, A4*n*, and A5*n* are abnormal.

The total abnormality determination unit 617 serves as an abnormality determination unit that compares the synthesis correct-solution information R*n* corresponding to the concurrent question information Q*n* generated by the monitoring control circuit unit 30A with the synthesis answer information A*n* received from the main control circuit unit 20A so as to perform a total abnormality determination including a determination whether or not there exists an abnormality in the main control circuit unit 20A itself and a determination whether or not the main control circuit unit 20A monitors an abnormality in the external control apparatus 40.

This configuration corresponds to the invention recited in claim 2; the main control circuit unit 20A has supplementary-apparatus correct-solution information and monitors the external apparatuses, and when there exists an abnormality in the external control apparatus, the main control circuit unit 20A corrects the synthesis answer information so as to obtain the correct-solution information and transmits the correct-solution information to the monitoring control circuit unit 30A; the monitoring control circuit unit 30A is provided with synthesis correct-solution information. Accordingly, the monitoring control circuit unit 30A can detect an abnormality in the main control circuit unit 20A itself by simply generating concurrent question information and comparing synthesis answer information with synthesis correct-solution information, and even in the case where an abnormality occurs in the external control apparatus 40 and the main control circuit unit 20A neither recognizes the abnormality nor transmits an appropriate corrected synthesis answer, the monitoring control circuit unit 30A can detect the abnormal state as an abnormality in the main control circuit unit 20A; therefore, the monitoring control circuit unit 30A can be simplified.

The question information Qn is a control program that corresponds to at least one of calculation expressions that are utilized in the microprocessor 20 and the microprocessors 41$a$, 42$a$, 43$a$, and 44$a$ in the external control apparatus 40 or a program the content of which is the same as that of the control program; the question information Qn designates copy programs stored in different addresses of the program memories 25A, 41$b$, 42$b$, 43$b$, and 44$b$, as test programs, and designates input constant table numbers corresponding to input data items utilized in the test programs; the actual numerical values of the input constant tables are stored in the nonvolatile program memory 25A and the supplementary-apparatus program memories 41$b$, 42$b$, 43$b$, and 44$b$ in the external control apparatus 40. The main control circuit unit 20A generates the main-machine answer information A1$n$, based on the calculation expression and the input constant designated by the concurrent question information Qn; the external control apparatus 40 transmits the calculation result based on the calculation expression and the input constant designated by the concurrent question information Qn, as the supplementary-apparatus answer information items A2$n$, A3$n$, A4$n$, and A5$n$, to the main control circuit unit 20A.

This configuration corresponds to the invention recited in claim 7; the test programs for the microprocessors provided in the main control circuit unit and the external control apparatus are determined, and the question information designates an input constant table number for selecting input constants for the test program. Accordingly, not only whether or not there exists an abnormality can be determined by performing simulated calculations for calculation operations themselves of the microprocessors provided in the main control circuit unit and the external control apparatus, but also input constant table numbers corresponding to the test programs can readily be designated by the concurrent question information.

The in-vehicle electronic control apparatus 10A is an engine control apparatus; the first input sensor group 11$a$ includes at least an accelerator position sensor that detects the depression degree of the acceleration pedal, a throttle position sensor that detects the opening degree of an air-intake valve, an airflow sensor that measures the air intake amount of an engine, and an engine rotation sensor for calculating the rotation speed of an engine; the first electric load group 12$a$ includes at least a motor for controlling the valve opening degree of an air-intake throttle and a fuel-injection electromagnetic valve. The test program in the main control circuit unit 20A is a control program for calculating the throttle-valve-opening-degree increase/decrease target correction value $\Delta\theta$ corresponding to the engine-output-torque increase/decrease demand correction value $\Delta\tau$ required by the external control apparatus 40; the external control apparatus 40 includes any one of the transmission control unit 41 that switches the transmission stage of the transmission in response to the vehicle speed and the accelerator position sensor, the electric power steering system 42 that responds to the operation of the steering wheel, the stability control unit 43 for controlling the vehicle posture, and the antilock brake system 44 that responds to the foot brake pedal; the external control apparatus 40 transmits the engine-torque increase/decrease demand correction value $\Delta\tau$ to the main control circuit unit 20A, via the second serial communication circuits 28, 41$c$, 42$c$, 43$c$, and 44$c$; the test program in the external control apparatus 40 is a control program for calculating the engine-torque increase/decrease demand correction value $\Delta\tau$ in response to an input signal to the external control apparatus 40.

This configuration corresponds to the invention recited in claim 8; in an engine control apparatus that controls the output torque of an engine in cooperation with related external apparatuses that affect the output torque of an engine, the control programs, in the units, related to the engine output torque are extracted so that abnormality monitoring is performed. Accordingly, by utilizing the monitoring control circuit unit provided in the main control circuit unit that is a main unit for controlling an engine, the condition of torque control can collectively be monitored.

The nonvolatile program memory 25A further incorporates a control program corresponding to an external apparatus abnormality processing unit 817$b$. The external apparatus abnormality processing unit 817$b$, which corresponds to a first abnormality processing unit that operates based on discrete abnormality determination information, on the external control apparatus 40, obtained through the external-apparatus monitoring unit 816$c$ in the main control circuit unit 20A, does not respond at least to an increase demand out of engine-output-torque increase/decrease demand correction value $\Delta\tau$ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20A.

This configuration corresponds to the invention recited in claim 9; in the case where an abnormality in the external control apparatus is detected, the main control circuit unit performs self-protection processing for the fail-safe purpose, through the first abnormality processing unit. Thus, the main control circuit unit does not directly control the external control apparatus; therefore, abnormality processing is prevented from affecting the overall system.

The monitoring control circuit unit 30A performs communication with regard to input/output signals, of the second input sensor group 11$b$ and the second electric load group 12$b$, which are part of input/output signals for the microprocessor 20, through the first serial communication circuits 27 and 37; the downlink communication information DND, which is transmitted from the main control circuit unit 20A to the monitoring control circuit unit 30A, includes setting constants or control outputs that are required by the monitoring control circuit unit 30A, the answer information An −1 for the question information Qn −1 obtained from the immediately previous uplink communication information UPD, the second flag information, and the code check information; the uplink communication information UPD, which is transmitted from the monitoring control circuit unit 30A to the main control circuit unit 20A, includes input signal information for the monitoring control circuit unit 30A or the storage information for the setting constants or the control outputs obtained from the main control circuit unit 20A, present question information Qn, the first flag information, and code check information. The first flag information changes at the timing when the contents of the question information Qn is updated in the monitoring control circuit unit 30A, and serves as a single-bit or multi-bit recognition signal that reports the change in the question information, and the second flag information changes at the timing when the main control circuit unit 20A updates the contents of the answer information An, in response to an update of the contents of the question information Qn, and serves as a single-bit or multi-bit recognition signal that reports the update of the answer information.

This configuration corresponds to the invention recited in claim 10; the first and the second flag information for reporting the respective changes in the question information and the answer information are transmitted. Thus, the main control circuit unit that receives the question signal is not required to compare the immediately previous question information with the present question information so as to detect a change, and the monitoring control circuit unit that receives the answer signal is not required to compare the immediately previous answer information with the present answer information so as to detect a change; therefore, the question information and the answer information that are not accompanied by a change in the flag can be neglected.

The monitoring control circuit unit 30A is further provided with the question information updating unit 704 and a response delay determination unit 616. The question information updating unit 704 recurrently transmits question information included in the uplink communication information UPD in such a way that the question information is the same in a plurality times of communication instances and after transmitting the question information for a predetermined duration or longer, updates the question information; the response delay determination unit 616 is a unit that determines that an abnormality exists in the main control circuit unit 20A, when the time between the timing when the monitoring control circuit unit 30A changes the contents of the first flag information and the timing when the reception data of the second flag information changes exceeds a predetermined time.

This configuration corresponds to the invention recited in claim 11; the question information updating unit that can recurrently transmit the same question information and a delay of the response to a change in the content of the answer information corresponding to the question information are monitored. Accordingly, by prolonging the update cycle of question information compared with the communication cycle of the input and output signals between the main control circuit unit 20A and the monitoring control circuit unit 30A, the necessary time in which the main control circuit unit generates main-machine answer information is ensured, and communication of a question and an answer can be performed, while taking into account the necessary time for communication with the external control apparatus and the necessary time for the external control apparatus to generate supplementary-apparatus answer information.

The monitoring control circuit unit 30A is further provided with a code error detection unit 614 and a reset processing unit 619. The code error detection unit 614 detects the intrusion of bit information or the loss of bit information in the reception data in the downlink communication information DND, by use of a code check unit exemplified by the sum check or the CRC check. The reset processing unit 619 serves as the second abnormality processing unit that initializes and restarts the main control circuit unit 20A, in response to the result of monitoring/tallying of the fact that the abnormality determination unit 617 has determined that an abnormality exists in the main control circuit unit 20A, the fact that the response delay determination unit 616 has determined an answer delay, or the fact that the code error detection unit 614 has detected an code error in the downlink communication information.

This configuration corresponds to the invention recited in claim 12; a reset processing unit is provided that responds to the result of monitoring/tallying of abnormalities detected by the abnormality determination unit, the response delay determination unit, and the code error detection unit. Accordingly, the main control circuit unit 20A can be initialized and restarted, in response not to the detection of a temporary abnormality due to erroneous operation caused by noise but to the detection of a continuous abnormality by diverse abnormality detection unit.

The nonvolatile program memory 25A is further provided with control programs corresponding to an erroneous-answer transmission unit 503b and a tallied information monitoring unit 818a; the uplink communication information UPD includes tallied information obtained through abnormality-monitoring by the monitoring control circuit unit 30A. The erroneous-answer transmission unit 503b is a unit that intentionally generates erroneous-solution information items for the question information items Qn and Q1n and transmits the erroneous-solution information items, as the answer information items An and A1n; the intentional transmission of an erroneous answer is performed by the erroneous-answer transmission unit at the timing when there exist some margins for the tallied value in the abnormality monitoring and the reset processing unit 619 in the monitoring control circuit unit 30A is not caused to output a reset output RST2 by only a one-time erroneous-answer response. The tallied information monitoring unit 818a is a unit in which, by monitoring the tallied information, the main control circuit unit 20A counter-monitors whether or not the monitoring control circuit unit 30A normally operates.

This configuration corresponds to the invention recited in claim 14; the program memory is further provided with control programs corresponding to the erroneous-answer transmission unit and the tallied information monitoring unit, and the uplink communication information includes tallied information obtained through abnormality-monitoring by the monitoring control circuit unit. Accordingly, not only the behavior of the monitoring control circuit unit can be counter-monitored through the intentional transmission of an erroneous-answer, but also the intentional transmission of an erroneous-answer is prevented from causing the monitoring control circuit unit to generate a reset signal, thereby initializing the main control circuit unit.

The nonvolatile program memory 25A further includes a control program corresponding to a code error detection unit 814 or a stored-information abnormality detection unit 818b and a reset processing unit 819. The code error detection unit 814 detects the intrusion of bit information or the loss of bit information in the reception data in the uplink communication information UPD, by use of a code check unit exemplified by the sum check or the CRC check. The storage state of the setting information and the output information that have been received and stored, as part of the downlink communication information DND, by the monitoring control circuit unit 30A and the acknowledgement information that has been received, as part of the uplink communication information UPD, by the main control circuit unit 20A are compared, in the main control circuit unit 20A, by the stored-information abnormality detection unit 818b so that it is determined whether or not an abnormality exists. The reset processing unit 819 serves as the third abnormality processing unit that initializes and restarts the monitoring control circuit unit 30A, in response to the result of counter-monitoring/tallying of the fact that the code error detection unit 814 has detected a code error in the uplink communication information UPD, the fact that the stored-information abnormality detection unit 818b has detected an abnormality in the stored information, or the fact that the tallied information obtained through the abnormality monitoring by the tallied information monitoring unit 818a has been abnormal.

This configuration corresponds to the invention recited in claim 15; a reset processing unit is provided that responds to the result of counter-monitoring/tallying of abnormalities detected by the code error detection unit, the stored-information abnormality detection unit, and the tallied information monitoring unit. Accordingly, the monitoring control circuit unit can be initialized and restarted, in response not to the detection of a temporary abnormality due to erroneous operation caused by noise but to the detection of a continuous abnormality by diverse counter-monitoring abnormality detection unit.

Next, Embodiment 2 of the present invention will be explained.

Embodiment 2

(1) Detailed Explanation For Configuration of Embodiment 2

Figure 9:
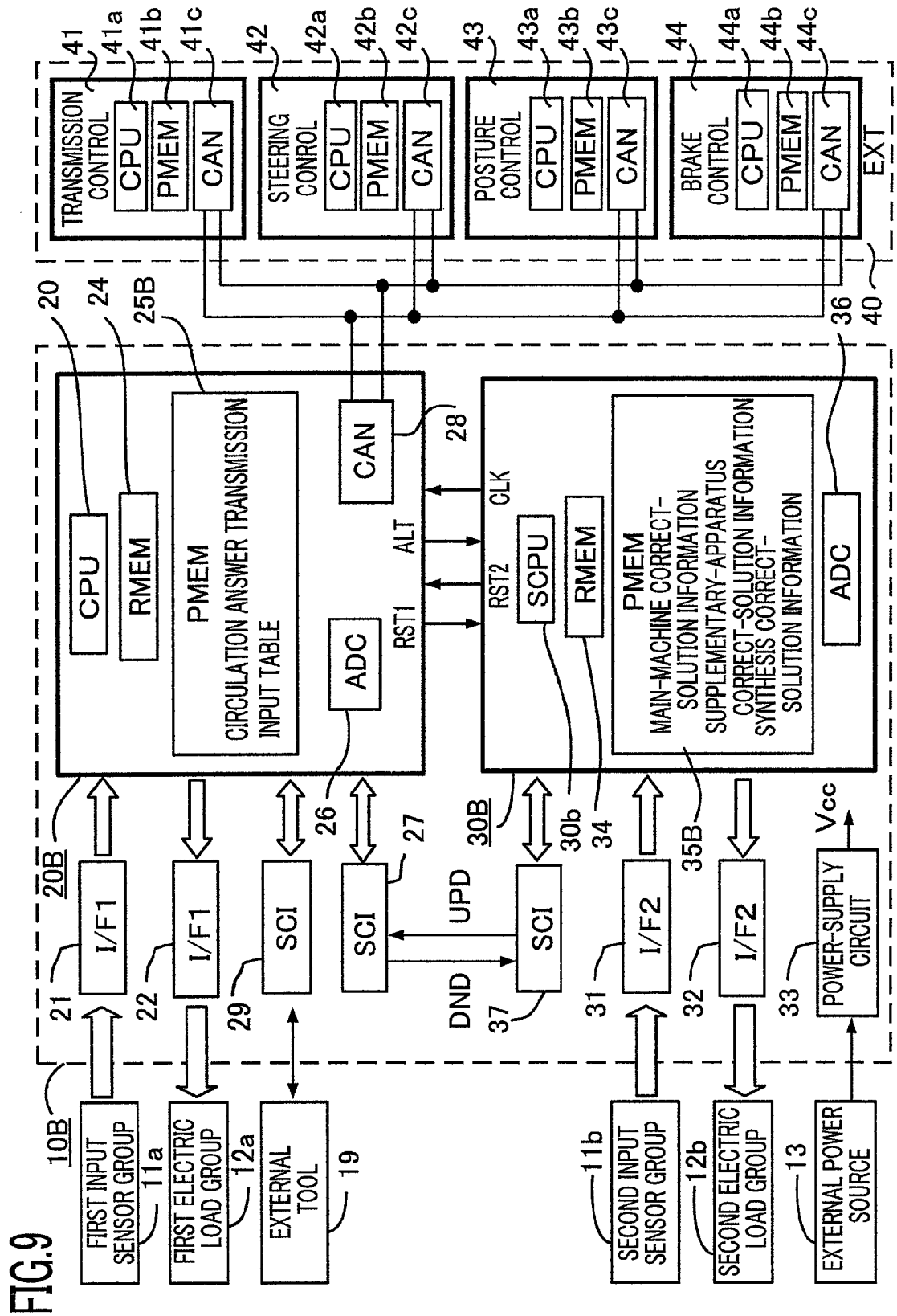
FIG. 9 is an overall block diagram of an in-vehicle electronic control apparatus, having a monitoring control apparatus, according to Embodiment 2 of the present invention.

An in-vehicle electronic control apparatus according to Embodiment 2 of the present invention will be explained below. FIG. 9 is an overall block diagram of an in-vehicle electronic control apparatus having a monitoring control circuit according to Embodiment 2 of the present invention. The difference between the configuration in FIG. 9 and the configuration in FIG. 1 will mainly be explained below. In FIG. 9, the same reference characters denote constituent elements that are the same as or equivalent to those in FIG. 1. In FIG. 9, an in-vehicle electronic control apparatus 10B is provided with a main control circuit unit 20B formed mainly of a microprocessor 20 that collaborates with a program memory 25B and a monitoring control circuit unit 30B formed mainly of an auxiliary microprocessor 30b that collaborates with an auxiliary program memory 35B; the in-vehicle electronic control apparatus 10B is configured in such a way as to receive electric power from an external power source 13, which is an in-vehicle battery, so as to operate.

As is the case with FIG. 1, first and second sensor groups 11a and 11b, first and second electric load groups 12a and 12b, an external tool 19, and an external control apparatus 40 are externally connected to the electronic control apparatus 10B. As is the case with FIG. 1, first and second input interface circuits 21 and 31, first and second output interface circuits 22 and 32, a first serial communication circuit 27/37, a tool interface circuit 29, and a power-supply circuit 33 are incorporated in the electronic control apparatus 10B; an unillustrated direct memory access controller is connected between the parallel input/output bus for the serial-parallel converter 37 included in the serial communication circuit and the data bus for the auxiliary microprocessor 30b, and transmits data to and receives data from a RAM memory 34 for calculation processing, without the intermediary of the auxiliary microprocessor 30b.

Similarly, an unillustrated direct memory access controller is connected also between the parallel input/output bus for the serial-parallel converter 27 included in the first serial communication circuit and the data bus for the microprocessor 20, and transmits data to and receives data from the RAM memory 24 for calculation processing, without the intermediary of the microprocessor 20.

In addition, various kinds of control programs, described later with reference to FIGS. 12 and 15, in addition to a communication control program and an input/output control program are stored in the program memory 25B. Additionally, various kinds of control programs, described later with reference to FIGS. 13 and 14, in addition to a communication control program and an input/output processing program are stored in the auxiliary program memory 35B; correct-solution information for a Q&A diagnosis is also stored in the auxiliary program memory 35B.

The electronic control apparatus 10B is configured in such a way that a first serial communication circuit, which is formed of a pair of serial-parallel converters 27 and 37, forms a full-duplex block communication circuit, and downlink communication information DND transmitted from the main control circuit unit 20B to the monitoring control circuit unit 30B and uplink communication information UPD transmitted from the monitoring control circuit unit 30B to the main control circuit unit 20B can concurrently be transmitted and received. A communication permission signal ALT generated by the main control circuit unit 20B and a communication synchronization signal CLK generated by the monitoring control circuit unit 30B are as described above with reference to FIG. 2.

The uplink communication information UPD, which is communication information to be stored in the RAM memory 24, includes, as represented in a list in FIG. 10B(G) described later, Q&A question information, input signal information obtained from the second input sensor group 11b, setting completion information, monitoring/tallying information, first flag information, and code check information. The downlink communication information DND, which is communication information to be stored in the RAM memory 34, includes, as represented in a list in FIG. 10B(H), Q&A answer information, setting information items, such as control constants, which are required by the monitoring control circuit unit 30B, output signal information for the second electric load group 12b, Bsecond flag information, and code check information.

As is the case with FIG. 1, the setting completion information in the uplink communication storage information is information the same as either the setting information or the output signal information stored in the RAM memory 34; the electronic control apparatus 10B is configured in such a way that the main control circuit unit 20B can ascertain whether or not the setting information and the output signal information have been transmitted correctly.

The correct-solution information corresponding to question information is preliminarily stored in the auxiliary program memory 35B when the product is shipped; the auxiliary microprocessor 30b randomly transmits question information items and compares answer information items transmitted by the microprocessor 20 with corresponding correct-solution information items so as to monitor the operation status of the microprocessor 20; the microprocessor 20 intentionally sends an erroneous answer and counter-monitors whether or not the monitoring control circuit unit 30B performs appropriate monitoring and controlling.

As a result, when detecting an abnormality in the main control circuit unit 20B, the monitoring control circuit unit 30B initializes and restarts the main control circuit unit 20B by unit of a reset output RST2, and when detecting an abnormality in the monitoring control circuit unit 30B, the main control circuit unit 20B initializes and restarts the monitoring control circuit unit 30B by unit of a reset output RST1.

FIGS. 10A and 10B are each part of a set of tables representing contents of various kinds of memories in the in-vehicle electronic control apparatus 10B illustrated in FIG. 9. Next, FIGS. 10A and 10B will be explained. FIG. 10A(A) is a table in which control programs and control constants stored in the nonvolatile program memory 25B are listed; the details thereof will be described later with reference to flowcharts represented in FIGS. 12 and 15. FIG. 10A(B) is a table in which control programs and control constants stored in the nonvolatile program memory 35B are listed; the details thereof will be described later with reference to flowcharts represented in FIGS. 13 and 14.

FIG. 10A(C) represents concurrent question information Qn(n=0, 1, 2, - - -, F) that is applied to Embodiment 2; as the concurrent question information Qn, input table numbers (n=0 to F) are designated, and the input tables are stored in the nonvolatile program memory 25B or in the supplementary-apparatus program memories 41b to 44b. Additionally, the discrete question information for the microprocessor 20 is designated by Q1n; and the discrete question information items for the collaborating supplementary apparatuses 41 to 44 are designated by Q2n to Q5n.

FIG. 10B(D) represents synthesis answer information An, main-machine answer information A1n, and supplementary-apparatus answer information items A2n to A5n; the synthesis answer information is a numerical value of, for example, 16 bits or less, and other discrete answer information items A1n to A5n are a numerical value of 13 bits or less.

FIG. 10B(E) represents synthesis correct-solution information Rn, main-machine correct-solution information R1n, and supplementary-apparatus correct-solution information items R2n to R5n; the synthesis correct-solution information is a numerical value of, for example, 16 bits or less, and other discrete correct-solution information items R1n to R5n are a numerical value of 13 bits or less. FIG. 10B(G) is a list of uplink communication information items to be stored in the RAM memory 24. FIG. 10B(H) is a list of downlink communication information items to be stored in the RAM memory 34.

In addition, the most important characteristic of Embodiment 2 is that, while the auxiliary program memory 35B includes the main-machine correct-solution information R1n, the supplementary-apparatus correct-solution information items R2n to R5n, and the synthesis answer information Rn, the main control circuit unit 20B has no correct-solution information, whereby the control load on the main control circuit unit 20B is lightest. Therefore, when, based on the synthesis answer information An for the concurrent question information Qn, detecting an abnormality in either the main control circuit unit 20B or the collaborating supplementary apparatuses 41 to 44, the monitoring control circuit unit 30B sequentially generates the discrete question information items Q1n to Q5n by use of a circulation answer generation unit so as to determine the location of the abnormality.

Each of the discrete question information items Q1n to Q5n is question information to be transmitted to the main control circuit unit 20B or any one of the collaborating supplementary apparatuses 41 to 44 in the external control apparatus 40; the main control circuit unit 20B transmits to the monitoring control circuit unit 30B the main-machine answer information A1n or one of the supplementary-apparatus answer information items A2n to A5n based on the discrete question information items Q1n to Q5n. The discrete question information items Q1n to Q5n are concurrently transmitted to the main control circuit unit 20B or the external control apparatus 40; however, the main control circuit unit 20B and some of the collaborating supplementary apparatuses 41 to 44 in the external control apparatus 40 that are not the subjects of question information may reply zero as the main-machine answer information A1n and the supplementary-apparatus answer information items A2n to A5n, or the main control circuit unit 20B may eliminate the main-machine answer information A1n and the supplementary-apparatus answer information items A2n to A5n obtained from the main control circuit unit 20B and some of the collaborating supplementary apparatuses 41 to 44 in the external control apparatus 40 that are not the subjects of a question so that only the answer information items that are the subjects of question information are transmitted to the monitoring control circuit unit 30B.

Hereinafter, an explanation will be made for a case where, even though being discrete, question information is transmitted to all the subject apparatuses, and the answer information items from only the discrete subject apparatuses are selected by the main control circuit unit 20B and transmitted to the monitoring control circuit unit 30B.

Next, FIG. 11, which is a transition chart of question information and answer information in the in-vehicle electronic control apparatus 10B illustrated in FIG. 9, will be explained. FIGS. 11(A), 4(B), 4(C), 4(D), 4(E), 4(F), and 4(G) represent respective transitions of question information items and answer information items with regard to the monitoring control circuit unit 30B, the main control circuit unit 20B, the microprocessor 20 and the communication terminal 28 of the second serial communication circuit, the transmission control unit (TCU) 41 which is a collaborating supplementary apparatus, the electric power steering (EPS) system 42 which is a collaborating supplementary apparatus, the stability control unit (SCU) 43 which is a collaborating supplementary apparatus, and the antilock brake system (ABS) 44 which is a collaborating supplementary apparatus. In addition, in the following explanation, the transmission control unit (TCU) 41, the electric power steering (EPS) system 42, the stability control unit (SCU) 43, and the antilock brake system (ABS) 44 are referred to simply as the collaborating supplementary apparatuses 41, 42, 43, and 44.

In FIGS. 11(A) to 11(G), as is the case with the time zones t1 to t9 in FIG. 4, during the time instants t1 to t9 in a first time zone, the monitoring control circuit unit 30B in FIG. 11(A) transmits concurrent question information Qn to the main control circuit unit 20B in FIG. 11(B), and the main control circuit unit 20B in FIG. 11(B) transmits synthesis answer information An to the monitoring control circuit unit 30B in FIG. 11(A); in the case where it is determined that any abnormality exists, the time zone sequentially transits from the first time zone (t1 to t9) to the sixth time zone (t61 to t66), and questioning and answering are performed based on one of the discrete question information items Qin(=Q1n, Q2n, Q3n, Q4n, or Q5n).

Next, at the time instant t11 in the second time zone represented in FIG. 11, the monitoring control circuit unit 30B in FIG. 11(A) generates concurrent question information Qin (=Q1n), and the main control circuit unit 20B in FIG. 11(B) receives the concurrent question information Qin via the first serial communication circuit 37/27. At the time instant t12 in the second time zone, the main control circuit unit 20B in FIG. 11(A) transmits the discrete question information Qin to the collaborating supplementary apparatuses 41, 42, 43, and

44 in FIGS. 4(D), 4(E), 4(F), and 4(G), respectively, via the second serial communication circuit in FIG. 11(C).

At the time instant t13 in the second time zone represented in FIG. 11, the main control circuit unit 20B in FIG. 11(A) generates main-machine answer information A1n, and selects the main-machine answer information A1n in the case where the discrete question information is Q1n. At the time instant t14 in the second time zone in FIG. 11, the collaborating supplementary apparatus 41 in FIG. 11(D) generates supplementary-apparatus answer information A2n and transmits the supplementary-apparatus answer information A2n to the main control circuit unit 20B in FIG. 11(B) via the second serial communication circuit. In the case where the discrete question information is Q2n, the main control circuit unit 20B selects the supplementary-apparatus answer information A2n.

At the time instant t15 in the second time zone in FIG. 11, the collaborating supplementary apparatus 42 in FIG. 11(E) generates supplementary-apparatus answer information A3n and transmits the supplementary-apparatus answer information A3n to the main control circuit unit 20B in FIG. 11(B) via the second serial communication circuit in FIG. 11(C). In the case where the discrete question information is Q3n, the main control circuit unit 20B selects the supplementary-apparatus answer information A3n.

At the time instant t16 in the second time zone in FIG. 11, the collaborating supplementary apparatus 43 in FIG. 11(F) generates supplementary-apparatus answer information A4n and transmits the supplementary-apparatus answer information A4n to the main control circuit unit 20B in FIG. 11(B) via the second serial communication circuit in FIG. 11(C). In the case where the discrete question information is Q4n, the main control circuit unit 20B selects the supplementary-apparatus answer information A4n.

At the time instant t17 in the second time zone in FIG. 11, the collaborating supplementary apparatus 44 generates supplementary-apparatus answer information A5n and transmits the supplementary-apparatus answer information A5n to the main control circuit unit 20B via the second serial communication circuit in FIG. 11(C). In the case where the discrete question information is Q5n, the main control circuit unit 20B selects the supplementary-apparatus answer information A5n.

At the time instant t18 in the second time zone in FIG. 11, the main control circuit unit 20B in FIG. 11(B) transmits the selected answer to the monitoring control circuit unit 30B in FIG. 11(A) via the first serial communication circuit.

The monitoring control circuit unit 30B compares the transmitted answer with the discrete correct-solution information that has been stored in the auxiliary program memory 35B, and determines whether or not there exists an abnormality.

At the time instant t19 in the second time zone in FIG. 11, in the case where there exists an abnormality in the main-machine answer information A1n at the time instant t18 in the second time zone, the monitoring control circuit unit 30B generates a reset output described later, in response to the result of tallying the abnormalities that have occurred in the main machine; in the case where the supplementary-apparatus answer information is abnormal, the monitoring control circuit unit 30B reports the abnormality to the main control circuit unit 20B in FIG. 11(B).

In the case where related apparatuses are in normal conditions, the concurrent question information Qn is recurrently transmitted; for example, the question number n is updated in a cycle period of 40 [msec]. Additionally, in the case where an abnormality occurs, firstly, based on the discrete question information item, an abnormality determination is performed on the main control circuit unit; in the case where the abnormality exists in the main control circuit unit, after reconfirmation, the second abnormality processing is performed; in the case where the abnormality does not exist in the main control circuit unit, it is determined that the abnormality exists in the external control apparatus, and then the first abnormality processing is performed on all the collaborating supplementary apparatuses; after that, an abnormal apparatus among the collaborating supplementary apparatuses is detected, and discrete abnormal processing is applied to the collaborating supplementary apparatus the abnormality in which has been detected.

Accordingly, in the case of Embodiment 2, an abnormality in the external control apparatus 40 is monitored by the monitoring control circuit unit 30B, and notified by an external apparatus abnormality notification unit to the main control circuit unit 20B, so that the main control circuit unit 20B performs self-protection processing through the external apparatus abnormality processing unit. In addition, an external answer generation transmission unit 400 that generates the supplementary-apparatus answer information items A2n to A5n and transmits them to the main control circuit unit 20B is performed in accordance with control programs stored in the supplementary-apparatus program memories 41b to 44b in the collaborating supplementary apparatuses 41 to 44.

The total time period from the time instants t1 to t9 in the first time zone is, for example, 40 [msec]; when this series of operations is completed, the concurrent question information is updated to Qn+1; and the same abnormality monitoring is repeated based on new question information. The foregoing process applies also to the second to sixth time zones. The question number is not updated until the time zone t11 to t51 and a question with the same number is performed; however, the question subject apparatus is sequentially changed.

(2) Detailed Explanation For Work and Operation of Embodiment 2

Figure 13A:
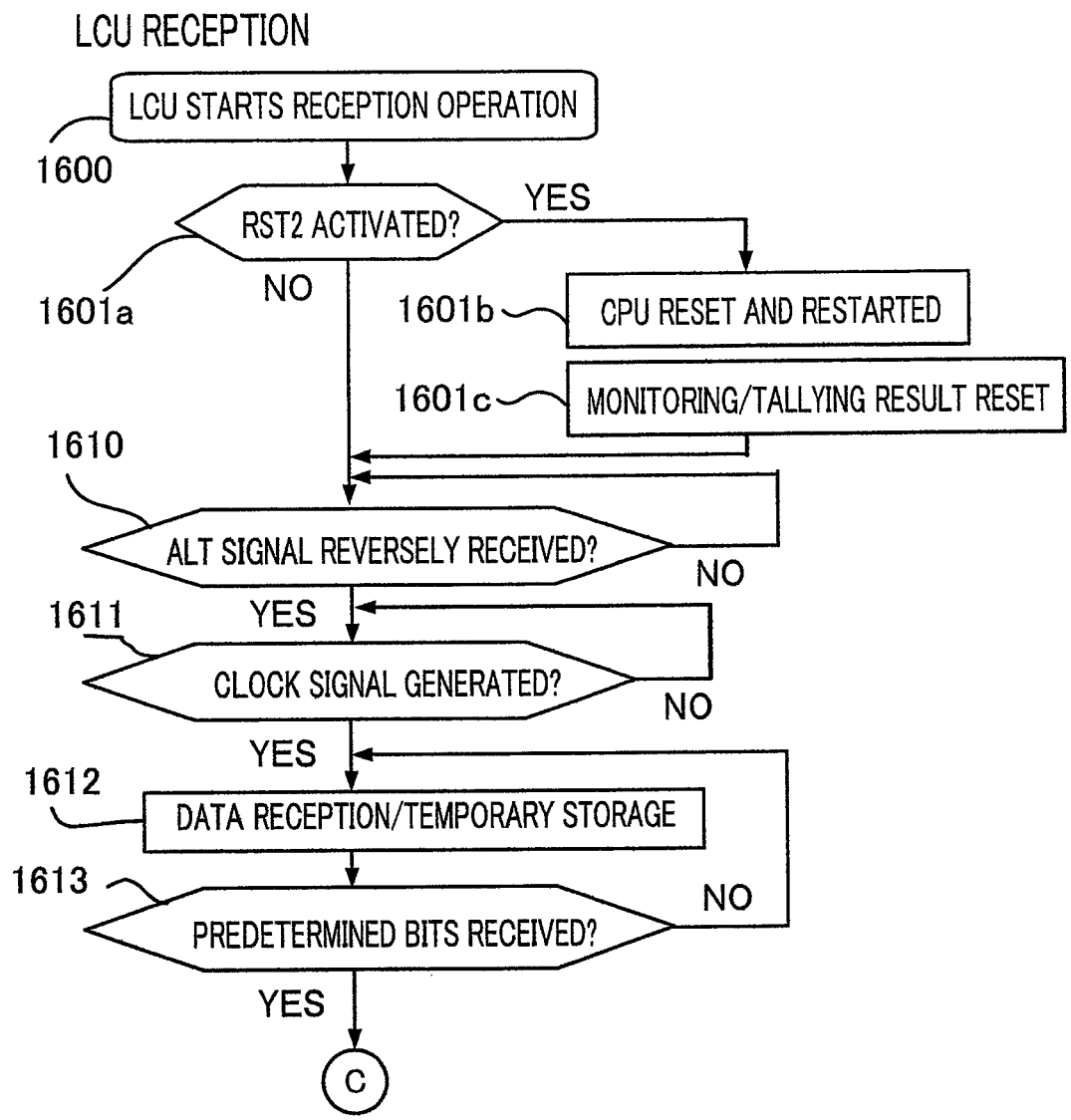
FIGS. 13A and 13B are each part of a flowchart representing the reception operation of a monitoring control circuit unit in an in-vehicle electronic control apparatus, having a monitoring control circuit, according to Embodiment 2 of the present invention.
Figure 13B:
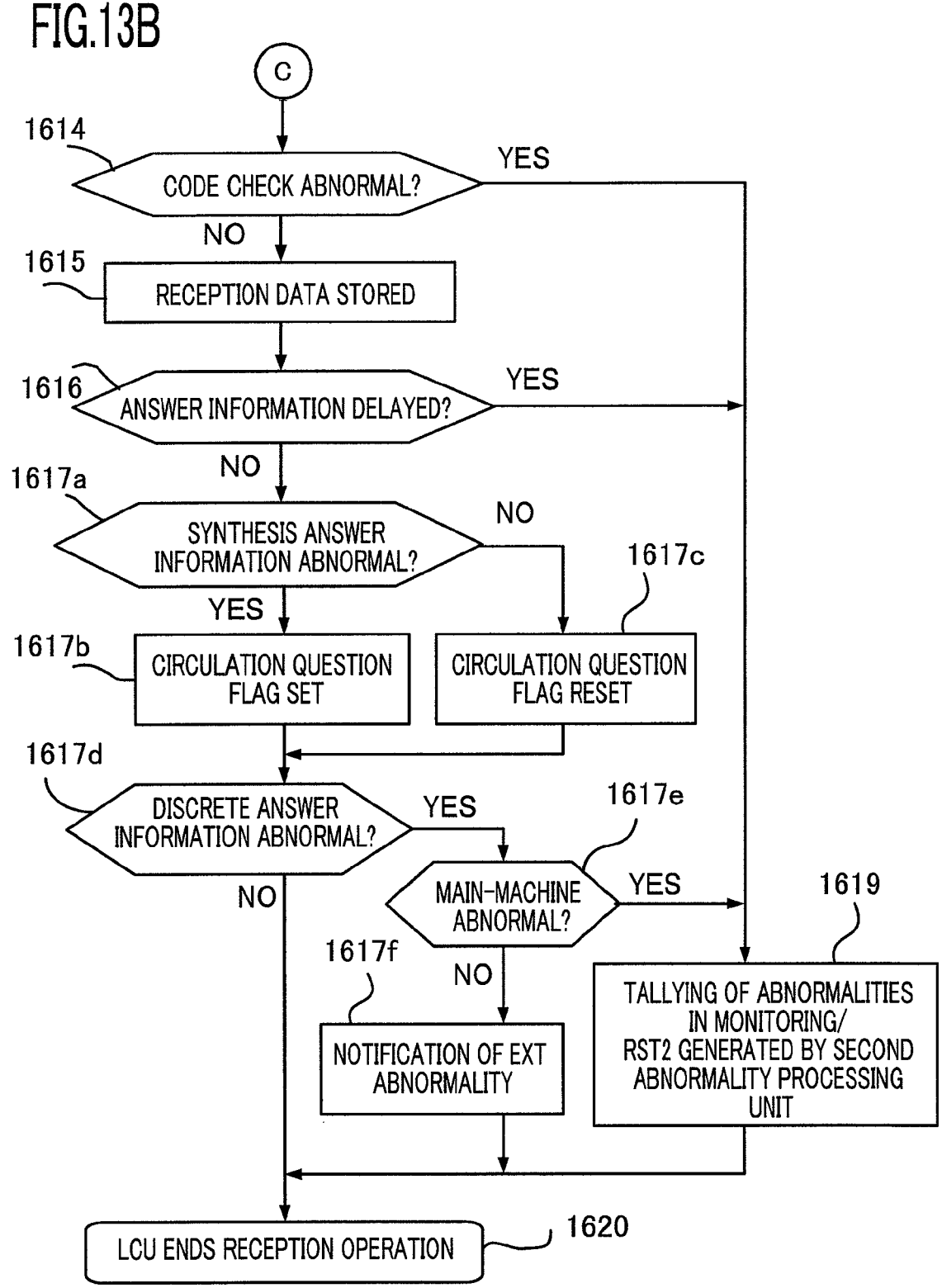
Figure 14:
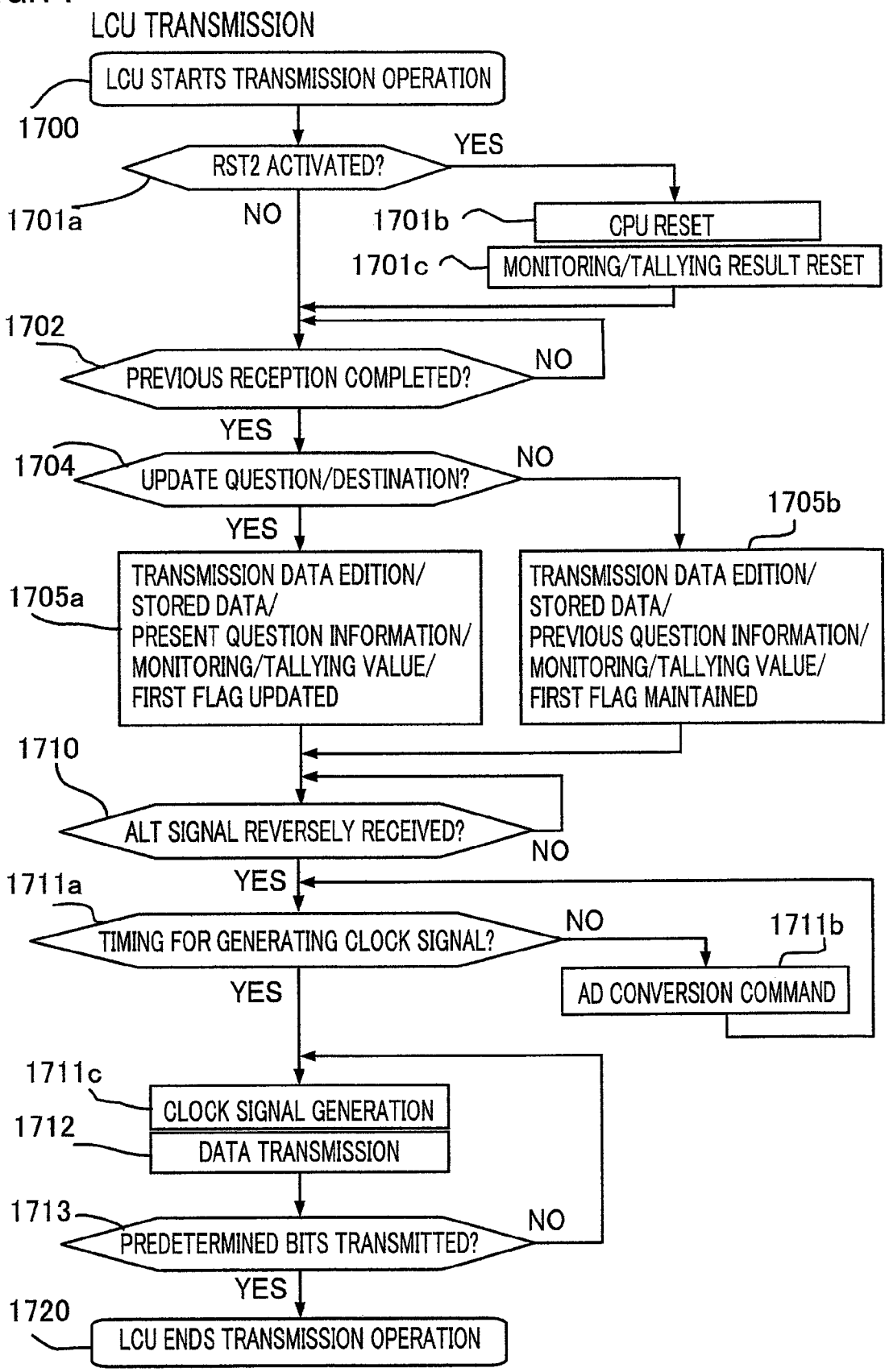
FIG. 14 is a flowchart representing the transmission operation of a monitoring control circuit unit in an in-vehicle electronic control apparatus, having a monitoring control circuit, according to Embodiment 2 of the present invention.
Figure 15A:
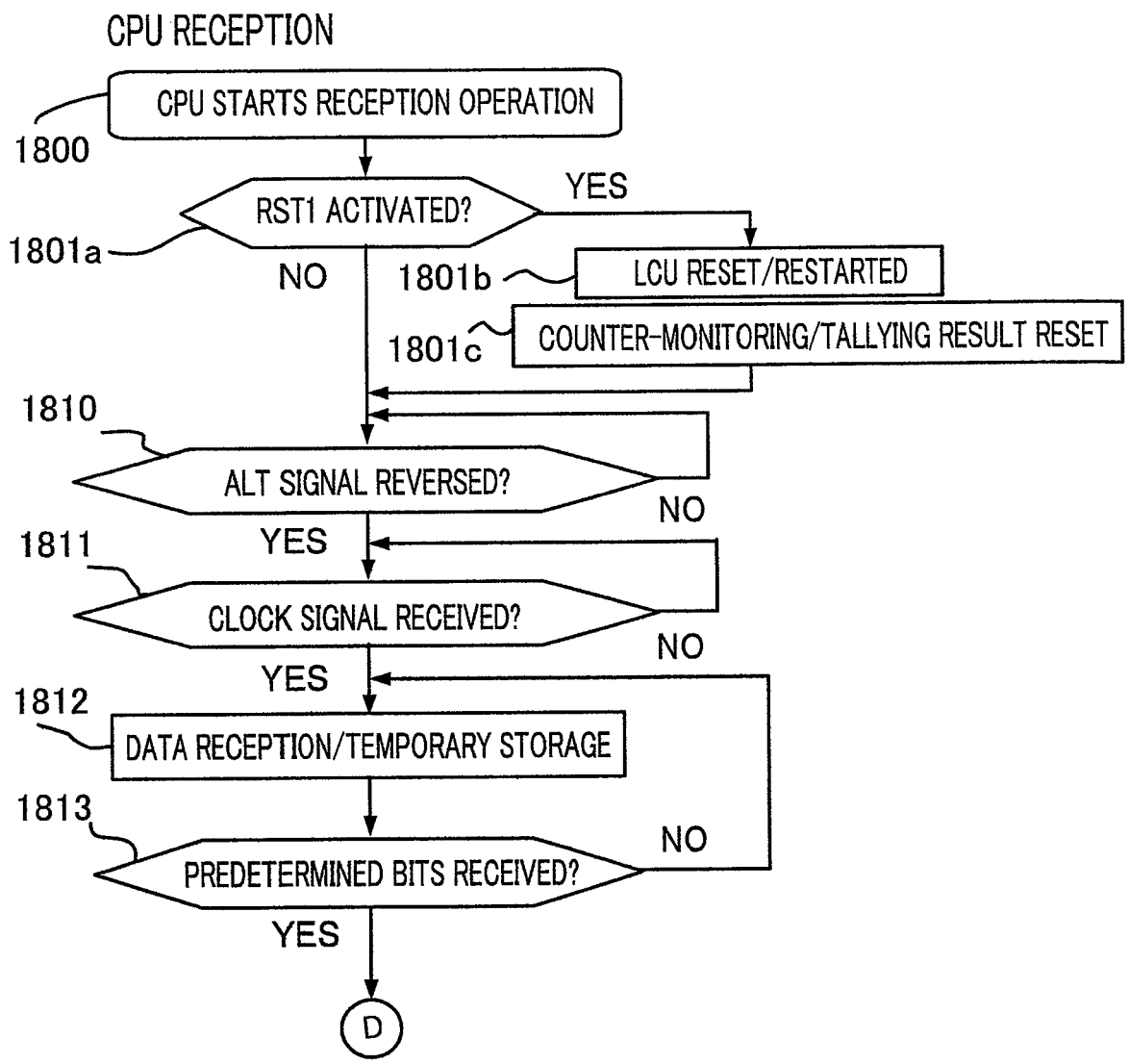
FIGS. 15A and 15B are each part of a flowchart representing the reception operation of a main control circuit unit in an in-vehicle electronic control apparatus, having a monitoring control circuit, according to Embodiment 2 of the present invention.
Figure 15B:
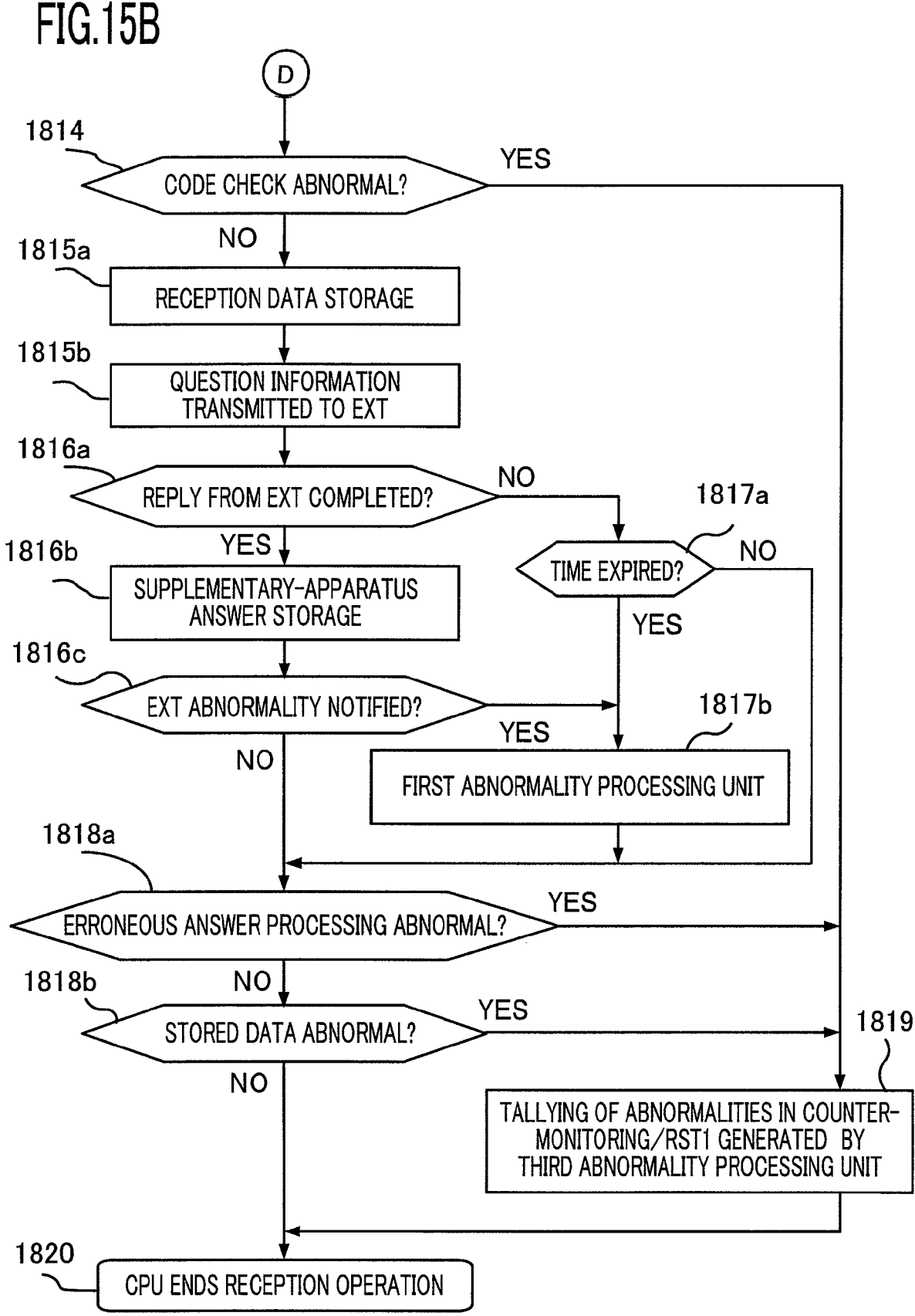

The work and operation of the in-vehicle electronic control apparatus, configured as illustrated in FIG. 9 and having a monitoring control circuit according to Embodiment 2 of the present invention, will be explained below. FIG. 12 is a flowchart representing the transmission operation of the main control circuit unit 20B; FIGS. 13A and 13B are each part of a flowchart representing the reception operation of the monitoring control circuit unit 30B; FIG. 14 is a flowchart representing the transmission operation of the monitoring control circuit unit 30B; FIGS. 15A and 15B are each part of a flowchart representing the reception operation of the main control circuit unit 20B.

First, in FIG. 9, when the external power source 13 is connected through an unillustrated power switch to the electronic control apparatus 10B, the microprocessor 20 drives and controls the first electric load group 12a and the second electric load group 12b, based on the operation statuses of the first input sensor group 11a and the second input sensor group 11b and the contents of a control program in the program memory 25B. In particular, the first input sensor group 11a and the first electric load group 12a perform open/close and on/off operations, in synchronization with the rotation of the engine; for example, in the case where a 4-cylinder and 4-cycle gasoline engine rotates at a rotation speed of 6000 [rpm], the ignition control and the fuel injection control are performed in a cycle period of 5 [msec]; however, in the case where the rotation speed of the engine is 600 [rpm], the foregoing controls may be performed in a cycle period of 50 [msec].

In contrast, because not performing operations in synchronization with the rotation of the engine, the second input sensor group 11b and the second electric load group 12b do not perform frequent operations; however, because, when the operation status changes, signal communication is required to be rapidly performed, it is desirable that communication with a constant cycle period is relatively frequently performed regardless of the rotation speed of the engine.

Next, the transmission operation of the main control circuit unit 20B in the in-vehicle electronic control apparatus illustrated in FIG. 9 will be explained with reference to FIG. 12; however, what differ from the transmission operation represented in FIGS. 5A and 5B in Embodiment 1 will mainly be explained. In addition, in FIG. 12, the reference characters in 500s in FIGS. 5A and 5B are replaced by those in 1500s. In FIG. 12, the step 1500 is a step in which the microprocessor 20 starts its transmission operation for the monitoring control circuit unit 30B. In the steps 1501a, 1501b, and 1501c, the monitoring control circuit unit 30B is initialized to be restarted in response to a reset output RST1 generated in the step 1819 described later, and the result of tallying abnormalities in counter-monitoring in the step 1819 is reset so that the reset output RST1 is halted.

In the step 1502, which is a determination step, the operation status of a determination flag, in which there is stored whether or not replies from the collaborating supplementary apparatuses 41 to 44 have been completed in the step 1816a (refer to FIG. 15B) described later, is monitored; in the case where the replies from the collaborating supplementary apparatuses 41 to 44 have been completed, a "YES" determination is made and the step 1502 is followed by the step 1503a; in the case where the replies from the collaborating supplementary apparatuses 41 to 44 have not been completed, a "NO" determination is made and the step 1502 is followed by the step 1505b. In the steps 1503a, 1503b, 1503c, and 1504, depending on whether or not preparation for an answer by the erroneous-answer generation unit 1503b and the main-machine answer generation unit 1503c has been completed, the step 1505a or 1505b is selected.

In the step 1505a corresponding to a circulation answer generation unit, not only the present answer information is decided, but also the content of second flag information F is updated. In addition, in the step 1505a, in the case where a circulation flag has been set in the step 1617b described later, as answer information to be transmitted to the monitoring control circuit unit 30B in response to discrete question information from the monitoring control circuit unit 30B, main-machine answer information A1n and supplementary-apparatus answer information items A2n to A5n are sequentially and discretely transmitted. However, in the case where the circulation flag has not been set in the step 1617b, as answer information to be transmitted to the monitoring control circuit unit 30B in response to concurrent question information from the monitoring control circuit unit 30B, a combined tallied value is generated from the main-machine answer information A1n and supplementary-apparatus answer information items A2n to A5n.

In the step 1505b, as the present answer information, the previous answer information is directly utilized, and it is decided that the second flag information F is not updated. In the process after and including the step 1510a, the answer information decided in the step 1505a or 1505b, the setting and output information items added in the step 1511b, and the code check information added in the step 1512 are transmitted to the monitoring control circuit unit 30B, and then the process proceeds to the operation end step 1520. In the operation end step 1520, other control operations are performed; after that, the step 720 is circularly followed by the operation start step 1500 within a predetermined time.

Next, the reception operation of the monitoring control circuit unit 30B in the in-vehicle electronic control apparatus illustrated in FIG. 9 will be explained with reference to FIGS. 13A and 13B; however, what differ from the transmission operation represented in FIG. 6 in Embodiment 1 will mainly be explained. In addition, in FIGS. 13A and 13B, the reference characters in 600s in FIG. 6 are replaced by those in 1600s.

In FIG. 13A, the step 1600 is a step in which the auxiliary microprocessor 30b starts its reception operation. In the steps 1601a, 1601b, and 1601c, the microprocessor 20 is initialized to be restarted in response to a reset output RST2 generated in the step 1619 described later, and the result of tallying abnormalities in monitoring in the step 1619 is reset so that the reset output RST2 is halted.

In the process from the step 1610 to the step 1616, the data received from the main control circuit unit 20B is checked by a code error detection unit 1614 and stored in the auxiliary RAM memory 34; a response delay determination unit 1616 determines whether or not a delay exists in the answer information from the main control circuit unit 20B.

In the step 1617a corresponding to a synthesis abnormality determination unit, the synthesis answer information An, stored in the step 1615 based on the concurrent question information Qn that is transmitted in the process from the step 1705 to the step 1712, and the synthesis correct-solution information Rn, stored in the auxiliary program memory 35B, are compared; in the case where the synthesis answer information An and the synthesis correct-solution information Rn do not coincide with each other, a "YES" determination is made and the step 1617a is followed by the step 1617b; in the case where the synthesis answer information An and the synthesis correct-solution information Rn coincide with each other, a "NO" determination is made and the step 1617a is followed by the step 1617c.

In the step 1617b, a circulation question flag is set, and then question information generated in the step 1705a described later is transferred to a discrete question information mode in which the question information is sequentially circulated. In the step 1617c, the circulation question flag is reset, and then the question information generated in the step 1705a described later is transferred to a concurrent question information mode.

In the step 1617d corresponding to a discrete abnormality determination unit, the discrete answer information, stored in the step 1615 based on the discrete question information that is transmitted in the process from the step 1705a to the step 1712 in FIG. 14, and the discrete correct-solution information, stored in the auxiliary program memory 35B, are compared; in the case where the discrete answer information and the discrete correct-solution information do not coincide with each other, a "YES" determination is made and the step 1617d is followed by the step 1617e; in the case where the discrete answer information and the discrete correct-solution information coincide with each other, a "NO" determination is made and the step 1617d is followed by the step 1620.

In the step 1617e, in the case where an abnormality in the main-machine answer information A1n is detected through a discrete question, a "YES" determination is made and the step 1617e is followed by the step 1619; in the case where no abnormality has been detected in the main-machine answer information A1n, a determination "NO" is made and the step 1617e is followed by the step 1617f. In the step 1617f corresponding to an external apparatus abnormality notification unit, the number of the apparatus, among the collaborating supplementary apparatuses 41 to 44, in which an abnormality occurred is transmitted to the main control circuit unit 20B.

In the step 1619 corresponding to a reset processing unit that is formed of an unillustrated error counter, each time an abnormality determination "YES" is made in the step 1614, 1616, or 1617e, the present counter value of the error counter increases, for example, by five, and each time a normality determination "NO" is made in the step 1614, 1616, or 1617e, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in monitoring; when the result of the tallying in monitoring exceeds, for example, 11; the reset output RST2 is generated, and the microprocessor 20 is initialized to be restarted in the step 1601b or the step 1701b described later; this corresponds to a restart processing which is a second abnormality processing unit.

In the operation end step 1620 that follows the step 1619 or the step 1617f, other controls are performed, and then the operation start step 1600 is resumed.

Next, the transmission operation of the monitoring control circuit unit 30B in the in-vehicle electronic control apparatus 10B illustrated in FIG. 9 will be explained with reference to FIG. 14; however, what differ from the transmission operation represented in FIG. 7 in Embodiment 1 will mainly be explained. In addition, in FIG. 14, the reference characters in 700s in FIG. 7 are replaced by those in 1700s.

In FIG. 14, the step 1700 is a step in which the auxiliary microprocessor 30b starts its transmission operation, and the process after and including the step 1700 is the same as that represented in FIG. 7; in a predetermined time period after processing in the operation end step 1720, the process proceeds to the operation start step 1700. However, in the step 1705a corresponding to a question information generation unit, the concurrent question information Qn or each of the discrete question information items Q1n to Q5n is sequentially transmitted in response to the status, of a circulation question flag, decided in the step 1617b or 1617c, or the concurrent question information Qn is continuously transmitted, so that the question number is updated based on the determination by the step 1704 that serves as a question information updating unit.

Additionally, in the step 1704, in the case where, even though the content of question information is not updated, the question subject is changed through discrete question information, a "YES" determination is made, and first flag information changes in the step 1705a.

Next, the reception operation of the main control circuit unit 20B in the in-vehicle electronic control apparatus 10B illustrated in FIG. 9 will be explained with reference to FIGS. 15A and 15B; however, what differ from the transmission operation represented in FIGS. 8A and 8B in Embodiment 1 will mainly be explained. In addition, in FIGS. 15A and 15B, the reference characters in 800s in FIGS. 8A and 8B are replaced by those in 1800s.

In FIG. 15A, the step 1800 is a step in which the microprocessor 20 starts its operation of receiving information from the monitoring control circuit unit 30B. In the steps 1801a, 1801b, and 1801c, the monitoring control circuit unit 30B is initialized to be restarted in response to a reset output RST1 generated in the step 1819 described later, and the result of tallying abnormalities in counter-monitoring in the step 1819 is reset so that the reset output RST1 is halted. In a series of steps 1810 to 1815, the data received from the monitoring control circuit unit 30B is checked by the code error detection unit 1814 and then stored in the RAM memory 24.

In the step 1815b, the updating question information Qn that has been received in the step 1815a is transmitted to the collaborating supplementary apparatuses 41 to 44. The foregoing operation is performed at the time instant t2 in the first time zone represented in FIG. 11. In the step 1816a, it is determined whether or not the supplementary-apparatus answer information items A2n to A5n from the collaborating supplementary apparatuses 41 to 44 have been received; in the case where the supplementary-apparatus answer information items A2n to A5n have not been received, a "NO" determination is made and the step 1816a is followed by the step 1817a; in the case where the supplementary-apparatus answer information items A2n to A5n have been received, a "YES" determination is made and the step 1816a is followed by the step 1816b.

In the step 1816b, the received supplementary-apparatus answer information items A2n to A5n are stored in the RAM memory 24; after that, the step 1816b is followed by the step 1816c. In the step 1816c, in the case where an abnormality in any of the supplementary apparatuses is reported based on the supplementary-apparatus status information that has been received in the step 1815a, a "YES" determination is made and the step 1816c is followed by the step 1817b; in the case where no abnormality is reported, a "NO" determination is made and the step 1816c is followed by the step 1818a.

In the step 1817a, it is determined whether or not the response time between the timing when the concurrent question information Qn is transmitted to the collaborating supplementary apparatuses 41 to 44 in the step 1815b and the timing when the supplementary-apparatus answer information items A2n to A5n are received has exceeded a predetermined threshold time; in the case where the response time has exceeded the predetermined threshold time, a "YES" determination is made and the step 1817a is followed by the step 1817b; in the case where the response time has not exceeded the predetermined threshold time, a "NO" determination is made and the step 1817a is followed by the step 1818a. In addition, in the case where it is determined in the step 1817a that the response time has not exceeded the predetermined threshold time, while repeating a control flow from the step 1800 to the step 1820, the microprocessor 20 waits for the reply to be completed in the step 1816a.

The step 1817b, an external apparatus abnormality processing unit, corresponds to a first abnormality processing unit that is performed based on discrete abnormality determination information, obtained in the step 1816c, with regard to the external control apparatus 40; the microprocessor 20 does not respond at least to an increase demand out of engine output torque increase/decrease demand correction value Δτ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20B.

The step 1818a corresponding to a tallied information monitoring unit is a step in which the change in the result, of tallying in monitoring, which has been received in the step 1815a is monitored in response to the erroneous-answer information that has been transmitted, in the step 1512, based on the step 1503b so that it is counter-monitored whether or not the monitoring control circuit unit 30B normally operates; in the case where it is determined that there exists an abnormality in the monitoring control circuit unit 30B, a determination "YES" is made and the step 1818a is followed by the step 1819; in the case where it is determined that there exists no abnormality in the monitoring control circuit unit 30B, a determination "NO" is made and the step 1818a is followed by the step 1818b.

The step 1818b corresponding to a stored-information abnormality detection unit is a step in which the storage state of the setting information and the output information that have been received and stored, as part of the downlink communication information DND, by the monitoring control circuit unit 30B in the step 1615 and the acknowledgement information that has been received, as part of the uplink communication information UPD, by the main control circuit unit 20B in the step 1815a are compared so that it is determined whether or not an abnormality exists; in the case where it is determined that there exists an abnormality, a determination "YES" is made and the step 1818b is followed by the step 1819; in the case where it is determined that there exists no abnormality, a determination "NO" is made and the step 1818b is followed by the operation end step 1820.

In addition, in order to determine whether or not an abnormality exists in the storage information, it is required to store the immediately previous setting information and output transmission information in the main control circuit unit 20B; therefore, only some important data undergoes a coincidence determination. In the step 1819 corresponding to a reset processing unit that is formed of an unillustrated error counter, each time an abnormality determination "YES" is made in the step 1814, 1818a, or 1818b, the present counter value of the error counter increases, for example, by five, and each time a normality determination "NO" is made in the step 1814, 1818a, or 1818b, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in counter-monitoring; when the result of the tallying in counter-monitoring exceeds, for example, "11", the reset output RST1 is generated, and the microprocessor 30b is initialized to be restarted in the step 1501b or the step 1801b described later. This corresponds to a restart processing which is a third abnormality processing unit.

In the operation end step 1820 that follows the step 1819, other controls are performed, and then the operation start step 1800 is resumed.

(3) Gist and Features of Embodiment 2

As is clear from the foregoing explanation, the in-vehicle electronic control apparatus 10B according to Embodiment 2 of the present invention is provided with the main control circuit unit 20B that includes a nonvolatile program memory 25B; the RAM memory 24 for calculation processing; the first input interface circuit 21 to which the first input sensor group 11a is connected; the first output interface circuit 22 to which the first electric load group 12a is connected; and a microprocessor 20 that controls the first electric load group 12a, in response to contents of a control program stored in the non-volatile program memory 25B and an operation status of the first input sensor group 11a, and provided with a monitoring control circuit unit 30B that includes the question information generation unit 1705a that is connected through the first serial communication circuits 27 and 37 to the microprocessor 20 and sequentially and selectively transmits a plurality of question information items; the correct-solution information storage memory 35B that stores the correct-solution information items for the question information items; and the abnormality determination unit 1617a and 1617d that compare the answer information, based on the question information, from the main control circuit unit 20B with the correct-solution information stored in the correct-solution information storage memory 35B so as to determine whether or not an abnormality exists. The main control circuit unit 20B further collaborates with the external control apparatus 40 that is connected with the main control circuit unit 20B via the second serial communication circuit 28 and that receives control signals from and transmits control signals to the main control circuit unit 20B; the external control apparatus 40 is provided with the collaborating supplementary apparatuses 41, 42, 43, and 44 including the supplementary-apparatus microprocessors 41a, 42a, 43a, and 44a, respectively, that collaborate with the supplementary-apparatus program memories 41b, 42b, 43b, and 44b, respectively; the supplementary-apparatus program memories 41b, 42b, 43b, and 44b each have a control program corresponding to the external answer generation transmission unit 400 that generates the answer information items in response to the question information items Qn, Q2n, Q3n, Q4n, and Q5n transmitted from the main control circuit unit 20B and transmits the answer information items, as the supplementary-apparatus answer information items A2n, A3n, A4n, and A5n, to the main control circuit unit 20B.

The concurrent question information Qn that is applied to the main control circuit unit 20B and all the external control apparatuses 40 and the discrete question information items Q1n to Q5n that are discretely applied are added to the question information generation unit 1705a; the concurrent question information or the discrete question information is transmitted from the monitoring control circuit unit 30B to the main control circuit unit 20B, and is transmitted from the monitoring control circuit unit 30B to the external control apparatuses 40 via the main control circuit unit 20B; the nonvolatile program memory 25B further includes a control program corresponding to a main-machine answer generation unit 1503c that generates the main-machine answer information A1n in accordance with the concurrent question information Qn or the discrete question information Q1n and a control program corresponding to a transmission answer edition unit 1505a that transmits, in response to the concurrent question information Qn, the synthesis answer information An obtained by combining and tallying the main-machine answer information A1n and the supplementary-apparatus answer information A2n, A3n, A4n, and A5n.

In the correct-solution information storage memory 35B, there is stored the main-machine correct-solution information R1n with regard to the main-machine answer information A1n generated by the main control circuit unit 20B, the supplementary-apparatus correct-solution information items R2n, R3n, R4n, and R5n for the supplementary-apparatus answer information items A2n, A3n, A4n, and A5n, and the synthesis correct-solution information Rn obtained by combining and tallying the main-machine correct-solution information and the supplementary-apparatus correct-solution information items.

The abnormality determination unit 1617a and 1617d monitor an abnormality in the main control circuit unit 20B, based at least on the concurrent question information Qn generated by the monitoring control circuit unit 30B or the discrete question information items Q1n to Q5n; the main control circuit unit 20B and the monitoring control circuit unit 30B collaborate with each other so as to monitor and discriminate an abnormality in the external control apparatus 40; when an abnormality occurs in the external control apparatus 40, the main control circuit unit 20B performs self-protection through a first abnormality processing unit 1817b; when an abnormality occurs in the main control circuit unit 20B, the monitoring control circuit unit 30B applies restart processing to the main control circuit unit 20B through a second abnormality processing unit 1619.

The nonvolatile program memory 25B is further provided with a control program corresponding to a circulation answer generation unit 1505a; the monitoring control circuit unit 30B is further provided with the external apparatus abnormality notification unit 1617f and an abnormality determination unit based on the synthesis abnormality determination unit 1617a and the discrete abnormality determination unit 1617d; in the correct-solution information storage memory 35B, there is stored the main-machine correct-solution information R1n with regard to the main control circuit unit 20B, the supplementary-apparatus correct-solution information items R2n, R3n, R4n, and R5n with regard to the external control apparatuses 40, and the synthesis correct-solution information Rn obtained by combining the main-machine correct-solution information R1n and the supplementary-apparatus correct-solution information items R2n, R3n, R4n, and R5n.

The circulation answer generation unit 1505a is a transmission answer edition unit that firstly generates, in response to the concurrent question information Qn generated by the monitoring control circuit unit 30B, synthesis answer information An by combining the main-machine answer information A1n generated by the main control circuit unit 20B and the supplementary-apparatus answer information items A2n, A3n, A4n, and A5n generated by the external control apparatuses 40 and transmits the synthesis answer information An to the monitoring control circuit unit 30B.

In the case where the synthesis answer information An transmitted from the main control circuit unit 20B and the synthesis correct-solution information Rn coincide with each other, the synthesis abnormality determination unit 1617a continues to transmit the concurrent question information Qn, while updating the content of the question; in the case where the synthesis answer information An and the synthesis correct-solution information Rn do not coincide with each other, the circulation question flag is set, and after the circulation question flag is set, the discrete question information items Q1n to Q5n are sequentially transmitted to the main control circuit unit 20B and the external control apparatuses 40; in the case where, when the concurrent question information Qn is transmitted again, the synthesis answer information An and the synthesis correct-solution information Rn coincide with each other, the circulation question flag is reset, and in the case where the synthesis answer information An and the synthesis correct-solution information Rn do not coincide with each other, the circulation question flag is kept set; the discrete abnormality determination unit 1617d compares the main-machine answer information A1n and the supplementary-apparatus answer information items A2n, A3n, A4n, and A5n based on the discrete question information items Q1n to Q5n with the main-machine correct-solution information R1n and the supplementary-apparatus correct-solution information items R2n, R3n, R4n, and R5n so as to determine whether or not an abnormality exists in the main control circuit unit 20B or the external control apparatuses 40.

When an abnormality in the external control apparatus 40 is detected by the discrete abnormality determination unit 1617d, the external apparatus abnormality notification unit 1617f notifies the main control circuit unit 20B of the occurrence of the abnormality.

This configuration corresponds to the invention recited in claim 3; the monitoring control circuit unit has main-machine correct-solution information, supplementary-apparatus correct-solution information, and synthesis correct-solution information, and performs an abnormality determination on the main control circuit unit and the external control apparatus by use of the concurrent question information and the discrete question information; in the case where there exists an abnormality in the external control apparatus, the monitoring control circuit unit notifies the main control circuit unit of the abnormality. Accordingly, because the abnormality monitoring is performed mainly by the monitoring control circuit unit, the control load on the main control circuit unit can be reduced, and in a normal condition, operation can be performed only through the communication of the concurrent question information and the synthesis answer information; therefore, the communication control load can be reduced.

Additionally, in the case where an abnormality occurs, firstly, based on the discrete question information item, an abnormality determination is performed on the main control circuit unit; in the case where the abnormality exists in the main control circuit unit, after reconfirmation, the restart processing is performed; in the case where the abnormality does not exist in the main control circuit unit, it is determined that the abnormality exists in the external control apparatus, and then the self-protection processing is performed on all the collaborating supplementary apparatuses; after that, an abnormal apparatus among the collaborating supplementary apparatuses is detected, and then discrete self-protection processing can be applied to the collaborating supplementary apparatus the abnormality in which has been detected.

Each of the discrete question information items Q1n to Q5n is question information to be transmitted to the main control circuit unit 20B or any one of the collaborating supplementary apparatuses 41 to 44 in the external control apparatus 40; the main control circuit unit 20B transmits to the monitoring control circuit unit 30B the main-machine answer information A1n or one of the supplementary-apparatus answer information items A2n to A5n based on the discrete question information items Q1n to Q5n.

This configuration corresponds to the invention recited in claim 4; the discrete question information is transmitted only to a subject apparatus, and answer information obtained from the subject apparatus is directly transmitted to the monitoring control circuit unit. Therefore, because communication for detecting an apparatus in which an abnormality exists is limited, answer information can immediately be obtained.

The discrete question information items Q1n to Q5n are concurrently transmitted to the main control circuit unit 20B or the external control apparatus 40; however, the main control circuit unit 20B and some of the collaborating supplementary apparatuses 41 to 44 in the external control apparatus 40 that are not the subject of the question may reply zero as the main-machine answer information A1n and the supplementary-apparatus answer information items A2n to A5n, or the main control circuit unit 20B may eliminate the main-machine answer information A1n and the supplementary-apparatus answer information items A2n to A5n obtained from the main control circuit unit 20B and some of the collaborating supplementary apparatuses 41 to 44 in the external control apparatus 40 that are not the subjects of a question so that only the answer information items that are the subjects of question information are transmitted to the monitoring control circuit unit 30B.

This configuration corresponds to the invention recited in claim 5; in this configuration, the discrete question information items are concurrently transmitted; however, answer information only from a subject apparatus is transmitted to the monitoring control circuit unit. Accordingly, both the concurrent question information and the discrete question information can be dealt with by use of the same communication specification.

As for the invention recited in claim 7, each of the question information items Qn, Q1n, Q2n, Q3n, Q4n, and Q5n is a control program that corresponds to at least one of calculation expressions that are utilized in the microprocessor 20 and the microprocessors 41a, 42a, 43a, and 44a in the external control apparatuses 40 or a program the content of which is the same as that of the control program; each of the question information items designates a copy program, stored in a different region of each of the same program memories 25B, 41b, 42b, 43b, and 44b, as a test program, and designates the number of an input constant table corresponding to input data utilized in the test program; the actual numerical values of the input constant tables are stored in the nonvolatile program memory 25B and the supplementary-apparatus program memories 41b, 42b, 43b, and 44b in the external control apparatus 40.

The main control circuit unit 20B generates the main-machine answer information A1n, based on the calculation expression and the input constants designated by the concurrent question information Qn or the discrete question information items Q1n; the external control apparatus 40 transmits the calculation result based on the calculation expression and the input constant designated by the concurrent question information Qn or the discrete question information items Q2n to Q5n, as the supplementary-apparatus answer information items A2n, A3n, A4n, and A5n, to the main control circuit unit 20B.

As for the invention recited in claim 8, the in-vehicle engine control apparatus 10B is an engine control apparatus; the first input sensor group 11a includes at least an accelerator position sensor for detecting the accelerator-pedal depressing level, a throttle position sensor for detecting an opening degree of an air-intake valve, an airflow sensor for measuring the air intake amount of the engine, and an engine rotation sensor for calculating the engine rotation speed; the first electric load group 12a includes at least a motor for controlling the valve opening degree of an air-intake throttle and a fuel-injection electromagnetic valve. The test program in the main control circuit unit 20B is a control program for calculating the throttle-valve-opening-degree increase/decrease target correction value $\Delta\tau$ corresponding to the engine-output-torque increase/decrease demand correction value $\Delta\theta$ required by the external control apparatus 40; the external control apparatus 40 includes any one of the transmission control unit 41 that switches the transmission stage of the transmission in response to the vehicle speed and the accelerator position sensor, the electric power steering system 42 that responds to the operation of the steering wheel, the stability control unit 43 for controlling the vehicle posture, and the antilock brake system 44 that responds to the foot brake pedal; the external control apparatus 40 transmits the engine-torque increase/decrease demand correction value $\Delta\tau$ to the main control circuit unit 20B, via the second serial communication circuits 28, 41c, 42c, 43c, and 44c; the test program in the external control apparatus 40 is a control program for calculating the engine-torque increase/decrease demand correction value $\Delta\tau$ in response to an input signal to the external control apparatus 40.

As for the invention recited in claim 9, the nonvolatile program memory 25B further incorporates a control program corresponding to an external apparatus abnormality processing unit 1817b. The external apparatus abnormality processing unit 1817b, which corresponds to a first abnormality processing unit that operates based on discrete abnormality determination information, on the external control apparatus 40, transmitted to the main control circuit unit 20B through the discrete abnormality determination unit 1617d and the external apparatus abnormality notification unit 1617f in the monitoring control circuit unit 30B, does not respond at least to an increase demand out of engine-output-torque increase/decrease demand correction value $\Delta\tau$ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20B.

As for the invention recited in claim 10, the monitoring control circuit unit 30B performs communication with regard to input/output signals, of the second input sensor group 11b and the second electric load group 12b, which are part of input/output signals for the microprocessor 20, through the first serial communication circuits 27 and 37.

The downlink communication information DND, which is transmitted from the main control circuit unit 20B to the monitoring control circuit unit 30B, includes setting constants or control outputs that are required by the monitoring control circuit unit 30B, the answer information items An−1, A1n−1, A2n−1, A3n−1, A4n−1, and A5n−1 for the question information items Qn−1, Q1n−1, Q2n−1, Q3n−1, Q4n−1, and Q5n−1 obtained from the immediately previous uplink communication information UPD, the second flag information, and the code check information; the uplink communication information UPD, which is transmitted from the monitoring control circuit unit 30B to the main control circuit unit 20B, includes input signal information for the monitoring control circuit unit 30B or the storage information for the setting constants or the control outputs obtained from the main control circuit unit 20B, present question information items Qn, Q1n, Q2n, Q3n, Q4n, and Q5n, the first flag information, and code check information.

The first flag information changes at the timing when the contents of the question information items Qn, Q1n, Q2n, Q3n, Q4n, and Q5n are updated in the monitoring control circuit unit 30B, and serves as a single-bit or multi-bit recognition signal that reports the change in the question information, and the second flag information changes at the timing when the main control circuit unit 20B updates the contents of the answer information items An, A1n, A2n, A3n, A4n, and A5n in response to an update of the contents of the question information items Qn, Q1n, Q2n, Q3n, Q4n, and Q5n and serves as a single-bit or multi-bit recognition signal that reports the update of the answer information.

As for the invention recited in claim 11, the monitoring control circuit unit 30B is further provided with the question information updating unit 1704 and a response delay determination unit 1616. The question information updating unit 1704 recurrently transmits question information included in the uplink communication information UPD in such a way that the question information is the same in a plurality times of communication instances and after transmitting the question information for a predetermined duration or longer, updates the question information; the response delay determination unit 1616 is a unit that determines that an abnormality exists in the main control circuit unit 20B, when the time between the timing when the monitoring control circuit unit 30B changes the contents of the first flag information and the timing when the reception data of the second flag information changes exceeds a predetermined time.

As for the invention recited in claim 12, the monitoring control circuit unit 30B is further provided with a code error detection unit 1614 and a reset processing unit 1619. The code error detection unit 1614 detects the intrusion of bit information or the loss of bit information in the reception data in the downlink communication information DND, by use of a code check unit exemplified by the sum check or the CRC check. The reset processing unit 1619 serves as the second abnormality processing unit that initializes and restarts the main control circuit unit 20B, in response to the result of monitoring/tallying of the fact that the abnormality determination unit 1617*d* has determined that an abnormality exists in the main control circuit unit 20B, the fact that the response delay determination unit 1616 has determined an answer delay, or the fact that the code error detection unit 1614 has detected an code error in the downlink communication information.

The monitoring control circuit unit 30B includes the auxiliary microprocessor 30*b*, and the auxiliary non-volatile program memory 35B and the auxiliary RAM memory 34 that collaborate with the auxiliary microprocessor 30*b*.

The auxiliary non-volatile program memory 35B includes control programs corresponding to the question information generation unit 1705*a*, the question information updating unit 1704, abnormality determination unit 1617*a* and 1617*d*, the response delay determination unit 1616, the code error determination unit 1614 for the downlink communication information, and the reset processing unit 1619; in the auxiliary non-volatile program memory 35B, there is also stored the correct-solution information items Rn, R1*n*, R2*n*, R3*n*, R4*n*, and R5*n* for the question information items Qn, Q1*n*, Q2*n*, Q3*n*, Q4*n*, and Q5*n*.

The result of tallying in monitoring is written in the auxiliary RAM memory 34.

This configuration corresponds to the invention recited in claim 13; the monitoring control circuit unit includes the auxiliary microprocessor, the auxiliary non-volatile program memory, and the auxiliary RAM memory. Accordingly, the specification of the abnormality monitoring and control can readily be changed by use of the control program stored in the auxiliary non-volatile program memory.

As for the invention recited in claim 14, the nonvolatile program memory 25B is further provided with control programs corresponding to the erroneous-answer transmission unit 1503*b* and a tallied information monitoring unit 1818*a*; the uplink communication information UPD includes tallied information obtained through abnormality-monitoring by the monitoring control circuit unit 30B.

The erroneous-answer transmission unit 1503*b* is a unit that intentionally generates erroneous-solution information items for the question information items Qn and Q1*n* and transmits the erroneous-solution information items, as the answer information items An and A1*n*; the intentional transmission of an erroneous answer is performed by the erroneous-answer transmission unit at the timing when there exist some margins for the tallied value in the abnormality monitoring and the reset processing unit 1619 in the monitoring control circuit unit 30B is not caused to output a reset output RST2 by only a one-time erroneous-answer response.

The tallied information monitoring unit 1818*a* is a unit in which, by monitoring the tallied information, the main control circuit unit 20B counter-monitors whether or not the monitoring control circuit unit 30B normally operates.

As for the invention recited in claim 15, the nonvolatile program memory 25B further includes control programs corresponding to a code error detection unit 1814 or a stored-information abnormality detection unit 1818*b* and a reset processing unit 1819.

The code error detection unit 1814 detects the intrusion of bit information or the loss of bit information in the reception data in the uplink communication information UPD, by use of a code check unit exemplified by the sum check or the CRC check; the storage state of the setting information and the output information that have been received and stored, as part of the downlink communication information DND, by the monitoring control circuit unit 30B and the acknowledgement information that has been received, as part of the uplink communication information UPD, by the main control circuit unit 20B are compared, in the main control circuit unit 20B, by the stored-information abnormality detection unit 1818*b* so that it is determined whether or not an abnormality exists; the reset processing unit 1819 serves as the third abnormality processing unit that initializes and restarts the monitoring control circuit unit 30B, in response to the result of counter-monitoring/tallying of the fact that the code error detection unit 1814 has detected a code error in the uplink communication information UPD, the fact that the stored-information abnormality detection unit 1818*b* has detected an abnormality in the stored information, or the fact that the tallied information obtained through the abnormality monitoring by the tallied information monitoring unit 1818*a* has been abnormal.

Next, Embodiment 3 of the present invention will be explained.

Embodiment 3

(1) Detailed Explanation for Configuration of Embodiment 3

Figure 16:
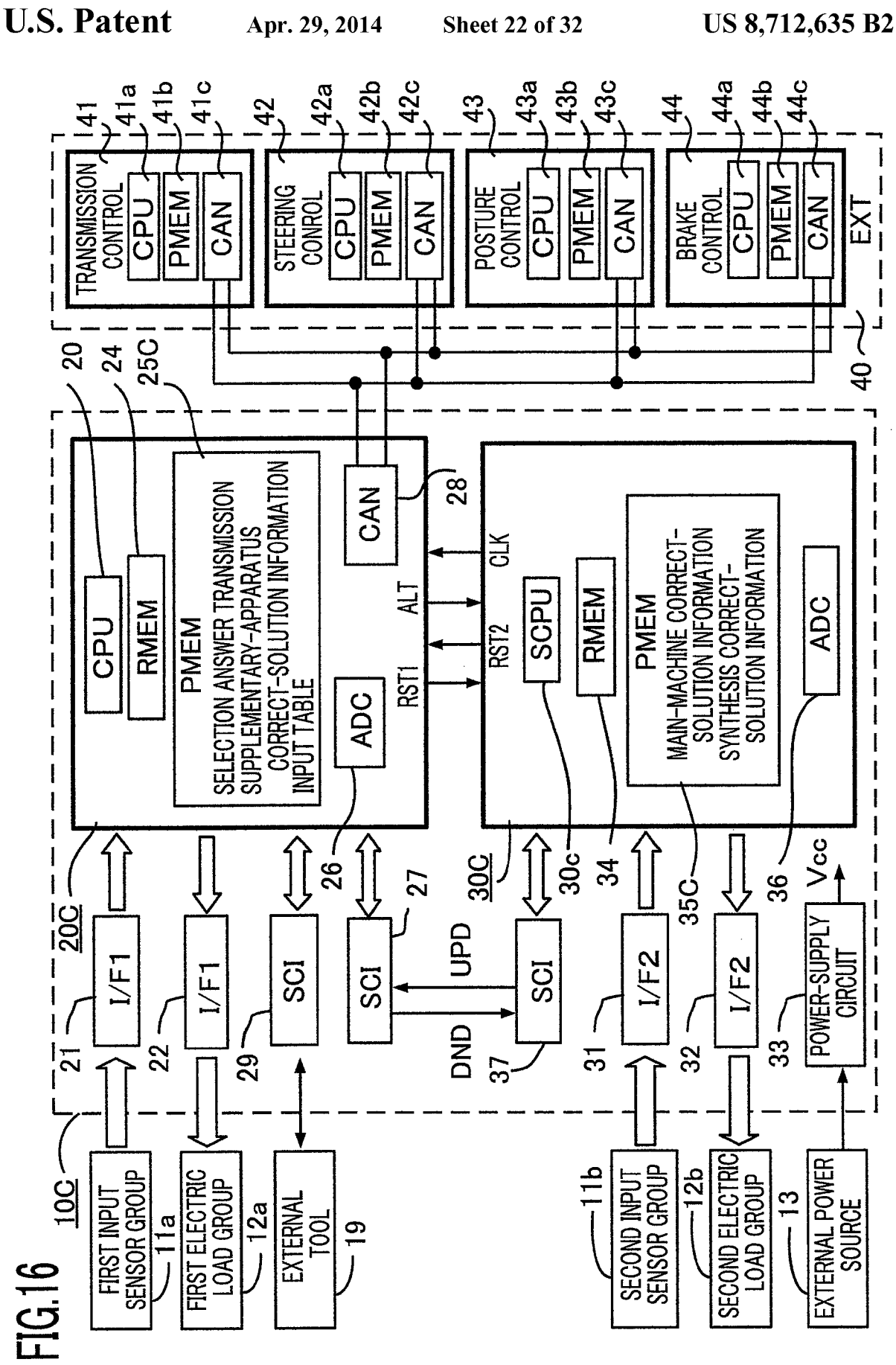
FIG. 16 is an overall block diagram of an in-vehicle electronic control apparatus, having a monitoring control apparatus, according to Embodiment 3 of the present invention.

An in-vehicle electronic control apparatus according to Embodiment 3 of the present invention will be explained below. FIG. 16 is an overall block diagram of an in-vehicle electronic control apparatus having a monitoring control circuit according to Embodiment 3 of the present invention. The difference between the configuration in FIG. 16 and the configuration in FIG. 1 will mainly be explained below. In FIG. 16, the same reference characters denote constituent elements that are the same as or equivalent to those in FIG. 1. In FIG. 16, an in-vehicle electronic control apparatus 10C is provided with a main control circuit unit 20C formed mainly of a microprocessor 20 that collaborates with a program memory 25C and a monitoring control circuit unit 30C formed mainly of an auxiliary microprocessor 30*c* that collaborates with an auxiliary program memory 35C; the in-vehicle electronic control apparatus 10C is configured in such a way as to receive electric power from an external power source 13, which is an in-vehicle battery, so as to operate.

As is the case with FIG. 1 in Embodiment 1, first and second sensor groups 11*a* and 11*b*, first and second electric load groups 12*a* and 12*b*, an external tool 19, and an external control apparatus 40 are externally connected to the electronic control apparatus 10C. As is the case with FIG. 1, first and second input interface circuits 21 and 31, first and second output interface circuits 22 and 32, a first serial interface circuit 27 and 37, a tool interface circuit 29, and a power-supply circuit 33 are incorporated in the electronic control apparatus 10C. An unillustrated direct memory access controller is connected between the parallel input/output bus for the serial-parallel converter 37 included in the serial communication circuit and the data bus for the auxiliary microprocessor 30*c*, and transmits data to and receives data from a RAM memory 34 for calculation processing, without the intermediary of the auxiliary microprocessor 30*c*.

Similarly, an unillustrated direct memory access controller is connected also between the parallel input/output bus for the serial-parallel converter 27 included in the first serial communication circuit and the data bus for the microprocessor 20, and transmits data to and receives data from the RAM memory 24 for calculation processing, without the intermediary of the microprocessor 20.

In addition, various kinds of control programs, described later with reference to FIGS. 19 and 22, in addition to a communication control program and an input/output control program are stored in the program memory 25C. Additionally, various kinds of control programs, described later with reference to FIGS. 20 and 21, in addition to a communication control program and an input/output processing program are stored in the auxiliary program memory 35C; correct-solution information for a Q&A diagnosis is also stored in the auxiliary program memory 35C.

The electronic control apparatus 10C is configured in such a way that a first serial communication circuit, which is formed of a pair of serial-parallel converters 27 and 37, forms a full-duplex block communication circuit, and downlink communication information DND transmitted from the main control circuit unit 20C to the monitoring control circuit unit 30C and uplink communication information UPD transmitted from the monitoring control circuit unit 30C to the main control circuit unit 20C can concurrently be transmitted and received. A communication permission signal ALT generated by the main control circuit unit 20C and a communication synchronization signal CLK generated by the monitoring control circuit unit 30C are as described above with reference to FIG. 2.

The uplink communication information UPD, which is communication information to be stored in the RAM memory 24, includes, as represented in a list in FIG. 17B(G) described later, Q&A question information, input signal information obtained from the second input sensor group 11b, setting completion information, monitoring/tallying information, first flag information, and code check information. The downlink communication information DND, which is communication information to be stored in the RAM memory 34, includes, as represented in a list in FIG. 17B(H), Q&A answer information, setting information items, such as control constants, which are required by the monitoring control circuit unit 30C, output signal information for the second electric load group 12b, second flag information, and code check information.

As is the case with FIG. 1, the setting completion information items in the uplink communication storage information UPD denote the setting information and the output signal information that are stored, as downlink communication information DND, in the RAM memory 34; the electronic control apparatus 10C is configured in such a way that the main control circuit unit 20C can ascertain whether or not the setting information and the output signal information have been transmitted correctly.

The correct-solution information corresponding to question information is preliminarily stored in the auxiliary program memory 35C when the product is shipped; the auxiliary microprocessor 30c randomly transmits question information items and compares answer information items transmitted by the microprocessor 20 with corresponding correct-solution information items so as to monitor the operation status of the microprocessor 20; the microprocessor 20 intentionally sends an erroneous answer and counter-monitors whether or not the monitoring control circuit unit 30C performs appropriate monitoring and controlling.

As a result, when detecting an abnormality in the main control circuit unit 20C, the monitoring control circuit unit 30C initializes and restarts the main control circuit unit 20C by unit of a reset output RST2, and when detecting an abnormality in the monitoring control circuit unit 30C, the main control circuit unit 20C initializes and restarts the monitoring control circuit unit 30C by unit of a reset output RST1.

FIGS. 17A and 17B are each part of a set of lists of contents of various kinds of memories in the in-vehicle electronic control apparatus 11C illustrated in FIG. 16. Next, FIGS. 17A and 17B will be explained. FIG. 17A(A) is a table in which control programs and control constants stored in the nonvolatile program memory 25C are listed; the details thereof will be described later with reference to flowcharts represented in FIGS. 19 and 22. FIG. 17A(B) is a table in which control programs and control constants stored in the nonvolatile program memory 35C are listed; the details thereof will be described later with reference to flowcharts represented in FIGS. 20 and 21.

FIG. 17A(C) represents concurrent question information Qn(n=0, 1, 2, - - -, F) that is applied to Embodiment 3; as the concurrent question information Qn, input table numbers (n=0 to F) are designated, and the input tables are stored in the nonvolatile program memory 25C or in the supplementary-apparatus program memories 41b to 44b. FIG. 17B(D) represents synthesis answer information An, main-machine answer information A1n, and supplementary-apparatus answer information items A2n to A5n; the synthesis answer information is a numerical value of, for example, 16 bits or less, and other discrete answer information items A1n to A5n are a numerical value of 13 bits or less.

FIG. 17B(E) represents synthesis correct-solution information Rn, main-machine correct-solution information R1n, and supplementary-apparatus correct-solution information items R2n to R5n; the synthesis correct-solution information is a numerical value of, for example, 16 bits or less, and other discrete correct-solution information items R1n to R5n are a numerical value of 13 bits or less. FIG. 17B(G) is a list of uplink communication information items to be stored in the RAM memory 24. FIG. 17B(H) is a list of downlink communication information items to be stored in the RAM memory 34.

In addition, the most important characteristic of Embodiment 3 is that, while the nonvolatile program memory 25C includes supplementary-apparatus correct-solution information items R2n to R5n and an external-apparatus monitoring unit, the monitoring control circuit unit 30C has only synthesis correct-solution information Rn and main-machine correct-solution information R1n. Accordingly, the main control circuit unit 20C transmits synthesis answer information An or main-machine answer information A1n to the monitoring control circuit unit 30C, by use of a selection answer generation unit.

Next, FIG. 18, which is a transition chart of question information and answer information in the in-vehicle electronic control apparatus illustrated in FIG. 16, will be explained. FIGS. 18(A), 18(B), 18(C), 18(D), 18(E), 18(F), and 18(G) represent respective transitions of question information items and answer information items with regard to the monitoring control circuit unit 30C, the main control circuit unit 20C, the microprocessor 20 and the communication terminal 28 of the second serial communication circuit, the transmission control unit (TCU) 41 which is a collaborating supplementary apparatus, the electric power steering (EPS) system 42 which is a collaborating supplementary apparatus, the stability control unit (SCU) 43 which is a collaborating supplementary apparatus, and the antilock brake system (ABS) 44 which is a collaborating supplementary apparatus. In addition, in the following explanation, the transmission control unit (TCU) 41, the electric power steering (EPS) system 42, the stability control unit (SCU) 43, and the antilock brake system (ABS) 44 are referred to simply as the collaborating supplementary apparatuses 41, 42, 43, and 44.

Figure 18:
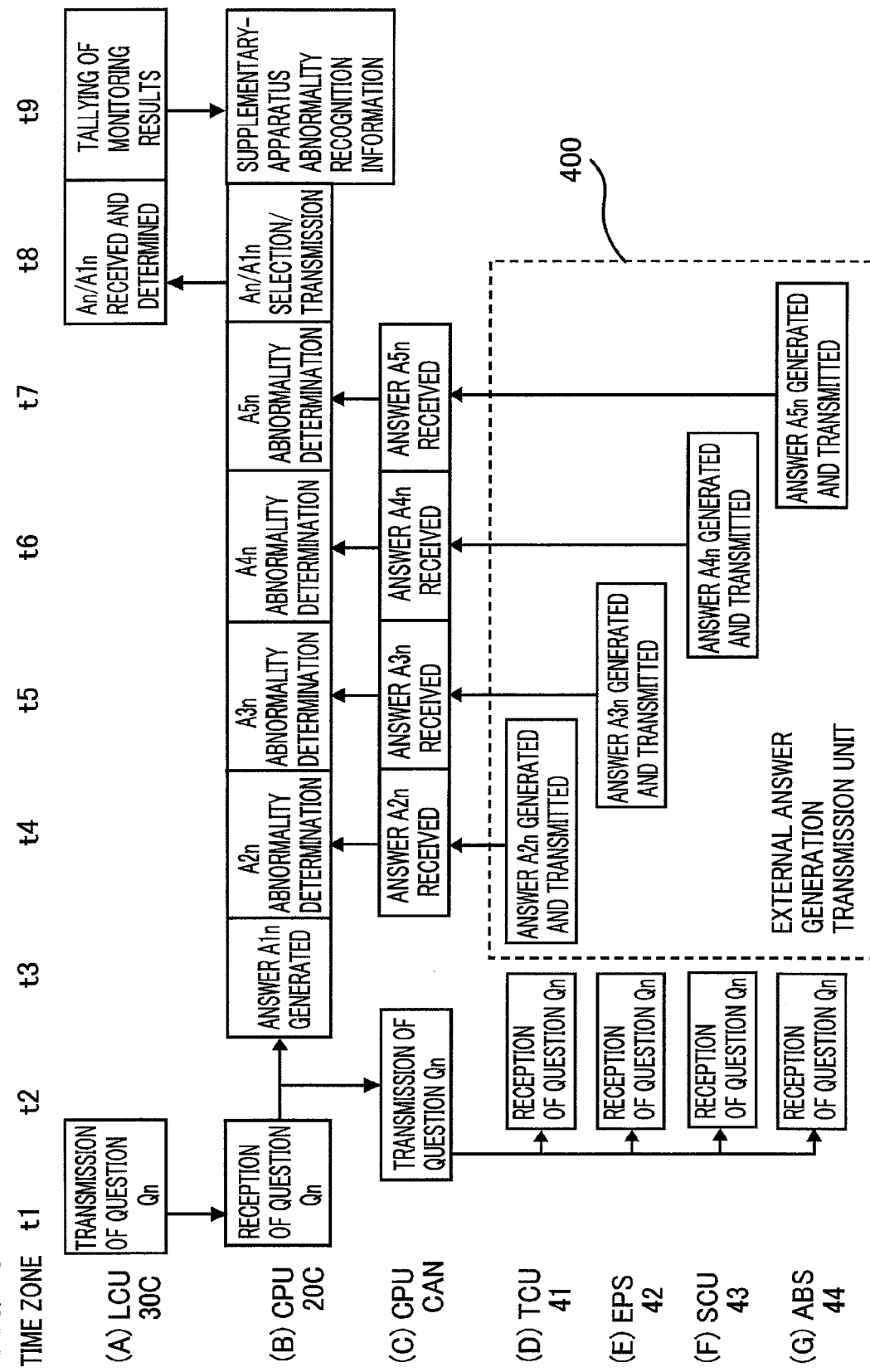
FIG. 18 is a transition diagram for question information and answer information in an in-vehicle electronic control apparatus, having a monitoring control apparatus, according to Embodiment 3 of the present invention.

In a time zone t1 represented in FIG. 18, the monitoring control circuit unit 30C in FIG. 18(A) generates concurrent question information Qn(n=0 to F), and the main control circuit unit 20C in FIG. 18(B) receives the concurrent question information Qn via the first serial communication circuit. Next, in a time zone t2, the main control circuit unit 20C in FIG. 18(B) transfers concurrent question information Qn to the collaborating supplementary apparatuses 41 to 44, via the second serial communication circuit in FIG. 18(c).

In a time zone t3, the main control circuit unit 20C in FIG. 18(B) generates main-machine answer information A1n. In a time zone t4, the collaborating supplementary apparatus 41 in FIG. 18(D) generates supplementary-apparatus answer information A2n and transmits the supplementary-apparatus answer information A2n to the main control circuit unit 20C in FIG. 18(B) via the second serial communication circuit in FIG. 18(C). The main control circuit unit 20C compares the transmitted supplementary-apparatus answer information A2n with the supplementary-apparatus correct-solution information R2n that has been stored in the nonvolatile program memory 25C, and determines whether or not there exists an abnormality.

In a time zone t5 represented in FIG. 18, the collaborating supplementary apparatus 42 in FIG. 18(E) generates supplementary-apparatus answer information A3n and transmits the supplementary-apparatus answer information A3n to the main control circuit unit 20C in FIG. 18(B) via the second serial communication circuit in FIG. 18(C). The main control circuit unit 20C compares the transmitted supplementary-apparatus answer information A3n with the supplementary-apparatus correct-solution information R3n that has been stored in the nonvolatile program memory 25C, and determines whether or not there exists an abnormality.

In a time zone t6 in FIG. 18, the collaborating supplementary apparatus 43 in FIG. 18(F) generates supplementary-apparatus answer information A4n and transmits the supplementary-apparatus answer information A4n to the main control circuit unit 20C in FIG. 18(B) via the second serial communication circuit in FIG. 18(C). The main control circuit unit 20C compares the transmitted supplementary-apparatus answer information A4n with the supplementary-apparatus correct-solution information R4n that has been stored in the nonvolatile program memory 25C, and determines whether or not there exists an abnormality.

In a time zone t7 represented in FIG. 18, the collaborating supplementary apparatus 44 in FIG. 18(G) generates supplementary-apparatus answer information A5n and transmits the supplementary-apparatus answer information A5n to the main control circuit unit 20C via the second serial communication circuit in FIG. 18(C). The main control circuit unit 20C in FIG. 18(B) compares the supplementary-apparatus answer information A5n with the supplementary-apparatus correct-solution information R5n that has been stored in the nonvolatile program memory 25C, and determines whether or not there exists an abnormality.

In a time zone t8 in FIG. 18, the main control circuit unit 20C in FIG. 18(B) generates synthesis answer information An and transmits the synthesis answer information An to the monitoring control circuit unit 30C via the first serial communication circuit or transmits only the main-machine answer information A1n to the monitoring control circuit unit 30C via the first serial communication circuit. In addition, in the case where an abnormality is detected in any of the collaborating supplementary apparatuses 41 to 44, the main control circuit unit 20C transmits the main-machine answer information A1n, instead of the synthesis answer information An, to the monitoring control circuit unit 30C.

The monitoring control circuit unit 30C in FIG. 18(A) compares the synthesis answer information An or the main-machine answer information A1n with the synthesis correct-solution information Rn or the main-machine correct-solution information R1n that has been stored in the auxiliary program memory 35C, and determines whether or not there exists an abnormality; in the case where there exists an abnormality in the main control circuit unit 20C, the monitoring control circuit unit 30C generates a reset output described later in a time zone t9, in response to the result of tallying the abnormalities that have occurred.

In the case where the obtained answer information coincides with the main-machine correct-solution information R1n, but does not coincide with the synthesis correct-solution information Rn, the monitoring control circuit unit 30C recognizes that one of the collaborating supplementary apparatuses 41 to 44 is determined to be abnormal and transmits external apparatus abnormality recognition information to the main control circuit unit 20C. Accordingly, in the case of Embodiment 3, the main control circuit unit 20C monitors an abnormality in the external control apparatus 40, and the monitoring control circuit unit 30C also recognizes the occurrence of the abnormality.

In addition, an external answer generation transmission unit 400 that generates the supplementary-apparatus answer information items A2n to A5n and transmits them to the main control circuit unit 20C is performed in accordance with control programs stored in the supplementary-apparatus program memories 41b to 44b in the collaborating supplementary apparatuses 41 to 44.

The total time period from the time zone t1 to the time zone t9 represented in FIG. 18 is, for example, 40 [msec]; when this series of operations is completed, the concurrent question information is updated to Qn+1, and the same abnormality monitoring is repeated based on new question information.

(2) Detailed Explanation For Work and Operation of Embodiment 3

Figure 19B:
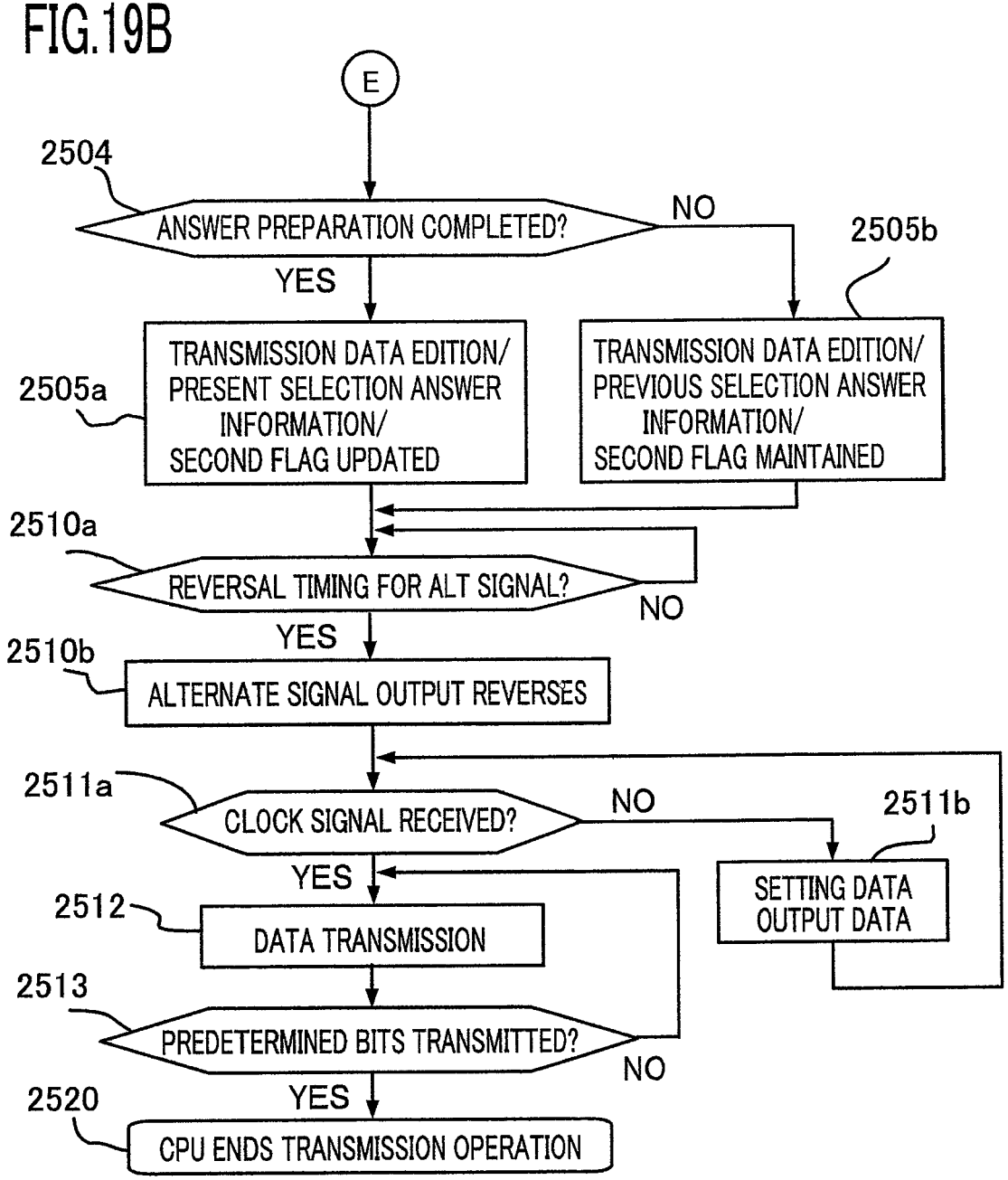
Figure 20:
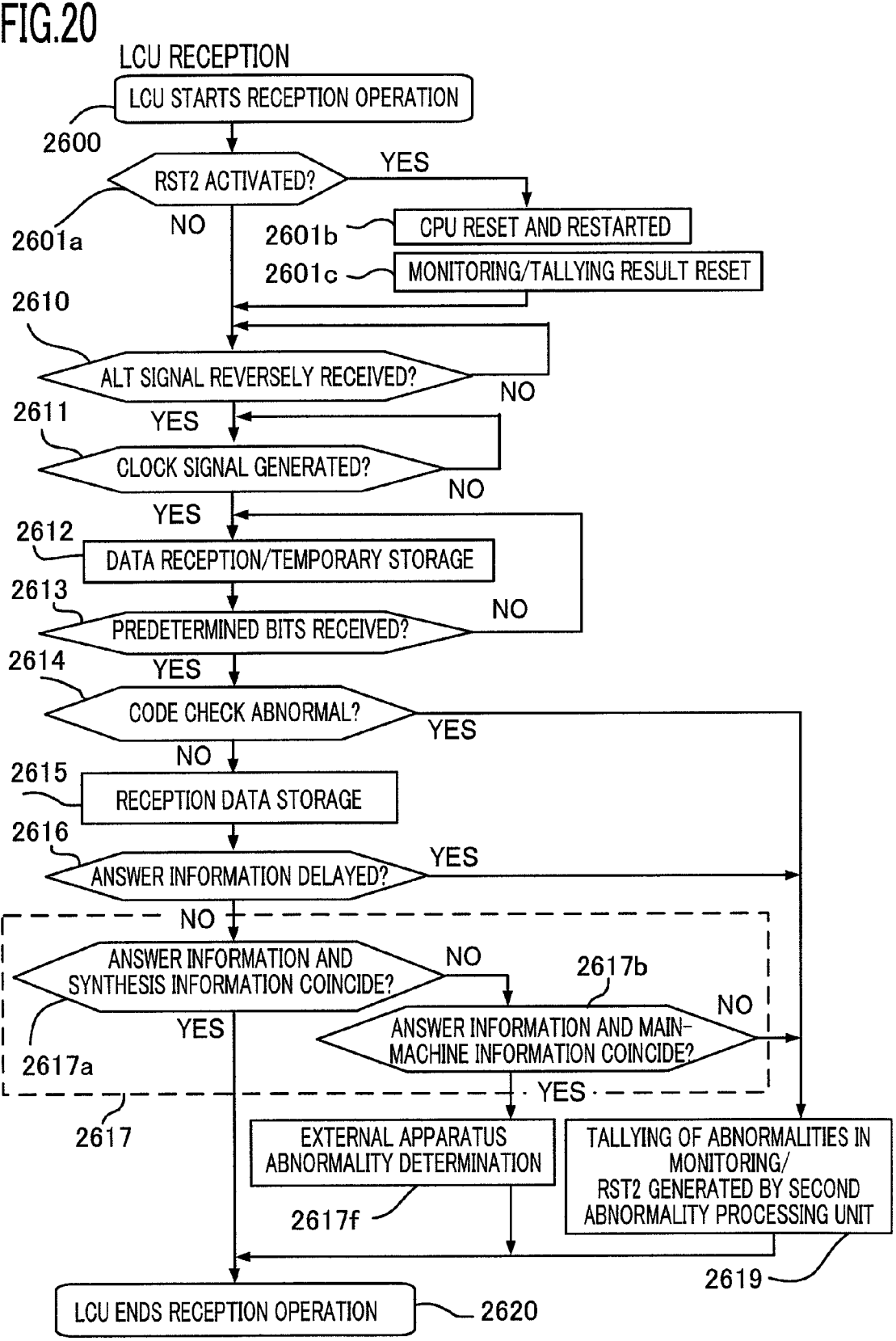
FIG. 20 is a flowchart representing the reception operation of a monitoring control circuit unit in an in-vehicle electronic control apparatus, having a monitoring control circuit, according to Embodiment 3 of the present invention.
Figure 21:
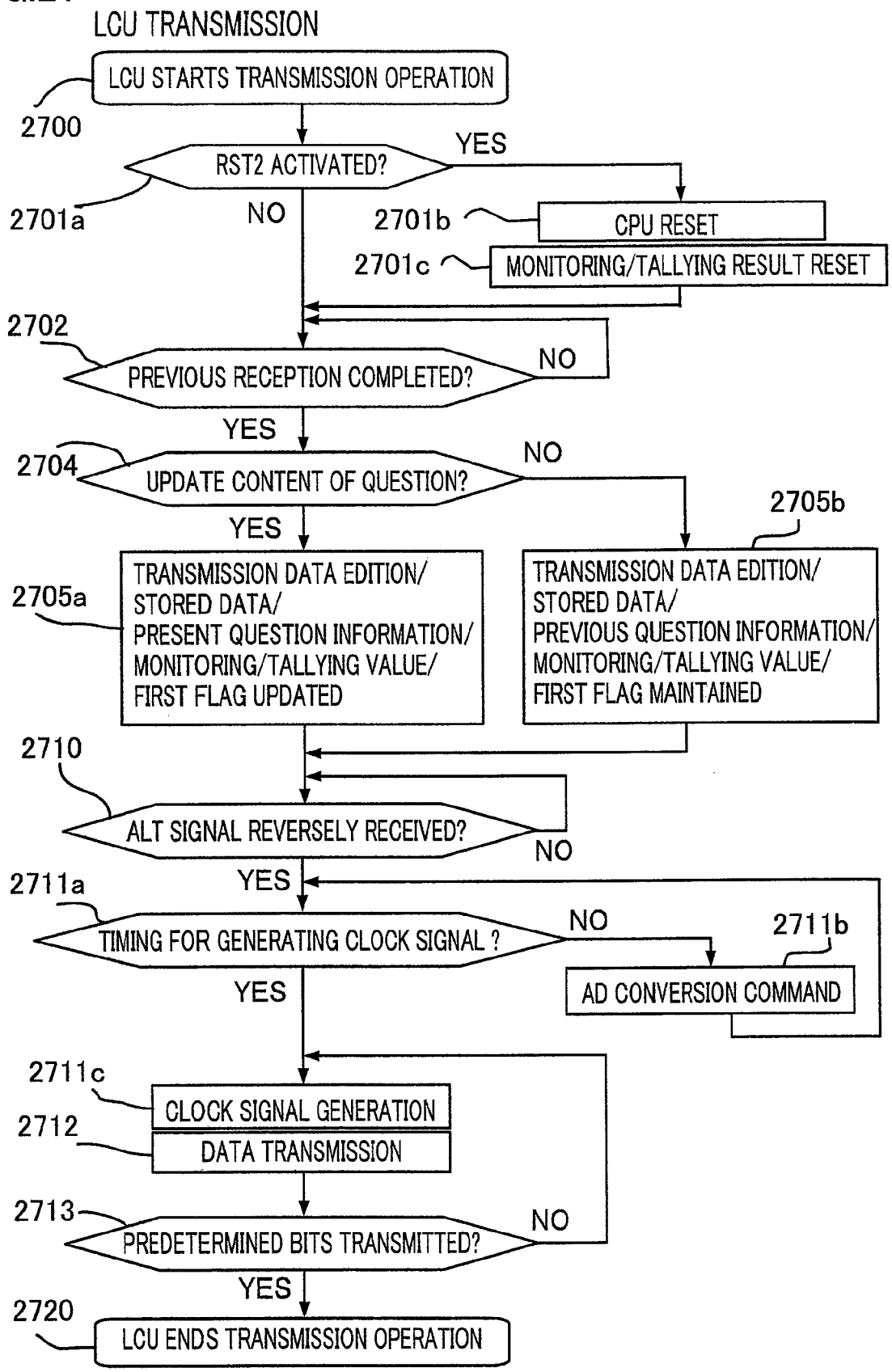
FIG. 21 is a flowchart representing the transmission operation of a monitoring control circuit unit in an in-vehicle electronic control apparatus, having a monitoring control circuit, according to Embodiment 3 of the present invention.
Figure 22A:
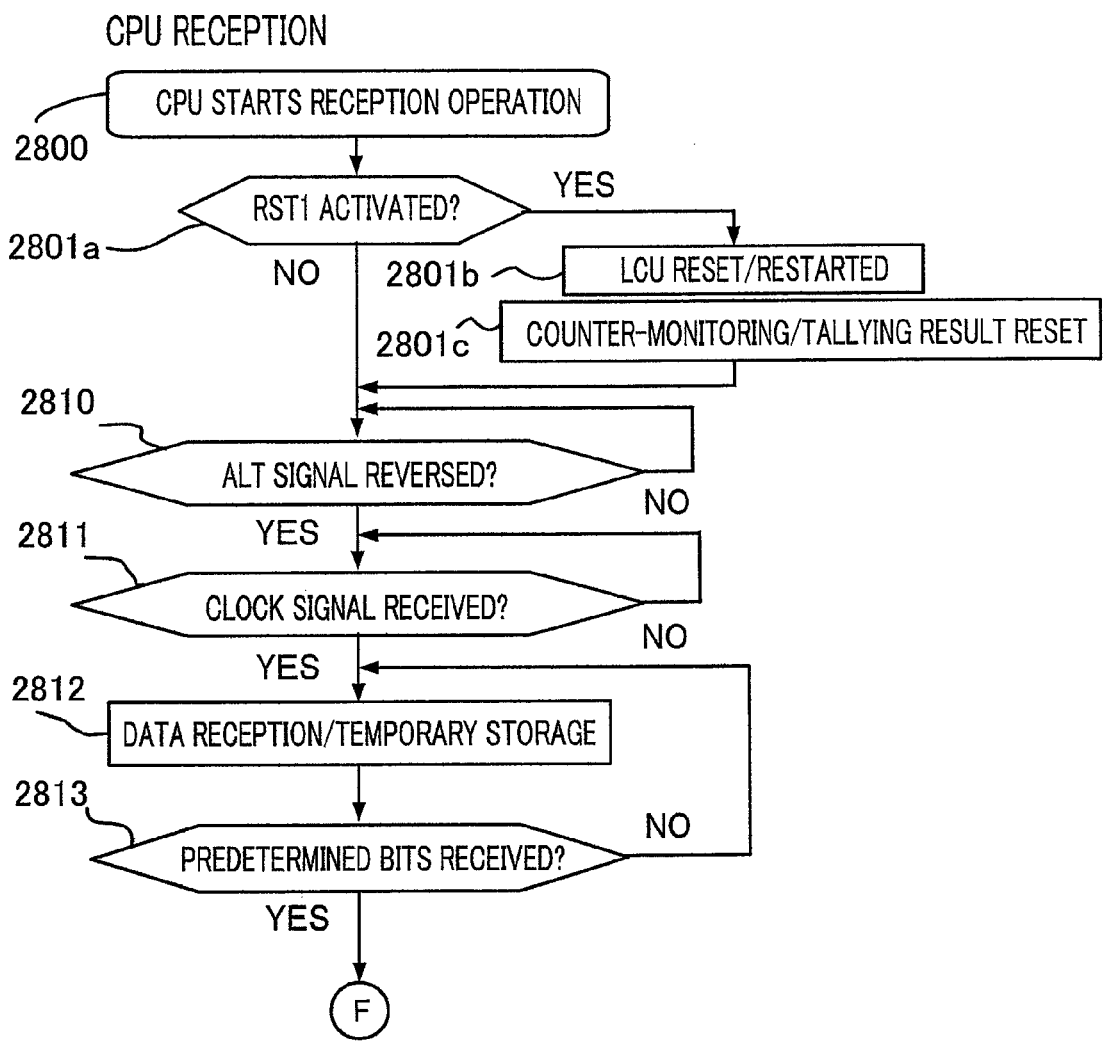
Figure 23:
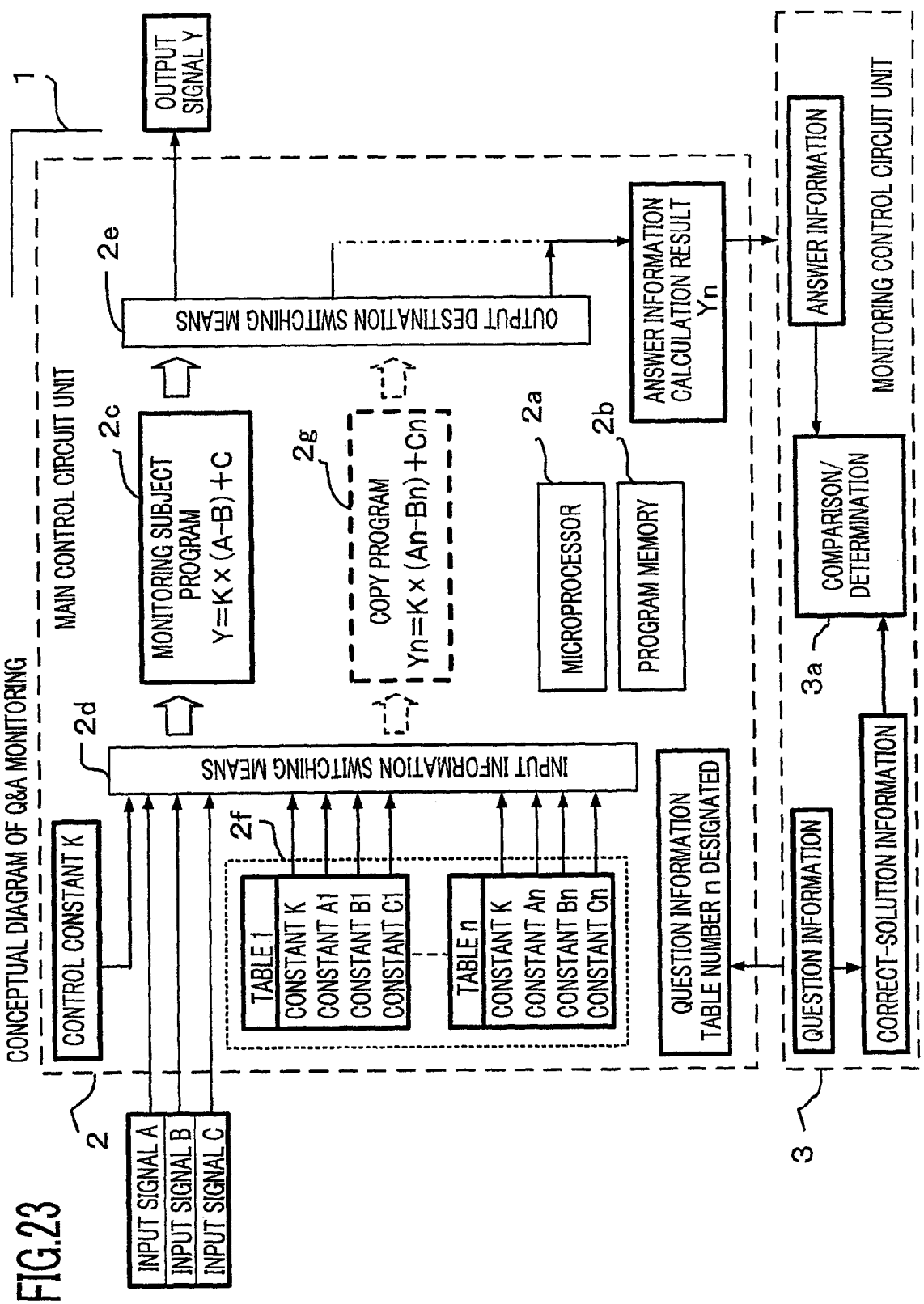
FIG. 23 is a conceptual diagram of an abnormality determination unit, based on question information, in a conventional apparatus.

The work and operation of the in-vehicle electronic control apparatus, configured as illustrated in FIG. 16, according to Embodiment 3 of the present invention will be explained below. FIGS. 19A and 19B are each part of a flowchart representing the transmission operation of the main control circuit unit 20C; FIG. 20 is a flowchart representing the reception operation of the monitoring control circuit unit 30C; FIG. 21 is a flowchart representing the transmission operation of the monitoring control circuit unit 30C; FIGS. 22A and 22B are each part of a flowchart representing the reception operation of the main control circuit unit 20C.

First, in FIG. 16, when the external power source 13 is connected through an unillustrated power switch to the electronic control apparatus 10C, the microprocessor 20 drives and controls the first electric load group 12a and the second electric load group 12b, based on the operation statuses of the first input sensor group 11a and the second input sensor group 11b and the contents of a control program in the program memory 25C.

In particular, the first input sensor group 11a and the first electric load group 12a perform open/close and on/off operations, in synchronization with the rotation of the engine; for example, in the case where a 4-cylinder and 4-cycle gasoline engine rotates at a rotation speed of 6000 [rpm], the ignition control and the fuel injection control are performed in a cycle period of 5 [msec]; however, in the case where the rotation speed of the engine is 600 [rpm], the foregoing controls may be performed in a cycle period of 50 [msec].

In contrast, because not performing operations in synchronization with the rotation of the engine, the second input sensor group 11b and the second electric load group 12b do not perform frequent operations; however, because, when the operation status changes, signal communication is required to be rapidly performed, it is desirable that communication with a constant cycle period is relatively frequently performed regardless of the rotation speed of the engine.

Next, the transmission operation of the main control circuit unit 20C illustrated in FIG. 16 will be explained; what differ from the transmission operation represented in FIGS. 5A and 5B in Embodiment 1 will mainly be explained. In addition, in FIGS. 19A and 19B, the reference characters in 500s in FIGS. 5A and 5B are replaced by those in 2500s.

In FIG. 19A, the step 2500 is a step in which the microprocessor 20 starts its transmission operation for the monitoring control circuit unit 30C. In the steps 2501a, 2501b, and 2501c, the monitoring control circuit unit 30C is initialized to be restarted in response to a reset output RST1 generated in the step 2819 described later, and the result of tallying abnormalities in counter-monitoring in the step 2819 is reset so that the reset output RST1 is halted.

In the step 2502a, which is a determination step, the operation status of a determination flag, in which there is stored whether or not an abnormality in any one of the collaborating supplementary apparatuses 41 to 44 has been detected in the step 2816c (refer to FIG. 22B) described later, is monitored; in accordance with whether or not an abnormality is caused in any one of the collaborating supplementary apparatuses 41 to 44, the step 2502a is followed by the step 2502b or 2502c. In the case where the collaborating supplementary apparatuses are normal, the supplementary-apparatus answer information items A2n to A5n obtained in the step 2816b (refer to FIG. 22B) described later are selected in the step 2502b; in the step 2502c, in the case where there exists an abnormality in any one of the collaborating supplementary apparatuses 41 to 44, the microprocessor 20 decides that only the main-machine answer information A1n is selected.

In the steps 2503a, 2503b, 2503c, and 2504 that are carried out after the step 2502a or the step 2502c, depending on whether or not preparation for an answer by the erroneous-answer generation unit 2503b and the main-machine answer generation unit 2503c has been completed, the step 2505a or 2505b is selected.

The step 2505a corresponding to a selection answer generation unit, not only the present answer information is decided, but also the content of second flag information F is updated. In addition, the answer information to be selected in the step 2505a is decided based on the contents of the supplementary-apparatus answer information items A2n to A5n stored in the step 2816b and the content of the main-machine answer information A1n generated in the step 2503c; in the case where the step 2502b is selected, the synthesis answer information An is utilized, and in the case where the step 2502c is selected, the main-machine answer information A1n is selected.

In the step 2505b, as the present answer information, the previous answer information is directly utilized, and it is decided that the second flag information F is not updated. In the process after and including the step 2510a, the answer information decided in the step 2505a or 2505b, the setting and output information items added in the step 2511b, and the code check information added in the step 2512 are transmitted to the monitoring control circuit unit 30C, and then the process proceeds to the operation end step 2520. In the operation end step 2520, other control operations are performed; after that, the step 2520 is circularly followed by the operation start step 2500 within a predetermined time.

Next, the reception operation of the monitoring controlling circuit unit 30C illustrated in FIG. 16 will be explained with reference to FIG. 20; what differ from FIG. 6 will mainly be explained. In addition, in FIG. 20, the reference characters in 600s in FIG. 6 are replaced by those in 2600s. In FIG. 20, the step 2600 is a step in which the auxiliary microprocessor 30c starts its reception operation.

In the steps 2601a, 2601b, and 2601c, the microprocessor 20 is initialized to be restarted in response to a reset output RST2 generated in the step 2619 described later, and the result of tallying abnormalities in monitoring in the step 2619 is reset so that the reset output RST2 is halted. In the process from the step 2610 to the step 2616, the data received from the main control circuit unit 20C is checked by a code error detection unit 2614 and stored in the auxiliary RAM memory 34; a response delay determination unit 2616 determines whether or not a delay exists in the answer information from the main control circuit unit 20C.

In the step 2617a, it is determined whether or not the present answer information obtained in the step 2615 coincides with the synthesis correct-solution information Rn preliminarily stored in the auxiliary program memory 35C; in the case where the present answer information obtained coincides with the synthesis correct-solution information Rn, a "YES" determination is made and the step 2617a is followed by the operation end step 2620; in the case where the present answer information obtained does not coincide with the synthesis correct-solution information Rn, a "NO" determination is made and the step 2617a is followed by the step 2617b. In the step 2617b, it is determined whether or not the present answer information obtained in the step 2615 coincides with the main-machine correct-solution information R1n preliminarily stored in the auxiliary program memory 35C; in the case where the present answer information coincides with the main-machine correct-solution information R1n, a "YES" determination is made and the step 2617b is followed by the operation end step 2617f; in the case where the present answer information does not coincide with the main-machine correct-solution information R1n, a "NO" determination is made and the step 2617b is followed by the step 2619.

The block 2617 configured with the steps 2617a and 2617b is an abnormality analysis determination unit. The step 2617f, an external apparatus abnormality recognition notification unit, recognizes the fact that there exists an abnormality in any one of the collaborating supplementary apparatuses 41 to 44, and notifies the main control circuit unit 20C of the fact.

In the step 2619 corresponding to a reset processing unit that is formed of an unillustrated error counter, each time an abnormality determination "YES" is made in the step 2614, 2616, or 2617b, the present counter value of the error counter increases, for example, by five, and each time a normality determination "NO" is made in the step 2617, 2614, or 2617b, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in monitoring; when the result of the tallying in monitoring exceeds, for example, 11, the reset output RST2 is generated, and the microprocessor 20 is initialized to be restarted in the step 2601b or the step 2701b described later; this corresponds to a restart processing which is a second abnormality processing unit. In the operation end step 2620 that follows the step 2619 or the step 2617f, other controls are performed, and then the operation start step 2600 is resumed.

Next, the transmission operation of the monitoring controlling circuit unit 30C illustrated in FIG. 16 will be explained with reference to FIG. 21; what differ from FIG. 7 will mainly be explained below. In addition, in FIG. 21, the reference characters in 700s in FIG. 7 are replaced by those in 2700s. In FIG. 21, the step 2700 is a step in which the auxiliary microprocessor 30c starts its transmission operation, and the process after and including the step 2700 is the same as that represented in FIG. 7; the step 2704 corresponding to a question information updating unit, and the step 2705a corresponds to a question information generation unit. In a predetermined time period after processing in the operation end step 2720, the process proceeds to the operation start step 2700.

Next, the reception operation of the main control circuit unit 20C illustrated in FIG. 16 will be explained with reference to FIGS. 22A and 22B; what differ from FIGS. 8A and 8B will mainly be explained below. In addition, in FIGS. 22A and 22B, the reference characters in 800s in FIGS. 8A and 8B are replaced by those in 2800s. In FIG. 22A, the step 2800 is a step in which the microprocessor 20 starts its operation of receiving information from the monitoring control circuit unit 30C.

In the steps 2801a, 2801b, and 2801c, the monitoring control circuit unit 30B is initialized to be restarted in response to a reset output RST1 generated in the step 2819 described later, and the result of tallying abnormalities in counter-monitoring in the step 2819 is reset so that the reset output RST1 is halted. In a series of steps 2810 to 2815a, the data received from the monitoring control circuit unit 30C is checked by a code error detection unit 2814 and then stored in the RAM memory 24.

In the step 2815b, the updating question information Qn that has been received in the step 2815a is transmitted to the collaborating supplementary apparatuses 41 to 44. The foregoing operation is performed at the time instant 2 in the first time zone represented in FIG. 18. In the step 2816a, it is determined whether or not the supplementary-apparatus answer information items A2n to A5n from the collaborating supplementary apparatuses 41 to 44 have been received; in the case where the supplementary-apparatus answer information items A2n to A5n have not been received, a "NO" determination is made and the step 2816a is followed by the step 2817a; in the case where the supplementary-apparatus answer information items A2n to A5n have been received, a "YES" determination is made and the step 2816a is followed by the step 2816b.

In the step 2816b, the received supplementary-apparatus answer information items A2n to A5n are stored in the RAM memory 24; after that, the step 2816b is followed by the step 2816c. In the step 2816c corresponding to an external-apparatus monitoring unit, the microprocessor 20 compares the received supplementary-apparatus answer information items A2n to A5n with the supplementary-apparatus correct-solution information items that have been stored in the nonvolatile program memory 25C, and determines whether or not there exists an abnormality in the collaborating supplementary apparatuses 41 to 44; in the case where there exists no abnormality in the collaborating supplementary apparatuses 41 to 44, a determination "NO" is made and the step 2816c is followed by the step 2818a; in the case where there exists an abnormality in the collaborating supplementary apparatuses 41 to 44, a "YES" determination is made and the step 2816c is followed by the step 2817b.

In the step 2817a, it is determined whether or not the response time between the timing when the concurrent question information Qn is transmitted to the collaborating supplementary apparatuses 41 to 44 in the step 2815b and the timing when the supplementary-apparatus answer information items A2n to A5n are received has exceeded a predetermined threshold time; in the case where the response time has exceeded the predetermined threshold time, a "YES" determination is made and the step 2817a is followed by the step 2817b; in the case where the response time has not exceeded the predetermined threshold time, a "NO" determination is made and the step 2817a is followed by the step 2818a. In addition, in the case where it is determined in the step 2817a that the response time has not exceeded the predetermined threshold time, while repeating a control flow from the step 2800 to the step 2820, the microprocessor 20 waits for the reply to be completed in the step 2816a.

The step 2817b, an external apparatus abnormality processing unit, corresponds to a first abnormality processing unit that is performed based on discrete abnormality determination information, obtained in the step 2816b, with regard to the external control apparatus 40; the microprocessor 20 does not respond at least to an increase demand out of engine output torque increase/decrease demand correction value Δτ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20C.

In the step 2817b, an answer transmission selection flag is set, and then the information for the determination, in the step 2502a, whether or not there exists an abnormality in the external apparatuses is generated. The step 2818a corresponding to a tallied information monitoring unit is a unit in which the change in the result, of tallying in monitoring, which has been received in the step 2815a is monitored in response to the erroneous-answer information that has been transmitted, in the step 2512, based on the step 2503b so that it is counter-monitored whether or not the monitoring control circuit unit 30C normally operates; in the case where it is determined that there exists an abnormality in the monitoring control circuit unit 30C, a determination "YES" is made and the step 2818a is followed by the step 2819; in the case where it is determined that there exists no abnormality in the monitoring control circuit unit 30C, a determination "NO" is made and the step 2818a is followed by the step 2818b.

The step 2818b corresponding to a stored-information abnormality detection unit is a step in which the storage state of the setting information and the output information that have been received and stored, as part of the downlink communication information DND, by the monitoring control circuit unit 30C in the step 2615 and the acknowledgement information that has been received, as part of the uplink communication information UPD, by the main control circuit unit 20C in the step 2815a are compared so that it is determined whether or not an abnormality exists; in the case where it is determined that there exists an abnormality in the monitoring control circuit unit 30C, a determination "YES" is made and the step 2818b is followed by the step 2819; in the case where it is determined that there exists no abnormality, a determination "NO" is made and the step 2818b is followed by the operation end step 2820.

In addition, in order to determine whether or not an abnormality exists in the storage information, it is required to store the immediately previous setting information and output transmission information in the main control circuit unit 20C; therefore, only some important data undergoes a coincidence determination. In the step 2819 corresponding to a reset processing unit that is formed of an unillustrated error counter, each time an abnormality determination "YES" is made in the step 2814, 2818*a*, or 2818*b*, the present counter value of the error counter increases, for example, by five, and each time a normality determination "NO" is made in the step 2814, 2818*a*, or 2818*b*, the present counter value of the error counter decreases, for example, by one, so that subtraction restriction is provided in order to prevent the present counter value of the error counter from becoming equal to or smaller than zero.

The present counter value of the error counter formed as described above indicates the result of the tallying in counter-monitoring; when the result of the tallying in counter-monitoring exceeds, for example, "11", the reset output RST1 is generated, and the microprocessor 30*c* is initialized to be restarted in the step 2501*b* or the step 2801*b*. This corresponds to a restart processing which is a third abnormality processing unit. In the operation end step 2820 that follows the step 2819, other controls are performed, and then the operation start step 2800 is resumed.

(3) Gist and Features of Embodiment 3

As is clear from the foregoing explanation, the in-vehicle electronic control apparatus 10C according to Embodiment 3 of the present invention is provided with the main control circuit unit 20C that includes the nonvolatile program memory 25C; the RAM memory 24 for calculation processing; the first input interface circuit 21 to which the first input sensor group 11*a* is connected; the first output interface circuit 22 to which the first electric load group 12*a* is connected; and the microprocessor 20 that controls the first electric load group 12*a*, in response to contents of a control program stored in the non-volatile program memory 25C and an operation status of the first input sensor group 11*a*, and provided with a monitoring control circuit unit 30C that includes the question information generation unit 2705*a* that is connected through the first serial communication circuits 27 and 37 to the microprocessor 20 and sequentially and selectively transmits a plurality of question information items; the correct-solution information storage memory 35C that stores the correct-solution information items for the question information items; and the abnormality determination unit 2617 that compares the answer information, based on the question information, from the main control circuit unit 20C with the correct-solution information stored in the correct-solution information storage memory 35C so as to determine whether or not an abnormality exists.

The main control circuit unit 20C further collaborates with the external control apparatus 40 that is connected with the main control circuit unit 20C via the second serial communication circuit 28 and that receives control signals from and transmits control signals to the main control circuit unit 20C; the external control apparatus 40 is provided with the collaborating supplementary apparatuses 41, 42, 43, and 44 including the supplementary-apparatus microprocessors 41*a*, 42*a*, 43*a*, and 44*a*, respectively, that collaborate with the supplementary-apparatus program memories 41*b*, 42*b*, 43*b*, and 44*b*, respectively; the supplementary-apparatus program memories 41*b*, 42*b*, 43*b*, and 44*b* each have a control program corresponding to the external answer generation transmission unit 400 that generates the answer information items in response to the question information Qn transmitted from the main control circuit unit 20C and transmits the answer information items, as the supplementary-apparatus answer information items A2*n*, A3*n*, A4*n*, and A5*n*, to the main control circuit unit 20C.

The question information generation unit 2705*a* generates concurrent question information Qn applied to the main control circuit unit 20C and all the external control apparatuses 40; the concurrent question information Qn is transmitted from the monitoring control circuit unit 30C to the main control circuit unit 20C, and is transmitted from the monitoring control circuit unit 30B to the external control apparatuses 40 via the main control circuit unit 20C; the nonvolatile program memory 25C further includes a control program corresponding to a main-machine answer generation unit 2503*c* that generates the main-machine answer information A1*n* in accordance with the concurrent question information Qn and a control program corresponding to a transmission answer edition unit 2505*a* that transmits, in response to the concurrent question information Qn, the synthesis answer information An obtained by combining and tallying the main-machine answer information A1*n* and the supplementary-apparatus answer information A2*n*, A3*n*, A4*n*, and A5*n*.

In the correct-solution information storage memory 35C, there is stored the main-machine correct-solution information R1*n* with regard to the main-machine answer information A1*n* generated by the main control circuit unit 20C and the synthesis correct-solution information Rn obtained by combining and tallying the main-machine correct-solution information R1*n* and the supplementary-apparatus correct-solution information items R2*n*, R3*n*, R4*n*, and R5*n* for the supplementary-apparatus answer information items A2*n*, A3*n*, A4*n*, and A5*n*; the supplementary-apparatus correct-solution information items R2*n*, R3*n*, R4*n*, and R5*n* are stored in the nonvolatile program memory 25C.

The abnormality determination unit 2617 performs abnormality monitoring of the main control circuit unit 20C, based at least on the concurrent question information Qn generated by the monitoring control circuit unit 30C; the main control circuit unit 20C and the monitoring control circuit unit 30C collaborate with each other so as to monitor and discriminate an abnormality in the external control apparatus 40; when an abnormality occurs in the external control apparatus 40, the main control circuit unit 20C performs self-protection through a first abnormality processing unit 2817*b*; when an abnormality occurs in the main control circuit unit 20C, the monitoring control circuit unit 30C applies restart processing to the main control circuit unit 20C through a second abnormality processing unit 2619.

In the nonvolatile program memory 25C, there is further stored control programs corresponding to an external-apparatus monitoring unit 2816*c* and a selection answer generation unit 2505*a*, the supplementary-apparatus correct-solution information items R2*n*, R3*n*, R4*n*, and R5*n* with regard to the supplementary-apparatus answer information items A2*n*, A3*n*, A4*n*, and A5*n*; the monitoring control circuit unit 30C is further provided with an abnormality analysis determination unit 2617; the main-machine correct-solution information R1*n* and the synthesis correct-solution information Rn are stored in the correct-solution information storage memory 35C.

The external-apparatus monitoring unit 2816*c* compares the supplementary-apparatus correct-solution information items R2*n*, R3*n*, R4*n*, and R5*n* with the supplementary-apparatus answer information items A2*n*, A3*n*, A4*n*, and A5*n* so as to determine whether or not an abnormality exists in the external control apparatus 40; the selection answer generation unit 2505*a* is a transmission answer edition unit that firstly generates, in response to the concurrent question information Qn generated by the monitoring control circuit unit 30C, synthesis answer information An by combining the main-machine answer information A1*n* generated by the main control circuit unit 20C and the supplementary-apparatus answer information items A2*n*, A3*n*, A4*n*, and A5*n* generated by the external control apparatuses 40 and transmits the synthesis answer information An to the monitoring control circuit unit 30C, and transmits the main-machine answer information A1n, instead of the synthesis answer information An, to the monitoring control circuit unit 30C, when the supplementary-apparatus answer information items A2n, A3n, A4n, and A5n are abnormal.

The abnormality analysis determination unit 2617 serves as an abnormality determination unit that determines that the main control circuit unit 20C and the external control apparatus 40 are normal, in the case where any one of the synthesis answer information An and the main-machine answer information A1n, i.e., the present answer information and the synthesis correct-solution information Rn coincide with each other, that determines that the main control circuit unit 20C is normal but the external control apparatus 40 is abnormal, in the case where, even when the present answer information and the synthesis correct-solution information Rn do not coincide with each other, the present answer information and the main-machine correct-solution information R1n coincide with each other, and that determines that the main control circuit unit 20C is abnormal, in the case where the present answer information coincide neither with the synthesis correct-solution information Rn nor with the main-machine correct-solution information R1n.

This configuration corresponds to the invention recited in claim 6; the main control circuit unit has supplementary-apparatus correct-solution information and monitors the external apparatuses, and when there exists an abnormality in the external control apparatus, the main control circuit unit switches from the synthesis answer information to the main-machine answer information and transmits the main-machine answer information; the monitoring control circuit unit 30A is provided with synthesis correct-solution information and main-machine correct-solution information.

Therefore, the monitoring control circuit unit generates concurrent question information and compares the answer information obtained from the main control circuit unit with the synthesis correct-solution information or the main-machine correct-solution information, so that the monitoring control circuit unit can discriminate and detect an abnormality in the main control circuit unit or the external control apparatus.

As for the invention recited in claim 7, the question information Qn is a control program that corresponds to at least one of calculation expressions that are utilized in the microprocessor 20 and the microprocessors 41a, 42a, 43a, and 44a in the external control apparatuses 40 or a program the content of which is the same as that of the control program; each of the question information items designates a copy program, stored in a different region of each of the same program memories 25C, 41b, 42b, 43b, and 44b, as a test program, and designates the number of an input constant table corresponding to input data utilized in the test program; the actual numerical values of the input constant tables are stored in the nonvolatile program memory 25C and the supplementary-apparatus program memories 41b, 42b, 43b, and 44b in the external control apparatus 40.

The main control circuit unit 20C generates the main-machine answer information A1n, based on the calculation expression and the input constant designated by the concurrent question information Qn; the external control apparatus 40 transmits the calculation result based on the calculation expression and the input constant designated by the concurrent question information Qn, as the supplementary-apparatus answer information items A2n, A3n, A4n, and A5n, to the main control circuit unit 20C.

As for the invention recited in claim 8, the in-vehicle electronic control apparatus 10C is an engine control apparatus; the first input sensor group 11a includes at least an accelerator position sensor for detecting the accelerator-pedal depressing level, a throttle position sensor for detecting an opening degree of an air-intake valve, an airflow sensor for measuring the air intake amount of the engine, and an engine rotation sensor for calculating the engine rotation speed; the first electric load group 12a includes at least a motor for controlling the valve opening degree of an air-intake throttle and a fuel-injection electromagnetic valve.

The test program in the main control circuit unit 20C is a control program for calculating the throttle-valve-opening-degree increase/decrease target correction value $\Delta\theta$ corresponding to the engine-output-torque increase/decrease demand correction value $\Delta\tau$ required by the external control apparatus 40.

The external control apparatus 40 includes any one of the transmission control unit 41 that switches the transmission stage of the transmission in response to the vehicle speed and the accelerator position sensor, the electric power steering system 42 that responds to the operation of the steering wheel, the stability control unit 43 for controlling the vehicle posture, and the antilock brake system 44 that responds to the foot brake pedal; the external control apparatus 40 transmits the engine-torque increase/decrease demand correction value $\Delta\tau$ to the main control circuit unit 20C, via the second serial communication circuits 28, 41c, 42c, 43c, and 44c; the test program in the external control apparatus 40 is a control program for calculating the engine-torque increase/decrease demand correction value $\Delta\tau$ in response to an input signal to the external control apparatus 40.

As for the invention recited in claim 9, the nonvolatile program memory 25C further incorporates a control program corresponding to an external apparatus abnormality processing unit 2817b. The external apparatus abnormality processing unit 2817b, which corresponds to a first abnormality processing unit that operates based on discrete abnormality determination information, on the external control apparatus 40, obtained through the external-apparatus monitoring unit 2816c in the main control circuit unit 20C, does not respond at least to an increase demand out of engine-output-torque increase/decrease demand correction value $\Delta\tau$ from the external control apparatus 40 that has been determined to be abnormal, so as to maintain the present condition, and notifies the external control apparatus 40 of the fact that an abnormality therein has been detected; abnormality-occurrence history information is stored in the main control circuit unit 20C.

As for the invention recited in claim 10, the monitoring control circuit unit 30C performs communication with regard to input/output signals, of the second input sensor group 11b and the second electric load group 12b, which are part of input/output signals for the microprocessor 20, through the first serial communication circuits 27 and 37.

The downlink communication information DND, which is transmitted from the main control circuit unit 20C to the monitoring control circuit unit 30C, includes setting constants or control outputs that are required by the monitoring control circuit unit 30C, the answer information An-1 for the question information Qn-1 obtained from the immediately previous uplink communication information UPD, the second flag information, and the code check information; the uplink communication information UPD, which is transmitted from the monitoring control circuit unit 30C to the main control circuit unit 20C, includes input signal information for the monitoring control circuit unit 30C or the storage information for the setting constants or the control outputs obtained from the main control circuit unit 20C, present question information Qn, the first flag information, and code check information.

The first flag information changes at the timing when the contents of the question information Qn is updated in the monitoring control circuit unit 30C, and serves as a single-bit or multi-bit recognition signal that reports the change in the question information, and the second flag information changes at the timing when the main control circuit unit 20C updates the contents of the answer information An, in response to an update of the contents of the question information Qn, and serves as a single-bit or multi-bit recognition signal that reports the update of the answer information.

As for the invention recited in claim 11, the monitoring control circuit unit 30C is further provided with the question information updating unit 2704 and a response delay determination unit 2616. The question information updating unit 2704 recurrently transmits question information included in the uplink communication information UPD in such a way that the question information is the same in a plurality times of communication instances and after transmitting the question information for a predetermined duration or longer, updates the question information; the response delay determination unit 2616 is a unit that determines that an abnormality exists in the main control circuit unit 20C, when the time between the timing when the monitoring control circuit unit 30C changes the contents of the first flag information and the timing when the reception data of the second flag information changes exceeds a predetermined time.

As for the invention recited in claim 12, the monitoring control circuit unit 30C is further provided with a code error detection unit 2614 and a reset processing unit 2619.

The code error detection unit 2614 detects the intrusion of bit information or the loss of bit information in the reception data in the downlink communication information DND, by use of a code check unit exemplified by the sum check or the CRC check.

The reset processing unit 2619 serves as the second abnormality processing unit that initializes and restarts the main control circuit unit 20C, in response to the result of monitoring/tallying of the fact that the abnormality determination unit 2617 has determined that an abnormality exists in the main control circuit unit 20C, the fact that the response delay determination unit 2616 has determined an answer delay, or the fact that the code error detection unit 2614 has detected an code error in the downlink communication information.

As for the invention recited in claim 13, the monitoring control circuit unit 30C includes the auxiliary microprocessor 30c, and the auxiliary non-volatile program memory 35C and the auxiliary RAM memory 34 that collaborate with the auxiliary microprocessor 30c.

The auxiliary non-volatile program memory 35C includes control programs corresponding to the question information generation unit 2705a, the question information updating unit 2704, abnormality determination unit 2617, the response delay determination unit 2616, the code error determination unit 2614 for the downlink communication information, and the reset processing unit 2619, and stores the correct-solution information items Rn and R1n for the question information Qn; the result of tallying in monitoring is written in the auxiliary RAM memory 34.

As for the invention recited in claim 14, the nonvolatile program memory 25C is further provided with control programs corresponding to an erroneous-answer transmission unit 2503b and a tallied information monitoring unit 2818a; the uplink communication information UPD includes tallied information obtained through abnormality-monitoring by the monitoring control circuit unit 30C.

The erroneous-answer transmission unit 2503b is a unit that intentionally generates erroneous-solution information items for the question information Qn and transmits the erroneous-solution information, as the answer information items An and A1n; the intentional transmission of an erroneous answer is performed by the erroneous-answer transmission unit at the timing when there exist some margins for the tallied value in the abnormality monitoring and the reset processing unit 2619 in the monitoring control circuit unit 30C is not caused to output a reset output RST2 by only a one-time erroneous-answer response; the tallied information monitoring unit 2818a is a unit in which, by monitoring the tallied information, the main control circuit unit 20C counter-monitors whether or not the monitoring control circuit unit 30C normally operates.

As for the invention recited in claim 15, the nonvolatile program memory 25C further includes a control program corresponding to a code error detection unit 2814 or a stored-information abnormality detection unit 2818b and a reset processing unit 2819.

The code error detection unit 2814 detects the intrusion of bit information or the loss of bit information in the reception data in the uplink communication information UPD, by use of a code check unit exemplified by the sum check or the CRC check; the storage state of the setting information and the output information that have been received and stored, as part of the downlink communication information DND, by the monitoring control circuit unit 30C and the acknowledgement information that has been received, as part of the uplink communication information UPD, by the main control circuit unit 20C are compared, in the main control circuit unit 20C by the stored-information abnormality detection unit 2818b so that it is determined whether or not an abnormality exists.

The reset processing unit 2819 serves as the third abnormality processing unit that initializes and restarts the monitoring control circuit unit 30C, in response to the result of counter-monitoring/tallying of the fact that the code error detection unit 2814 has detected a code error in the uplink communication information UPD, the fact that the stored-information abnormality detection unit 2818b has detected an abnormality in the stored information, or the fact that the tallied information obtained through the abnormality monitoring by the tallied information monitoring unit 2818a has been abnormal.

Next, other Embodiments will be explained.
Explanation for Other Embodiments

As described heretofore, in Embodiment 1 illustrated in FIG. 1, the logic circuit unit 30a is provided in the monitoring controlling circuit unit 30A, the communication permission signal is the alternate signal ALT, and the communication synchronization signal CLK is generated by the monitoring controlling circuit unit 30A; however, the logic circuit unit 30a may be replaced by any one of the auxiliary microprocessors 30b and 30c illustrated in FIG. 9 in Embodiment 2 and in FIG. 16 in Embodiment 3. In contrast, each of the auxiliary microprocessors 30b and 30c illustrated in FIG. 9 in Embodiment 2 and in FIG. 16 in Embodiment 3 may be replaced by the logic circuit unit 30a illustrated in FIG. 1 in Embodiment 1. In the case where the logic circuit unit is utilized, it is difficult to change the control specification of the monitoring control circuit unit; however, an inexpensive integrated circuit element can be formed without utilizing any auxiliary microprocessor and auxiliary program memory. In the case where an auxiliary microprocessor is utilized, by changing the contents of the auxiliary program memory, the operation specification of the monitoring control circuit unit can relatively readily be changed.

Additionally, in FIGS. 1, 9, and 16, the communication permission signal is the alternate signal ALT, and the communication synchronization signal CLK is generated by the main control circuit unit; however, as the communication permission signal, a logic signal can be utilized whose logic level becomes "H" (or "L") during a communication permission period and "L" (or "H") during a non-permission period, instead of the alternate signal ALT represented in FIG. 2(A). Additionally, the communication synchronization signal CLK may be generated by the main control circuit unit, instead of the monitoring control circuit unit.

Moreover, as the method of signal communication between the main control circuit unit and the monitoring control circuit unit, a method can also be utilized in which a communication packet configured with command information, address information, and communication data is transmitted through start-stop synchronization method, instead of the collective-block communication method, represented in FIG. 2, utilizing a synchronization signal; in this case, the communication cycles of question information and answer information can freely be extended and prolonged, in comparison with the communication cycles of the input signal and output signal.

In the foregoing explanation, correct-solution information corresponding to question information is preliminarily written in the data memory 35A or the auxiliary program memory 35B (35*c*); however, the in-vehicle electronic control apparatus may be configured in such a way that the correct-solution information is written, through an external tool, in the program memory 25A (25B, 25*c*) and the correct-solution information written in the program memory is transmitted, as setting data in the downlink communication information, to a RAM memory in the monitoring controlling circuit unit.

The synthesis answer information Rn in Embodiment 2 in FIG. 9 is not required to be preliminarily stored; as long as the main-machine correct-solution information R1*n* and the supplementary-apparatus correct-solution information items R2*n* to R5*n* are stored, the synthesis answer information Rn may be generated in the monitoring control circuit unit and stored in the RAM memory 34.

In the foregoing explanation, the synthesis answer information An and the synthesis correct-solution information Rn are each the discrete answer information or the algebraic sum of the discrete correct-solution information items; however, it is also possible to utilize a synthesis value obtained by implementing a predetermined function conversion, for example, residues obtained by dividing the respective discrete answer information items or the discrete correct-solution information items by a predetermined integer. Moreover, by increasing the number of the bits in the answer information and the discrete information, the rate of erroneous determination can be lowered.

Additionally, in the foregoing explanation, the in-vehicle electronic control apparatus is configured in such a way that, when detecting an abnormality in the main control circuit unit 20A (20B), the monitoring control circuit unit 30A, 30B initializes and restarts the main control circuit unit 20A, 20B; however, the in-vehicle electronic control apparatus can be configured in such a way that, instead of the initialization and restart of the main control circuit unit 20A, 20B, the power supply relay for the throttle-valve opening level controlling motor is de-energized so that the operation state of the engine moves to the power-saving drive mode at a predetermined default valve opening level.

Various modifications and alterations of this invention will be apparent to those skilled in the art without departing from the scope and spirit of this invention, and it should be understood that this is not limited to the illustrative embodiments set forth herein.

What is claimed is:
1. An in-vehicle electronic control apparatus, having a monitoring control circuit, comprising:
 a main control circuit unit including:
  a nonvolatile program memory storing a control program;
  a RAM memory which stores calculation processing;
  a first input interface circuit to which a first input sensor group is connected;
  a first output interface circuit to which a first electric load group is connected; and
  a microprocessor that controls the first electric load group, in response to contents of the control program and an operation status of the first input sensor group, and
 a monitoring control circuit unit including:
  a question information generation unit that is connected through a first serial communication circuit to the microprocessor and that sequentially and selectively transmits a plurality of question information items to the microprocessor;
  a correct-solution information storage memory that stores correct-solution information items that correspond to the question information items; and
  an abnormality determination unit which determines whether an abnormality in the main control circuit unit exists by comparing answer information that is received from the microprocessor and that is provided in response to the question information items with the stored correct-solution information,
 wherein the main control circuit unit is connected to an external control apparatus through a second communication circuit,
 wherein the main control circuit unit receives control signals from the external control apparatus and transmits the control signals to the external control apparatus,
 wherein the external control apparatus is provided with collaborating supplementary apparatuses including:
  supplementary-apparatus memories, each storing a control program that generates answer information items in response to the plurality of question information items transmitted from the main control circuit unit, where said answer information is transmitted to the main control circuit unit as supplementary-apparatus answer information, and
  supplementary-apparatus microprocessors that collaborate with supplementary-apparatus program memories and executes the control program stored in the supplementary-apparatus program memories,
 wherein, the question information generation unit generates concurrent question information items that are applied to the main control circuit unit and all the external control apparatuses or discrete question information items that are discretely applied to the main control circuit unit and the external control apparatuses;
 wherein the concurrent question information or the discrete question information items are transmitted from the monitoring control circuit unit to the main control circuit unit and transmitted from the monitoring control circuit unit to the external control apparatuses via the main control circuit unit, wherein the nonvolatile program memory includes a control program which constitutes a main-machine answer generation unit that generates main-machine answer information in accordance with the concurrent question information or the discrete question information items and a control program corresponding to a transmission answer edition unit, wherein the transmission answer edition unit edits the main machine answer information and the supplementary-apparatus answer information and transmits, as answer information, synthesis correct-solution information, the main-machine answer information, or the supplementary-apparatus answer information corresponding to the synthesis correct-solution information, the main-machine answer information, or the supplementary-apparatus answer information included in the monitoring control circuit unit to the monitoring control circuit unit, wherein, in the correct-solution information storage memory, there is stored main-machine correct-solution information items with regard to main-machine answer information generated by the main control circuit unit and/or synthesis correct-solution information obtained by combining and tallying the main-machine correct-solution information and the supplementary-apparatus correct-solution information items for the supplementary-apparatus answer information items, wherein the supplementary-apparatus correct-solution information items are stored in the correct-solution information storage memory or in the nonvolatile program memory, wherein the abnormality determination unit monitors an abnormality in the main control circuit unit, based at least on concurrent question information items generated by the monitoring control circuit unit or discrete question information items, and wherein the main control circuit unit and the monitoring control circuit unit collaborate with each other so as to monitor and discriminate an abnormality in the external control apparatus.

2. The in-vehicle electronic control apparatus according to claim 1, wherein, the nonvolatile program memory stores a control program as an external-apparatus monitoring unit and a corrected answer generation unit, wherein the nonvolatile program memory further stores a supplementary-apparatus correct-solution information items with regard to the supplementary-apparatus answer information items, wherein the monitoring control circuit unit is provided with a total abnormality determination unit, wherein, the correct-solution information storage memory stores the synthesis correct-solution information, wherein the external-apparatus monitoring unit compares the supplementary-apparatus correct-solution information items with the supplementary-apparatus answer information items so as to determine whether or not an abnormality exists in the external control apparatus, wherein, in response to the concurrent question information items generated by the monitoring control circuit unit, the corrected answer generation unit firstly generates synthesis answer information by combining main-machine answer information generated by the main control circuit unit and supplementary-apparatus answer information items generated by the external control apparatus and transmits the synthesis answer information items to the monitoring control circuit unit; and wherein, if the supplementary apparatus answer information items are abnormal, the corrected answer generation unit serves as a transmission answer edition unit that combines the supplementary-apparatus correct-solution information items with regard to the supplementary-apparatus answer information items, in place of the supplementary-apparatus answer information items, and wherein the total abnormality determination unit serves as an abnormality determination unit that compares the synthesis correct-solution information corresponding to concurrent question information generated by the monitoring control circuit unit with synthesis answer information received from the main control circuit unit so as to perform a total abnormality determination including a determination whether or not there exists an abnormality in the main control circuit unit itself and a determination whether or not the main control circuit unit monitors an abnormality in the external control apparatus.

3. The in-vehicle electronic control apparatus according to claim 1, wherein the nonvolatile program memory comprises a control program as a circulation answer generation unit, wherein the monitoring control circuit unit comprises an external apparatus abnormality notification unit and an abnormality determination unit, wherein the abnormality determination unit comprises a synthesis abnormality determination unit and a discrete abnormality determination unit, wherein, the correct-solution information storage memory stores main-machine correct-solution information with regard to the main control circuit unit, supplementary-apparatus correct-solution information items with regard to the external control apparatuses, and synthesis correct-solution information obtained by combining the main-machine correct-solution information and the supplementary-apparatus correct-solution information items, wherein the circulation answer generation unit serves as a transmission answer edition unit that firstly generates, in response to concurrent question information items generated by the monitoring control circuit unit, synthesis answer information by combining main-machine answer information generated by the main control circuit unit and supplementary-apparatus answer information items generated by the external control apparatuses and transmits the synthesis answer information to the monitoring control circuit unit, wherein, if the synthesis answer information items transmitted from the main control circuit unit and the synthesis correct-solution information items match , the monitoring control circuit unit continues to transmit the concurrent question information items having different contents; and wherein if the synthesis answer information and the synthesis correct-solution information do not match, a circulation question flag is set, and after the circulation question flag is set, the discrete question information items are sequentially transmitted to the main control circuit unit and the external control apparatuses; and wherein if the concurrent question information items are transmitted again and the synthesis answer information and the synthesis correct-solution information match, the circulation question flag is reset, and wherein if the synthesis answer information and the synthesis correct-solution information do not match, the circulation question flag is kept set, wherein the circulation answer generation unit is a transmission answer edition unit that first generates, in response to concurrent question information generated by the monitoring control circuit unit, synthesis answer information by combining main-machine answer information generated by the main control circuit unit and supplementary-apparatus answer information items generated by the external control apparatuses and transmits the synthesis answer information to the monitoring control circuit unit, and that transmits answer information corresponding to the received discrete question information or the concurrent question information to the monitoring control circuit unit, when the circulation question flag is set, wherein the discrete abnormality determination unit compares the main-machine answer information based on the discrete question information items with the main-machine correct-solution information and compares the supplementary-apparatus answer information items with the supplementary-apparatus correct-solution information items so as to discretely determine whether or not an abnormality exists in the main control circuit unit or in the external control apparatuses, and wherein, when an abnormality in the external control apparatus is detected by the discrete abnormality determination unit, the external apparatus abnormality notification unit notifies the main control circuit unit of the occurrence of the abnormality.

4. The in-vehicle electronic control apparatus according to claim 3, wherein the discrete question information items are each question information to be transmitted to the main control circuit unit or any one of the collaborating supplementary apparatuses in the external control apparatus, and wherein the main control circuit unit transmits to the monitoring control circuit unit one of the main-machine answer information and supplementary-apparatus answer information based on the discrete question information items.

5. The in-vehicle electronic control apparatus according to claim 3, wherein the discrete question information items are concurrently transmitted to the main control circuit unit and the external control apparatus;

wherein the main control circuit unit and some of the collaborating supplementary apparatuses in the external control apparatus to which the discrete question information items do not apply, do not reply to the monitoring control circuit unit, or the main control circuit unit eliminates the main-machine answer information or the supplementary-apparatus answer information items that do not apply to the main control circuit unit and the external; control apparatus.

6. The in-vehicle electronic control apparatus according to claim 1, wherein, the nonvolatile program memory, stores a control programs that serves as an external-apparatus monitoring unit and a selection answer generation unit, supplementary-apparatus correct-solution information items with regard to the supplementary-apparatus answer information items, wherein the monitoring control circuit unit further comprises an abnormality analysis determination unit, wherein, main-machine correct-solution information and synthesis correct-solution information are stored in the correct-solution information storage memory, wherein the external-apparatus monitoring unit compares the supplementary-apparatus correct-solution information items with the supplementary-apparatus answer information items to determine whether or not an abnormality exists in the external control apparatus, wherein the selection answer generation unit firstly transmits the synthesis answer information by combining the main-machine answer information generated by the main control circuit unit and the supplementary-apparatus answer information items generated by the external control apparatuses to the monitoring control circuit unit, and wherein, if the supplementary-apparatus answer information is abnormal, the selection answer generation unit transmits the main-machine answer information, instead of synthesis answer information, to the monitoring control circuit unit, and wherein, if any one of the synthesis answer information and the main-machine answer information, i.e., the present answer information items match the synthesis correct-solution information, the abnormality analysis determination unit serves as an abnormality determination unit that determines that the main control circuit unit and the external control apparatus are normal, and wherein, if the present answer information do not match the synthesis correct-solution information but the main-machine correct-solution information match the synthesis correct-solution information, the abnormality analysis determination unit serves as an abnormality determination unit that determines that the main control circuit is normal but the external control apparatus is abnormal, wherein, if the present answer information do not match the synthesis correct-solution information and the main-machine correct-solution information do not match the synthesis correct-solution information, the abnormality analysis determination unit serves as an abnormality determination unit that determines that the main control circuit is abnormal.

7. The in-vehicle electronic control apparatus according to claim 2 or 3 or 6, wherein each of the question information items is a control program that corresponds to at least one of calculation expressions that are utilized in the microprocessor and the supplementary-apparatus microprocessors in the external control apparatus or a program the content of which is the same as that of the control program which is each of the question information items; the question information items designate copy programs stored in different addresses of the program memories, as test programs, and designate input constant table numbers corresponding to input data items utilized in the test programs; and the actual numerical values of the input constant tables are stored in the nonvolatile program memory and the supplementary-apparatus program memories in the external control apparatus, wherein the main control circuit unit generates main-machine answer information, based on the calculation expression and the input constants designated by the question information items, and wherein the external control apparatus transmits the calculation result based on the calculation expression and the input constant designated by the question information items, as the supplementary-apparatus answer information, to the main control circuit unit.

8. The in-vehicle electronic control apparatus according to claim 7, wherein the in-vehicle electronic control apparatus is an engine control apparatus, wherein the first input sensor group includes at least an accelerator position sensor for detecting the accelerator-pedal depressing level, a throttle position sensor for detecting an opening degree of an air-intake valve, an airflow sensor for measuring the air intake amount of the engine, and an engine rotation sensor for calculating the engine rotation speed, wherein the first electric load group includes at least a motor for controlling the valve opening degree of an air-intake throttle and a fuel-injection electromagnetic valve, wherein the test program in the main control circuit unit is a control program for calculating a throttle-valve-opening-degree increase/decrease target correction value corresponding to an engine-output-torque increase/decrease demand correction value required by the external control apparatus, and wherein the external control apparatus includes any one of:
a transmission control unit that switches the transmission stage of a transmission in response to a vehicle speed and an accelerator position sensor,
an electric power steering system that responds to the operation of a steering wheel,
a stability control unit for controlling a vehicle posture, and
an antilock brake system that responds to a foot brake pedal; and wherein the external control apparatus transmits the engine-torque increase/decrease demand correction value to the main control circuit unit, via the second serial communication circuits; and the test program in the external control apparatus is a control program for calculating the engine-torque increase/decrease demand correction value in response to an input signal to the external control apparatus.

9. The in-vehicle electronic control apparatus according to claim 8,
wherein the nonvolatile program memory further stores a control program corresponding to an external apparatus abnormality processing unit;

wherein the external apparatus abnormality processing unit is a first abnormality processing unit that operates based on discrete abnormality determination information items related to the external control apparatus, transmitted to the main control circuit unit through the discrete abnormality determination unit and the external apparatus abnormality notification unit in the monitoring control circuit unit, or that operates based on discrete abnormality determination information, on the external control apparatus, through the external-apparatus monitoring unit in the main control circuit unit; and the external apparatus abnormality processing unit does not respond at least to an increase demand out of engine-output-torque increase/decrease demand correction value from the external control apparatus that has been determined to be abnormal, so as to maintain the present condition, notifies the external control apparatus of the fact that an abnormality therein has been detected, and stores abnormality-occurrence history information in the main control circuit unit.

10. The in-vehicle electronic control apparatus according to claim 1,
wherein the monitoring control circuit unit performs communication with regard to input/output signals, of the second input sensor group and the second electric load group, which are part of input/output signals for the microprocessor, through the first serial communication circuit, wherein the downlink communication information, which is transmitted from the main control circuit unit to the monitoring control circuit unit, includes setting constants or control outputs that are required by the monitoring control circuit unit, the answer information items for the question information items obtained from the immediately previous uplink communication information, a second flag information, and code check information, wherein the uplink communication information, which is transmitted from the monitoring control circuit unit to the main control circuit unit, includes input signal information for the monitoring control circuit unit or storage information for the setting constants or the control outputs obtained from the main control circuit unit, present question information items, the first flag information, and the code check information, wherein the first flag information changes at the timing when the contents of the question information items are updated in the monitoring control circuit unit, and serves as a single-bit or multi-bit recognition signal that reports the change in the question information items, and wherein the second flag information changes at the timing when the main control circuit unit updates the contents of the answer information in response to an update of the contents of the question information items and serves as a single-bit or multi-bit recognition signal that reports the update of the answer information.

11. The in-vehicle electronic control apparatus according to claim 10,
wherein the monitoring control circuit unit comprises a question information updating unit and a response delay determination unit, wherein the question information updating unit recurrently transmits question information items included in the uplink communication information in such a way that the question information items are the same in a plurality of communication instances, wherein after transmitting the question information items for a predetermined duration or longer, the question information updating unit updates the question information, and wherein the response delay determination unit determines that an abnormality exists in the main control circuit unit when the time between the timing when the monitoring control circuit unit changes the contents of the first flag information and the timing when the reception data of the second flag information changes exceeds a predetermined time.

12. The in-vehicle electronic control apparatus according to claim 11,
wherein the monitoring control circuit unit is provided with a code error detection unit and a reset processing unit, wherein the code error detection unit detects the intrusion of bit information or the loss of bit information in the reception data in the downlink communication information, by use of a code check unit exemplified by the sum check or the CRC check, and wherein the reset processing unit serves as a second abnormality processing unit that initializes and restarts the main control circuit unit, in response to the result of monitoring/tallying at least one value obtained from:

the abnormality determinations unit determining that an abnormality exists in the main control circuit unit, the response delay determination unit determining an answer delay, or the code error detection unit detecting an code error in the downlink communication information.

13. The in-vehicle electronic control apparatus according to claim 12, wherein the monitoring control circuit unit comprises an auxiliary microprocessor, an auxiliary non-volatile program memory, and an auxiliary RAM memory that collaborate with the auxiliary microprocessor, wherein the auxiliary non-volatile program memory includes auxiliary control programs corresponding to a question information generation unit, a question information updating unit, an abnormality determination unit, a response delay determination unit, a code error determination unit for the downlink communication information, and the reset processing unit, wherein the auxiliary non-volatile program memory stores the correct-solution information items for the question information items, and wherein the result of tallying in monitoring is stored to the auxiliary RAM memory.

14. The in-vehicle electronic control apparatus according to claim 12 or 13, wherein the nonvolatile program memory stores a control program as an erroneous-answer transmission unit and a tallied information monitoring unit;

wherein the uplink communication information includes tallied information obtained through abnormality-monitoring by the monitoring control circuit unit;

wherein the erroneous-answer transmission unit serves as a unit that intentionally generates erroneous-solution information items for the question information items and transmits the erroneous-solution information items, as the answer information items; where the transmitting is at a timing when there exist some margins for the tallied value in the abnormality monitoring and the reset processing unit in the monitoring control circuit unit such that the monitoring control circuit unit is not caused to output a reset output by only one erroneous-answer response, and wherein the tallied information monitoring unit serves as a unit that monitors the tallied information, the main control circuit unit counter-monitors whether or not the monitoring control circuit unit normally operates.

15. The in-vehicle electronic control apparatus according to claim 14, wherein the nonvolatile program memory stores a control program serves as a code error detection unit or a stored-information abnormality detection unit and a reset processing unit, wherein the code error detection unit detects intrusion of bit information or the loss of bit information in the reception data in the uplink communication information, by use of a code check unit exemplified by the sum check or the CRC check, wherein state of setting information and output information that are received and stored as part of the downlink communication information, by the monitoring control circuit unit, and wherein the acknowledgement information is received, as part of the uplink communication information, by the main control circuit unit, wherein the setting information and output information are compared with the acknowledgement information, in the main control circuit unit determining whether or not the abnormality exists, and wherein the reset processing unit serves as a third abnormality processing unit that initializes and restarts the monitoring control circuit unit, in response to the result of counter-monitoring/tallying a code error detected in the uplink communication information, an abnormality detected in the stored information, or the tallied information obtained through the abnormality monitoring by the tallied information monitoring unit is abnormal.

* * * * *